United States Patent
Mizushima et al.

(10) Patent No.: US 8,068,274 B2
(45) Date of Patent: Nov. 29, 2011

(54) WAVELENGTH CONVERSION LASER DEVICE AND IMAGE DISPLAY DEVICE USING THE SAME

(75) Inventors: Tetsuro Mizushima, Osaka (JP); Hiroyuki Furuya, Osaka (JP); Koichi Kusukame, Osaka (JP); Kiminori Mizuuchi, Ehime (JP); Kazuhisa Yamamoto, Osaka (JP); Nobuyuki Horikawa, Osaka (JP); Shinichi Shikii, Nara (JP); Tatsuo Itoh, Osaka (JP)

(73) Assignee: Panasonic Corporation, Osaka (JP)

( * ) Notice: Subject to any disclaimer, the term of this patent is extended or adjusted under 35 U.S.C. 154(b) by 630 days.

(21) Appl. No.: 12/241,525

(22) Filed: Sep. 30, 2008

(65) Prior Publication Data

US 2011/0170172 A1   Jul. 14, 2011

Related U.S. Application Data

(60) Provisional application No. 60/960,489, filed on Oct. 1, 2007.

(30) Foreign Application Priority Data

Feb. 15, 2008   (JP) ................................. 2008-034133

(51) Int. Cl.
G02F 2/02   (2006.01)
H01S 3/10   (2006.01)

(52) U.S. Cl. ............ 359/326; 359/328; 372/22; 372/108

(58) Field of Classification Search ........................ None
See application file for complete search history.

(56) References Cited

U.S. PATENT DOCUMENTS

| | | | |
|---|---|---|---|
| 5,483,374 A | | 1/1996 | Tanuma |
| RE35,215 E | * | 4/1996 | Waarts et al. ................. 372/108 |
| 7,612,934 B2 | * | 11/2009 | Bragg et al. ................. 359/328 |

| | | | |
|---|---|---|---|
| 2007/0041421 A1 | * | 2/2007 | Duncan et al. ................ 372/106 |

FOREIGN PATENT DOCUMENTS

| | | |
|---|---|---|
| JP | 5-265058 | 10/1993 |
| JP | 5-341334 | 12/1993 |
| JP | 8-95102 | 4/1996 |
| JP | 11-44897 | 2/1999 |
| JP | 2005-268780 | 9/2005 |
| JP | 2006-208629 | 8/2006 |
| JP | 2007-156438 | 6/2007 |

OTHER PUBLICATIONS

International Search Report issued Nov. 11, 2008 in the International (PCT) Application No. PCT/JP2008/002677.

Supplementary European Search Report issued May 2, 2011 in Application No. EP 08 83 5987.

* cited by examiner

*Primary Examiner* — Hemang Sanghavi

(74) *Attorney, Agent, or Firm* — Wenderoth, Lind & Ponack, L.L.P.

(57) ABSTRACT

A wavelength conversion laser device includes a laser light source which emits a laser beam, two reflective surfaces which reflect therefrom a laser beam, a wavelength converter provided between the two reflective surfaces, which converts a laser beam into a wavelength-converted laser beam, and condensing optics which condense the laser beams to be injected between the two reflective surfaces, wherein at least one of the two reflective surfaces has a curvature for reflecting a laser beam to be re-injected into the wavelength converter between the two reflective surfaces repeatedly while forming multi paths of laser beams injected into the wavelength converter at different incident angles, and the condensing optics are arranged to disperse beam waists of the laser beams in the wavelength converter, which reciprocate between the two reflective surfaces.

32 Claims, 27 Drawing Sheets

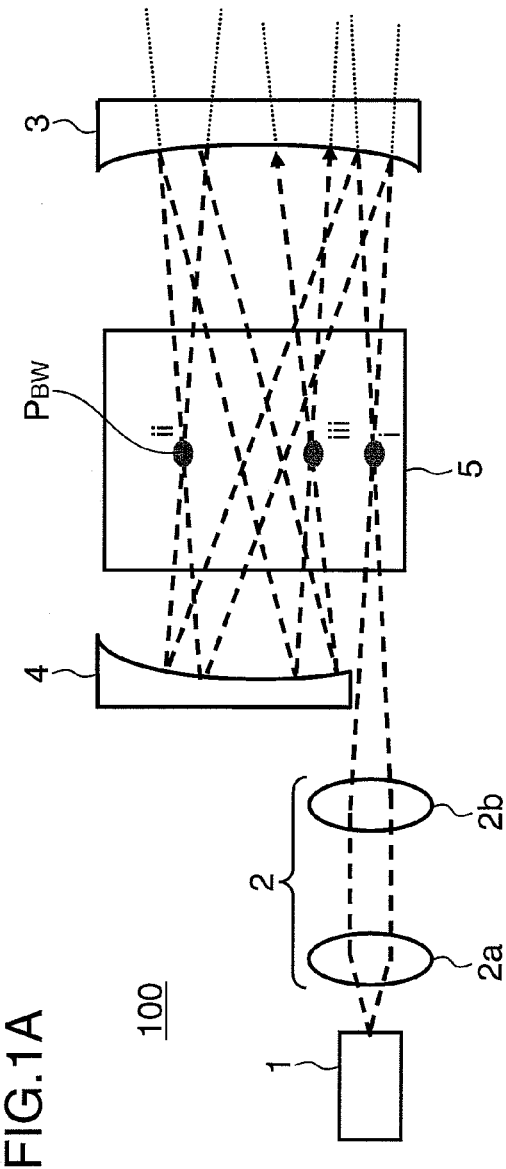
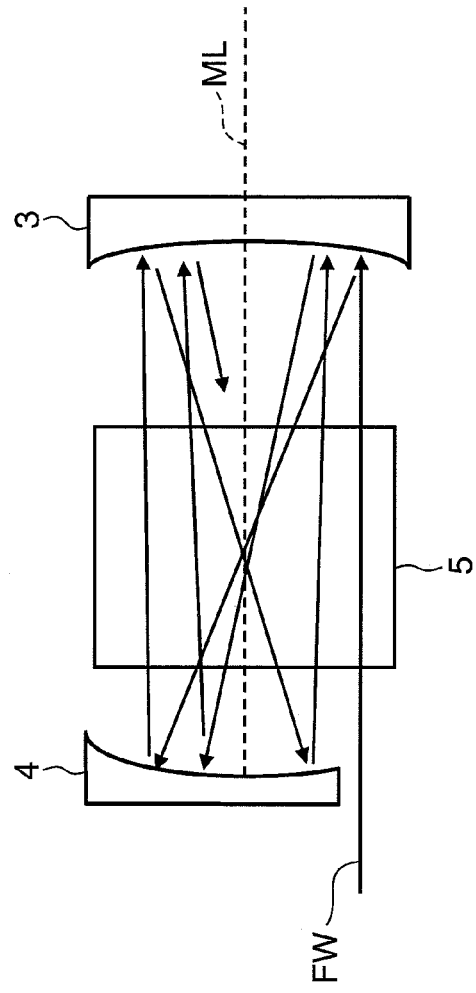
FIG.1A
FIG.1B

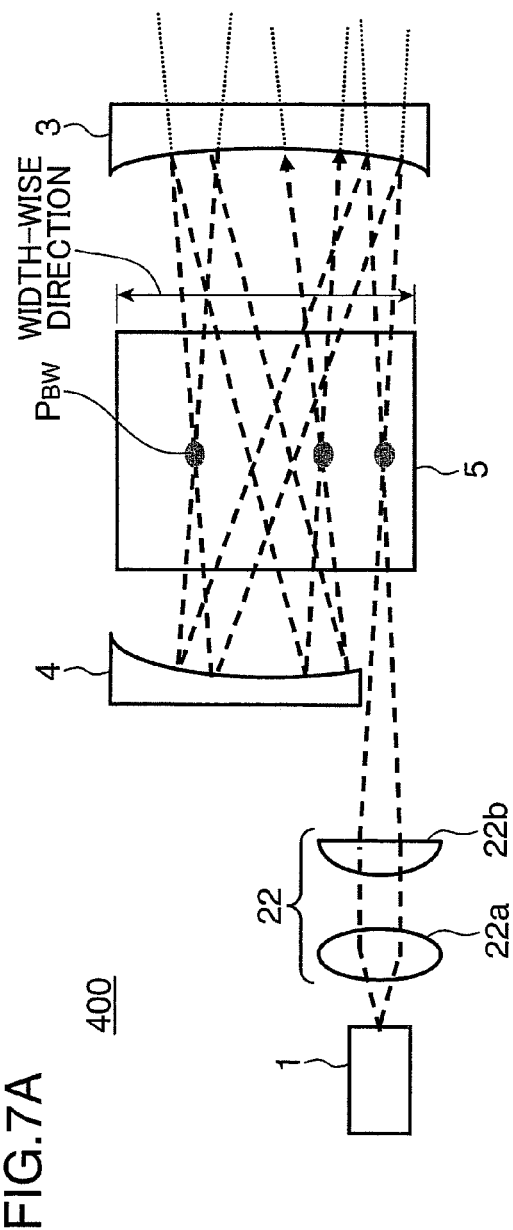
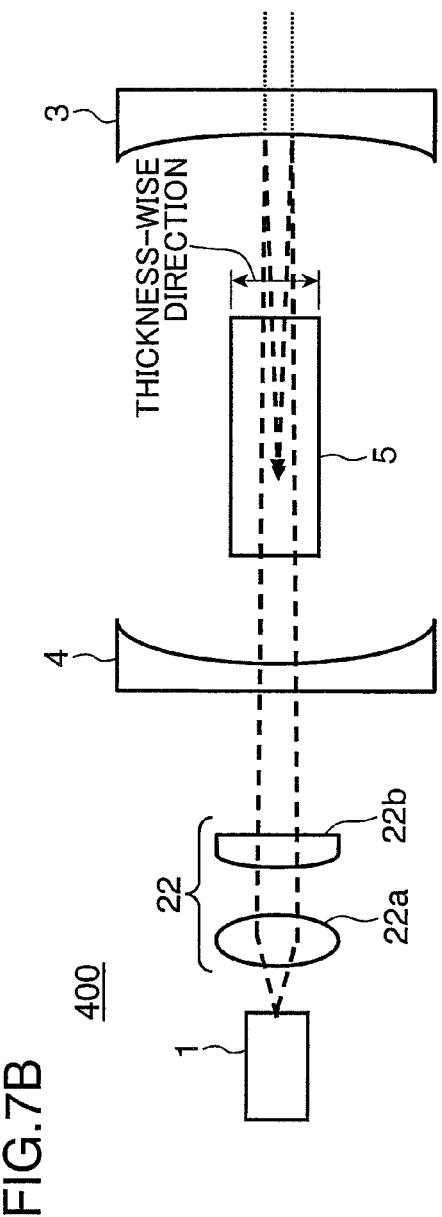
FIG. 7A
FIG. 7B

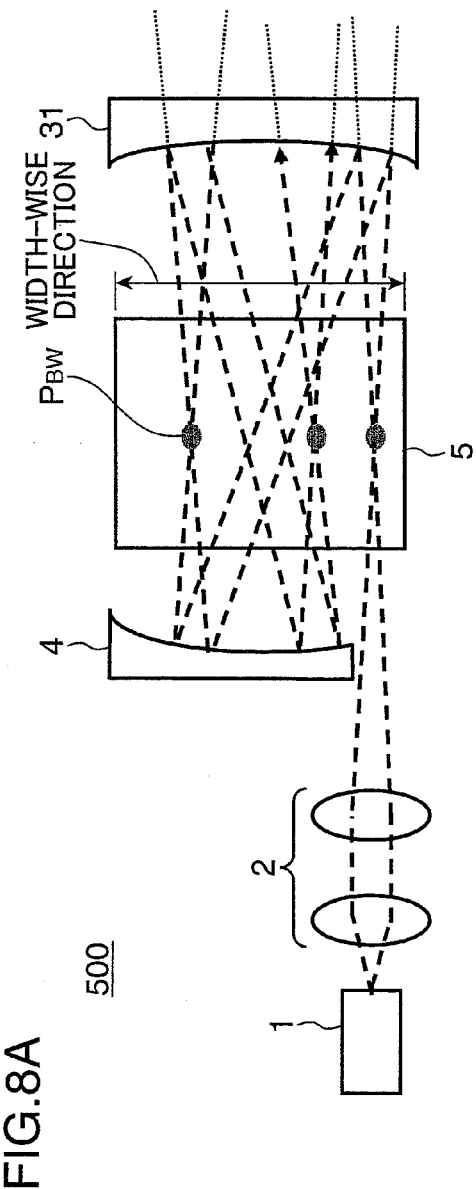
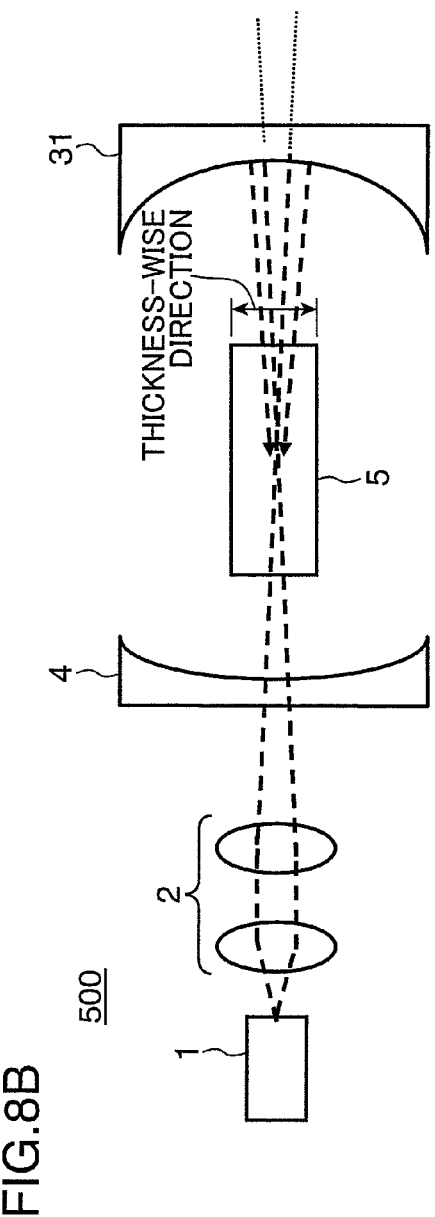
FIG.8A
FIG.8B

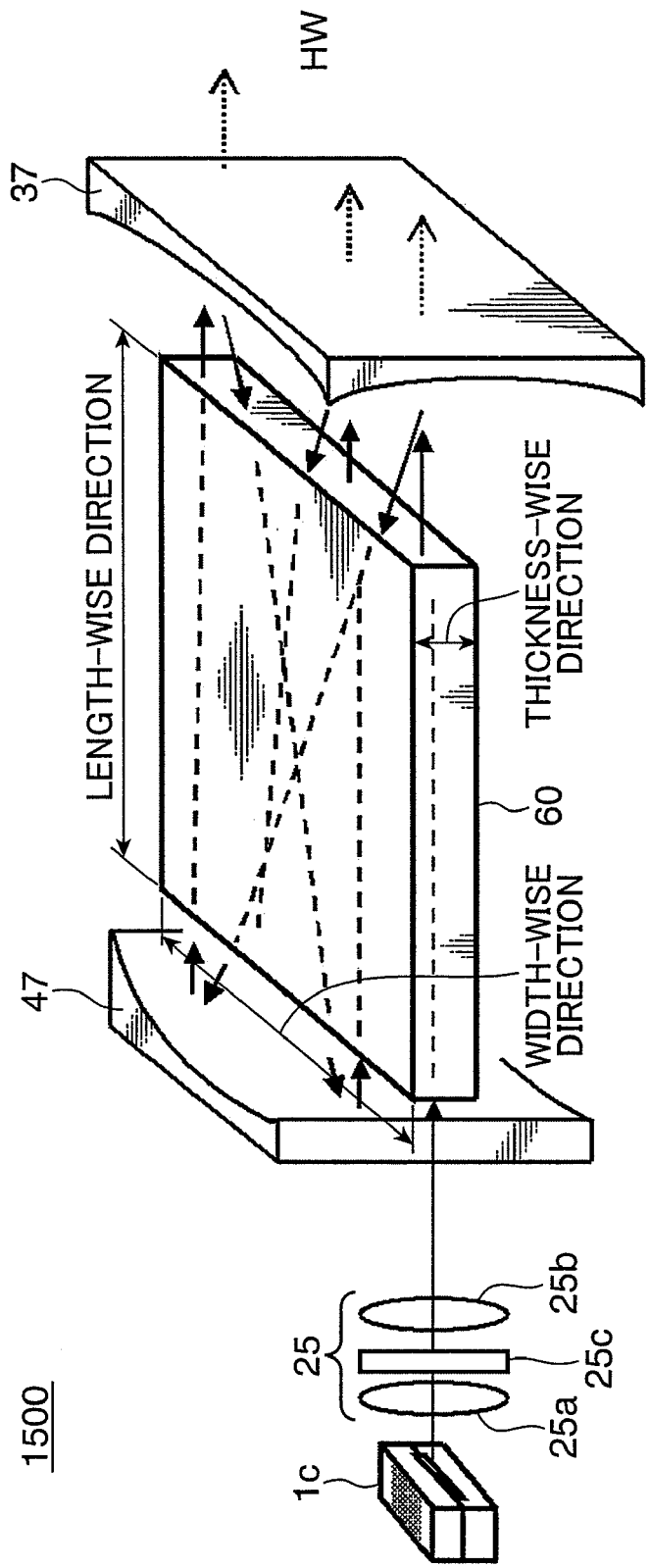

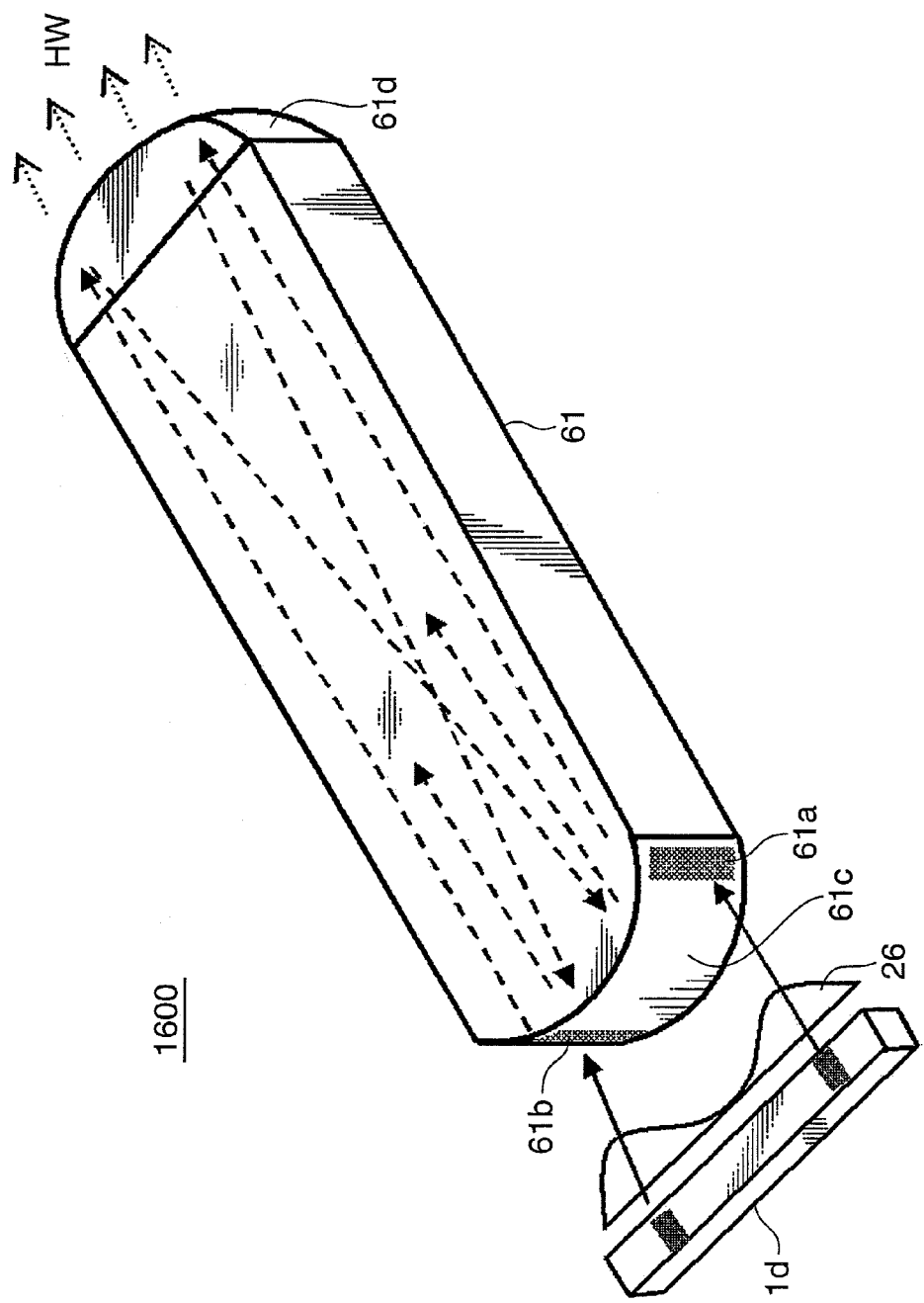

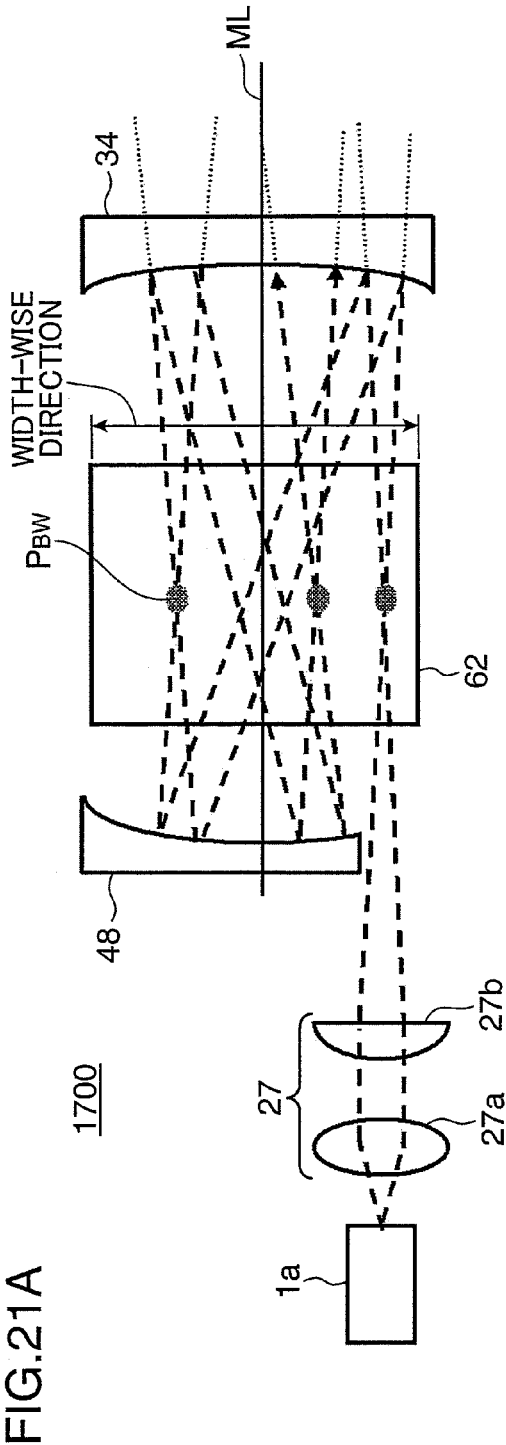
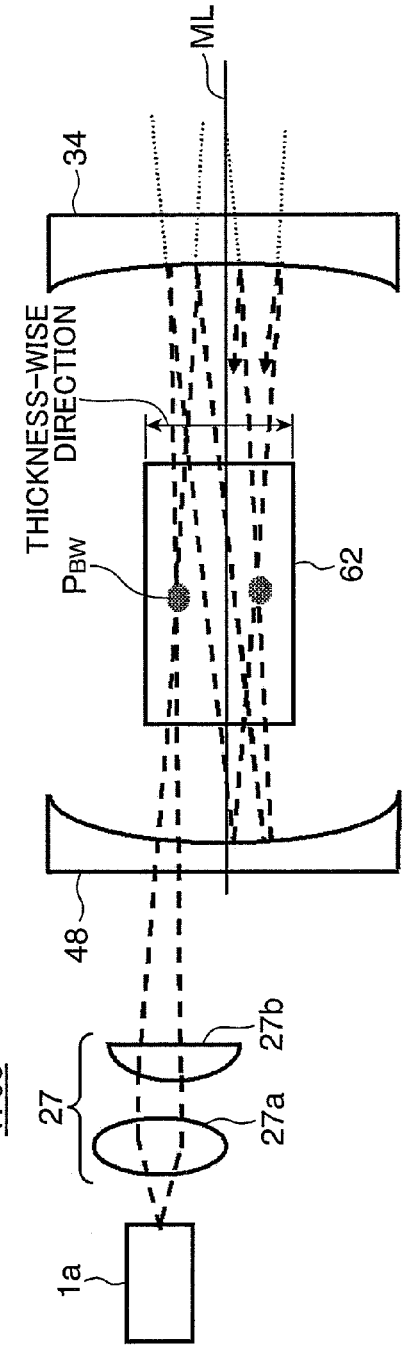
FIG.21A
FIG.21B

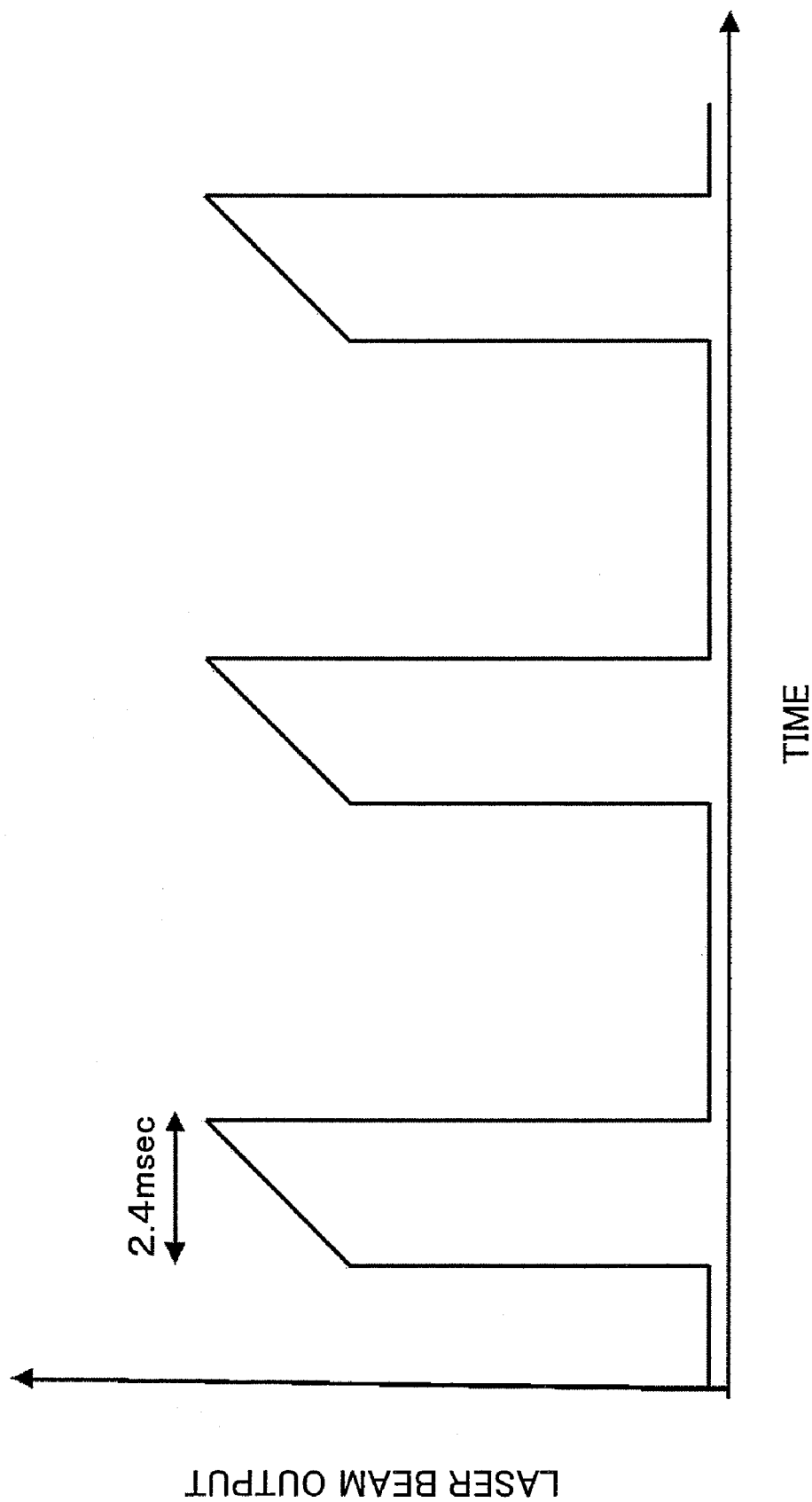

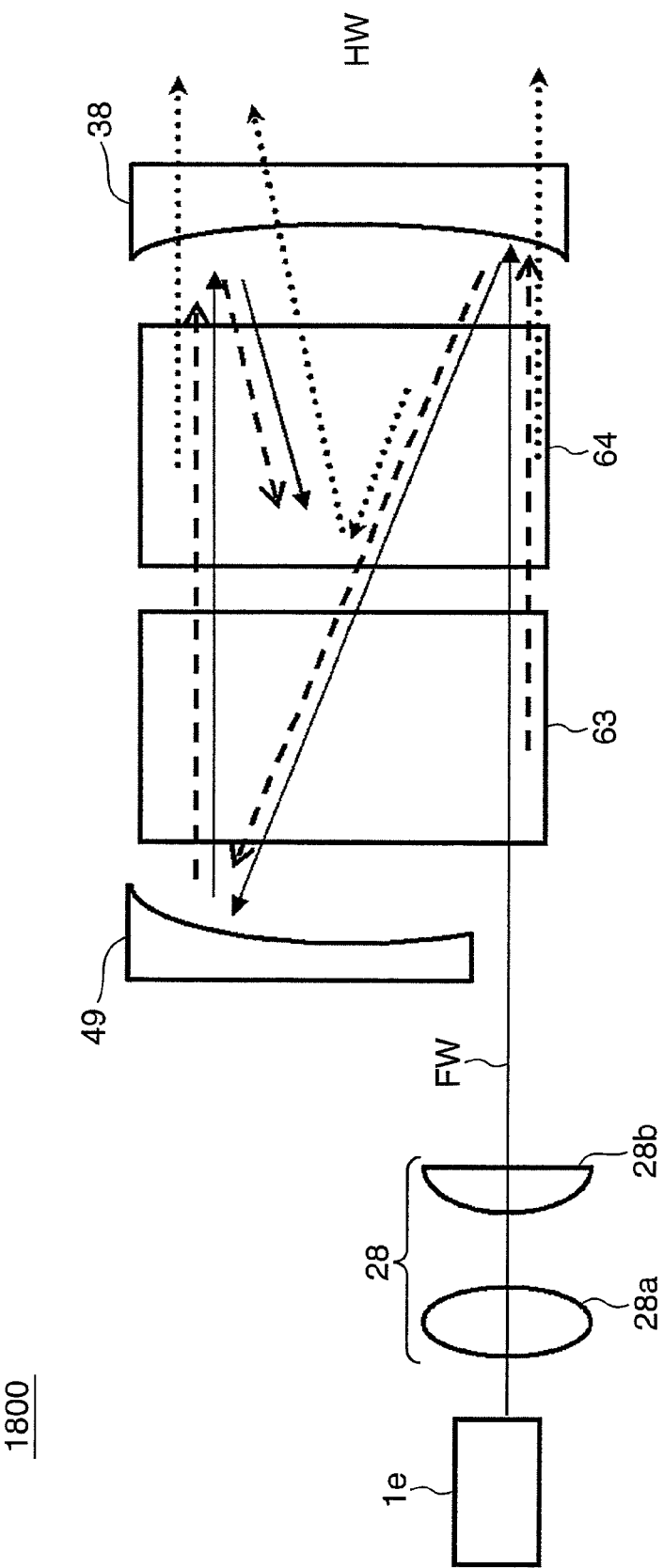

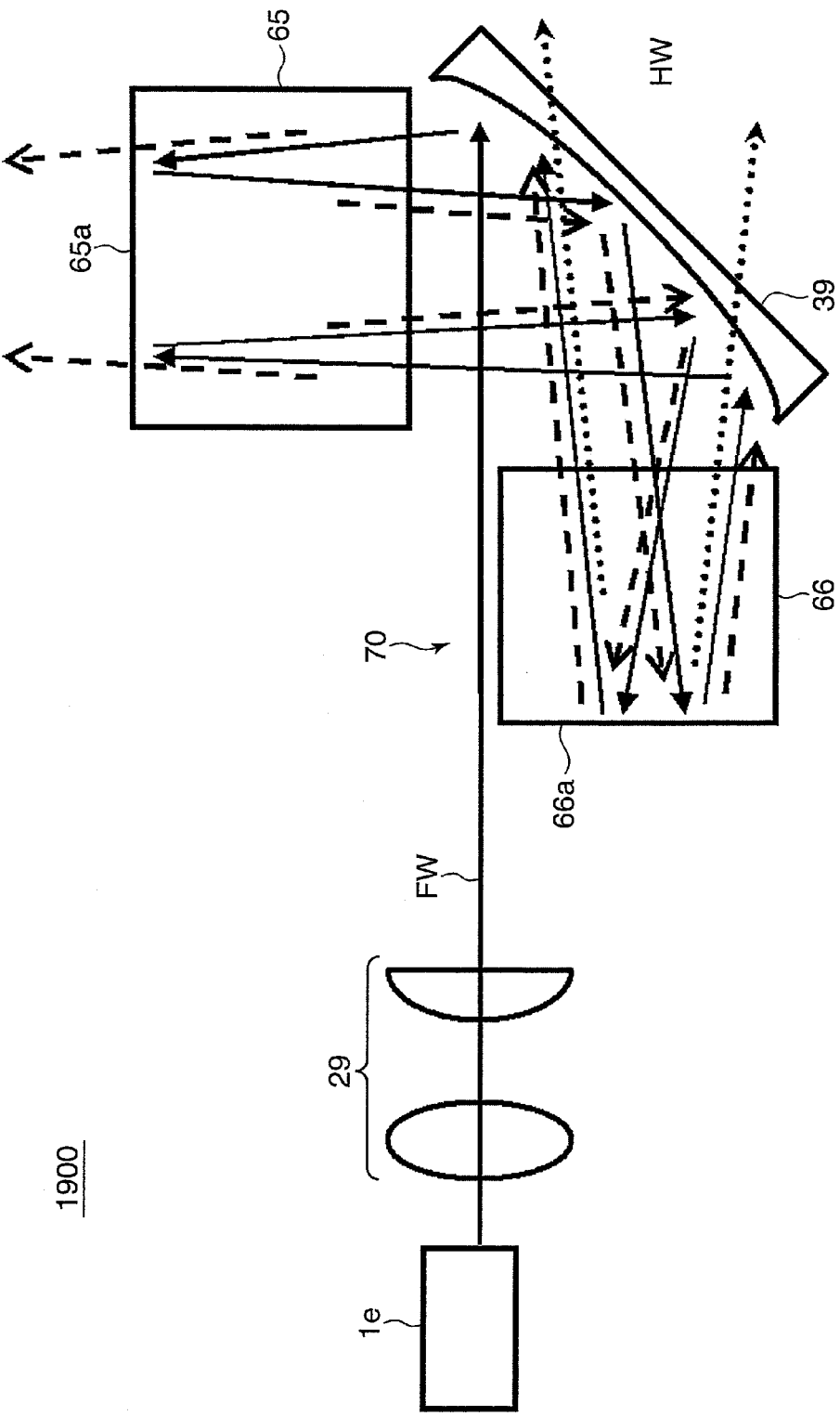

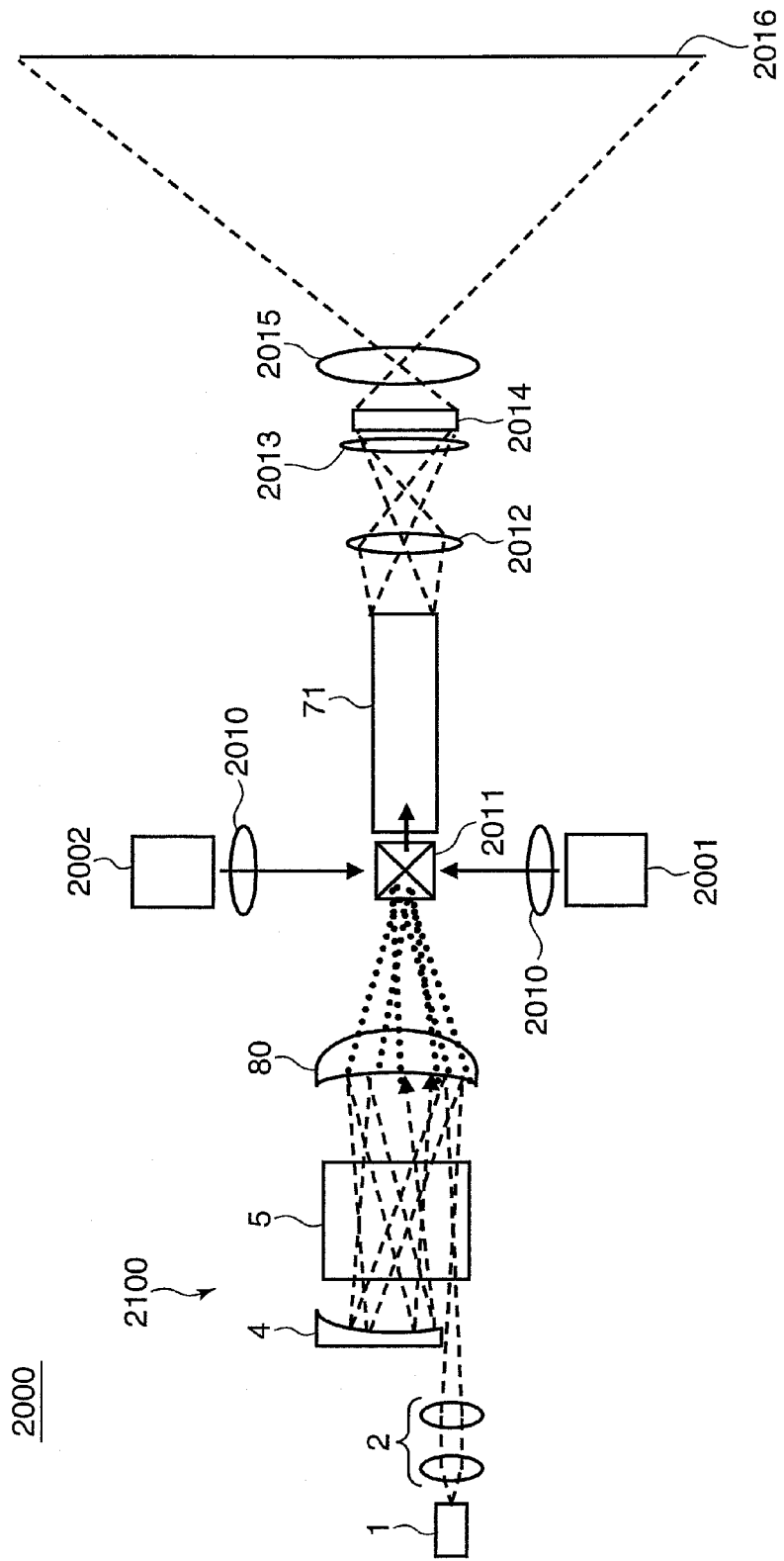

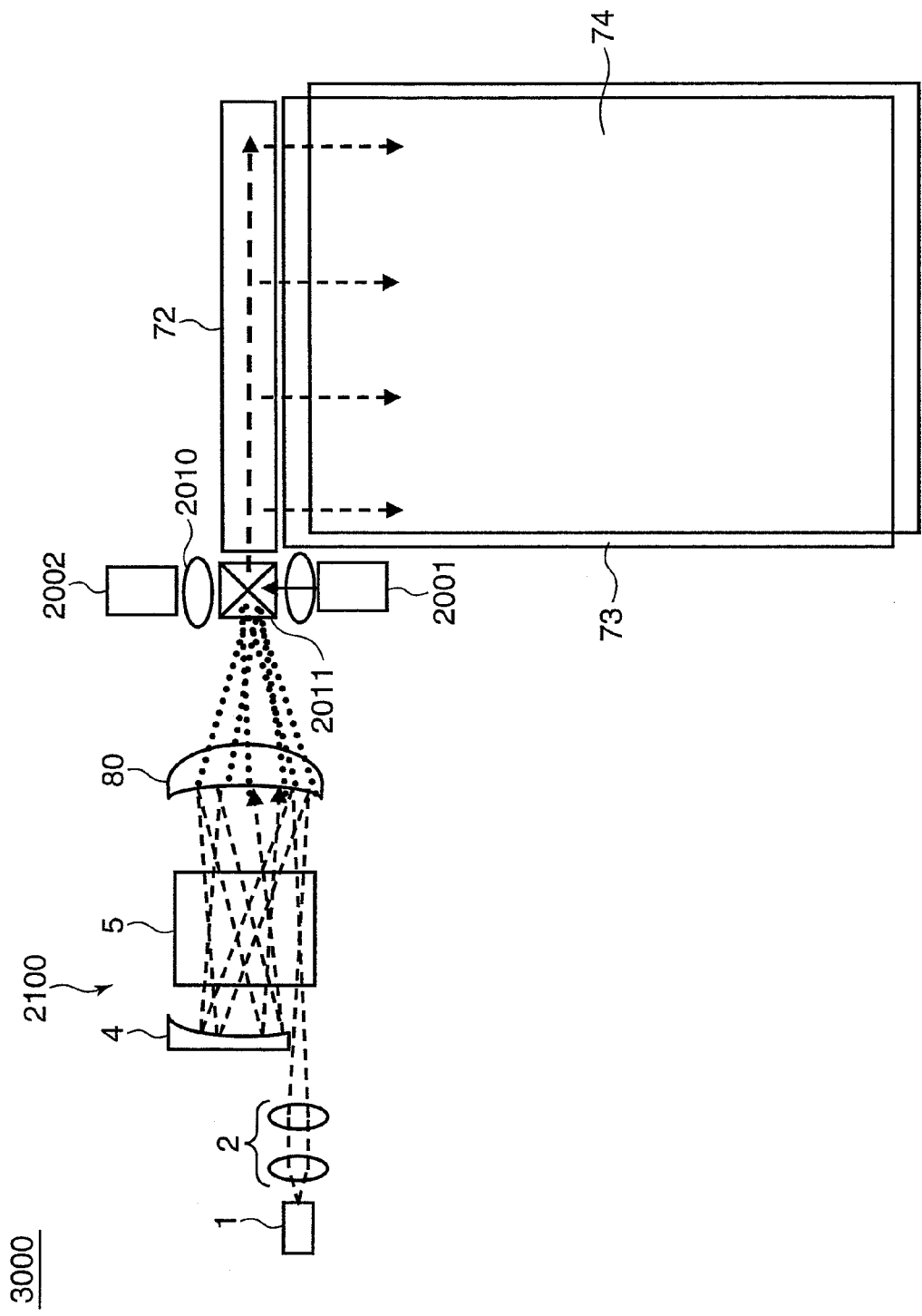

WAVELENGTH CONVERSION LASER DEVICE AND IMAGE DISPLAY DEVICE USING THE SAME

This application is entitled to the benefit of Provisional Patent Application No. 60/960,489, filed in United States Patent and Trademark Office on Oct. 1, 2007.

In addition, this application is based on Japanese patent application serial No. 2008-034133, filed in Japan Patent Office on Feb. 15, 2008, the contents of which are hereby incorporated by reference.

TECHNICAL FIELD

The present invention relates to a wavelength conversion laser device which outputs a wavelength-converted laser beam through wavelength conversion of a fundamental laser beam and also relates to an image display device using the same.

BACKGROUND ART

There has been a wavelength conversion laser device that performs wavelength conversion using a nonlinear optical phenomenon of a wavelength converter, so that the wavelength of a fundamental wave laser beam is converted to a converted wave laser beam, such as second harmonic generation (SHG), sum frequency generation, and difference frequency generation.

As shown in FIG. 27, for example, a wavelength conversion laser device is made up of a fundamental laser light source 101, a lens 102 that condenses a fundamental laser beam emitted from the fundamental laser light source 101, a wavelength converter 103 that generates a second harmonic wave of the condensed fundamental laser beam, and a dichroic mirror 104 which separates a fundamental laser beam from a harmonic laser beam.

The wavelength converter 103 is made of a nonlinear optical crystal and performs wavelength conversion of a fundamental wave by appropriately adjusting the orientation and the poled structure of the crystal and the like so that the fundamental wave and the converted wave are phase-matched. In particular, a wavelength converter using the poled structure is capable of performing wavelength conversion at high efficiency even at low power by pseudo phase matching, and is thereby capable of performing wavelength conversion in various manners according to designs. The poled structure referred to herein is a structure having a region in which the spontaneous polarization of the nonlinear optical crystal 103 is inverted periodically.

The conversion efficiency η for converting a fundamental wave into a second harmonic wave is expressed as:

$$\eta \propto L^2 P/A \times \sin c^2(\Delta kL/2)$$

where L is the interaction length of the wavelength converter, P is the power of the fundamental wave, A is the beam sectional area at the wavelength converter, and Δk is a shift from the phase matching condition. Under the suitable condensing condition for the interaction length L, the expression is rewritten as:

$$\eta \propto LP \times \sin c^2(\Delta kL/2).$$

The conversion efficiency can be increased by making the interaction length L longer. However, because tolerance ranges for a shift from the phase matching condition are inversely proportional to L, a problem arises in that strict conditions are required for the adjustment and the fundamental waves. In particular, with a high-output wavelength conversion laser device, the wavelength converter generates heat as the wavelength converter absorbs the fundamental wave and the converted wave. This heat generation makes the temperature of the wavelength converter inhomogeneous, which would result in lower conversion efficiency. This phenomenon is noticeable particularly for high intensity wavelength-converted laser beams.

Various proposals have been made to date in order to realize an improved conversion efficiency of the wavelength conversion laser device. For example, JP-A-11-44897 proposes the arrangement which increases the conversion efficiency with the use of a plurality of wavelength converters and light-collecting means. Also, JP-A-2006-208629 proposes a configuration to provide the wavelength converter with a reflector for a fundamental laser beam so that the fundamental laser beam re-enters into the wavelength converter. In addition, JP-A-2005-268780 proposes a configuration to dispose a wavelength converter between opposing reflection mirrors so as to perform wavelength conversion of a reciprocating fundamental laser beam. Further, JP-A-5-265058 proposes a configuration to inject a fundamental laser beam into a resonator, so that wavelength conversion is performed by condensing the fundamental laser beam to the optical axis of the resonator.

With the foregoing conventional structures, the conversion efficiency of the wavelength conversion laser device can be improved. However, they fail to find ways to realize wider tolerance ranges in view of a shift from the phase matching condition while maintaining high conversion efficiency. With wider tolerance ranges for a shift from the phase matching condition, it becomes possible to enhance the stability and the reliability of the device, which in turn make the device compact. Furthermore, when the power of the fundamental laser beam is concentrated to particular positions in the nonlinear optical crystal, the wavelength conversion efficiencies by the nonlinear optical crystal would be lowered due to light-induced damage and heat generation, resulting in unstable operations of the wavelength conversion laser device.

The foregoing conventional structures realize higher frequency conversion efficiencies when the wavelength conversion laser device outputs low power frequency converted laser beams. However, they fail to consider heat generation for high power frequency converted laser beams, and therefore such problems as lower conversion efficiencies and complex temperature controls for high power converted laser beams remain unsolved. The foregoing conventional structures also fail to wind ways to realize higher conversion efficiencies when adopting a multi-mode laser light source for the fundamental laser light source.

Furthermore, conventional wavelength conversion laser devices oscillate only a laser beam having a narrow spectrum width due to strict phase matching conditions, and large interference noises by laser beams raise additional problems in the field of video or the like.

SUMMARY OF THE INVENTION

An object of the present invention is to provide a wavelength conversion laser device capable of emitting high output power converted waves in a stable manner by widening tolerance ranges for shifts in phase matching conditions while increasing conversion efficiency.

Another object of the invention is to provide a low coherent wavelength conversion laser device that performs laser oscillation with a wide spectrum width.

A wavelength conversion laser device according to one aspect of the invention includes: a laser light source which emits a laser beam; two reflective surfaces which reflect therefrom a laser beam; a wavelength converter which converts a laser beam into a wavelength-converted laser beam, the wavelength converter being provided between the two reflective surfaces; and condensing optics which condense the laser beams to be injected between the two reflective surfaces, wherein at least one of the two reflective surfaces has a curvature for reflecting a laser beam to be re-injected into the wavelength converter between the two reflective surfaces repeatedly while forming multi paths of laser beams injected into the wavelength converter at different incident angles, and the condensing optics are arranged to disperse beam waists of the laser beams in the wavelength converter, which reciprocate between the two reflective surfaces.

According to the foregoing structure, it is possible to achieve a wavelength conversion laser device which permits improved conversion efficiency and stabilized high power emission while outputting low coherent wavelength-converted beams with reduced speckle noises.

An image display device according to another aspect of the invention includes: the foregoing wavelength conversion laser device in accordance with one aspect of the present invention; optics for superimposing a plurality of wavelength-converted laser beams emitted from the wavelength conversion laser device; and a modulator for modulating the wavelength-converted beams superimposed by the optics.

According to the foregoing structure, it is possible to achieve a wavelength conversion laser device which permits improved conversion efficiency and stabilized high power emission while outputting low coherent wavelength-converted beams with reduced speckle noises, and it is therefore suitably applied to image display devices. By superimposing a plurality of wavelength-converted beams emitted from the wavelength conversion laser device by the optics and modulating the wavelength-converted beams superimposed by the optics by the modulation element, a most desirable appropriate image display can be realized.

BRIEF DESCRIPTION OF THE DRAWINGS

FIG. 1A is a schematic view of a wavelength conversion laser device according to a first embodiment of the invention.

FIG. 1B is an explanatory view which explains a beam path of a fundamental laser beam in the wavelength conversion laser device according to the first embodiment of the invention.

FIG. 7A is a schematic top view of a wavelength conversion laser device according to a fifth embodiment of the invention.

FIG. 7B is a schematic side view of the wavelength conversion laser device according to the fifth embodiment of the invention.

FIG. 8A is a schematic top view of a wavelength conversion laser device according to a sixth embodiment of the invention.

FIG. 8B is a schematic side view of the wavelength conversion laser device according to the sixth embodiment of the invention.

FIG. 19 is a schematic perspective view of a wavelength conversion laser device according to a sixteenth embodiment of the invention.

FIG. 20 is a schematic perspective view of a wavelength conversion laser device according to a seventeenth embodiment of the invention.

FIG. 21A is a schematic top view of a wavelength conversion laser device according to an eighteenth embodiment of the invention.

FIG. 21B is a schematic side view of the wavelength conversion laser device according to the eighteenth embodiment of the invention.

FIG. 22 is a time chart showing an output waveform of a fundamental laser beam according to a nineteenth embodiment of the invention.

FIG. 23 is a schematic view of a wavelength conversion laser device according to a twentieth embodiment of the invention.

FIG. 24 is a schematic view of a wavelength conversion laser device according to a twenty-first embodiment of the invention.

FIG. 25 is a schematic view of an image display device according to a twenty-second embodiment of the invention.

FIG. 26 is a schematic view of an image display device according to a twenty-third embodiment of the invention.

BEST MODE FOR CARRYING OUT THE INVENTION

Figure 2:
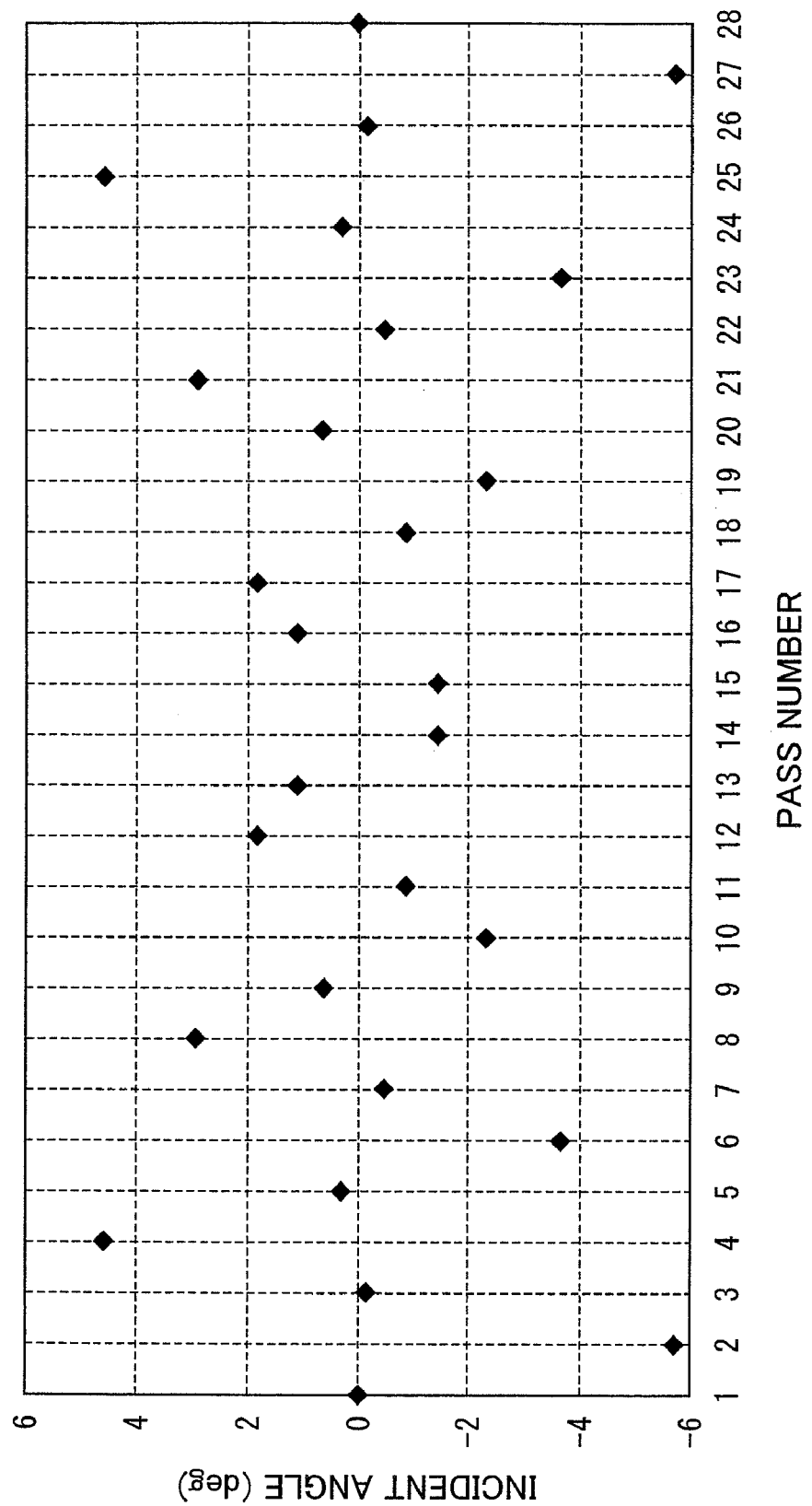
FIG. 2 is a view showing the relation of a pass of a fundamental laser beam and the incident angle of the fundamental laser beam into a wavelength converter in the first embodiment of the invention.

Hereinafter, embodiments of the invention will be described with reference to the drawings.

First Embodiment

FIG. 1A is a schematic view of a wavelength conversion laser device 100 according to a first embodiment of the invention. FIG. 1B explains fundamental beams which pass through a wavelength converter while changing an incident angle at the wavelength converter, in which only a principal ray FW of a fundamental laser beam is shown.

As shown in FIG. 1A, the wavelength conversion laser beam 100 includes a fundamental laser light source 1, condensing optics 2, a first concave mirror 3, a second concave mirror 4, and a wavelength converter 5. The first concave mirror 3 and the second concave mirror 4 are disposed so as to face one another, and the wavelength converter 5 is provided between the first concave mirror 3 and the second concave mirror 4.

A fundamental laser beam emitted from the fundamental laser light source 1 is controlled by the condensing optics 2 so that it is condensed to the focal point (beam waist position $P_{BW}$) and injected between the reflective surfaces made up of the first concave mirror 3 and the second concave mirror 4. The fundamental laser beam then enters into the wavelength converter 5 provided between the first concave mirror 3 and the second concave mirror 4 and a part thereof is converted to a second harmonic wave by the wavelength converter 5 (first pass).

The fundamental laser beam and the second harmonic laser beam having passed through the wavelength converter 5 (first pass) reach the first concave mirror 3. A coating that reflects the fundamental laser beam and transmits the second harmonic laser beam (wavelength-converted laser beam) is applied on the concave surface of the first concave mirror 3. Accordingly, the fundamental laser beam is reflected from the first concave mirror 3 whereas the second harmonic wave laser beam (wavelength-converted laser beam) passes through the first concave mirror 3 to be outputted.

The fundamental laser beam is reflected from the first concave mirror 3 and is re-entered into the wavelength converter 5, and a part thereof is converted to a second harmonic wave (second pass).

The fundamental laser beam and the second harmonic laser beam having passed through the wavelength converter 5 (second pass) reach the second concave mirror 4. Herein, a coating that reflects both the fundamental laser beam and the second harmonic laser beam is applied on the concave surface of the second concave mirror 4. Accordingly, both the fundamental laser beam and the second harmonic laser beam are reflected from the second concave mirror 4 and are re-entered into the wavelength converter 5. Then, a part of the re-entered fundamental laser beam is converted to a second harmonic wave by the wavelength converter 5 (third pass).

The fundamental laser beam and the second harmonic laser beam having passed through the wavelength converter 5 (third pass) again reach the first concave mirror 3. The second harmonic laser beam passes through the first concave mirror 3 to be outputted, whereas the fundamental laser beam is reflected from the first concave mirror 3 and re-enters into the wavelength converter 5 (fourth pass).

By repeating the actions as above, the fundamental laser beam repetitively passes through the wavelength converter 5 (first pass, second pass, . . . , and n' th pass) while it reciprocates between the two reflective surfaces of the first concave mirror 3 and the second concave mirror 4, while being converted into a wavelength-converted laser beam by each pass.

The fundamental laser beam stops reciprocating between the reflective surfaces after it has reciprocated between the reflective surfaces several times to several ten times according to the curvature of the reflective surfaces (first concave mirror 3 and second concave mirror 4) and the alignment condition thereof as well as the settings of the condensing optics 2. Wavelength-converted laser beams generated until the fundamental laser beam stops reciprocating are outputted from the first concave mirror 3 in this embodiment.

The conversion efficiency η of the fundamental laser beam to the second harmonic waves by the wavelength converter 5 can be expressed as:

$$\eta \propto L^2 P/A \times \sin c^2(\Delta k L/2) \quad (1)$$

where L is the interaction length of the wavelength converter 5, P is the power of the fundamental laser beam, A is the beam sectional area of the fundamental laser beam at the wavelength converter 5, and Δk is a shift of the phase from the phase matching condition.

As can be seen from the above expression (1), the conversion efficiency is high in the region with a small beam sectional area of the fundamental laser beam in the wavelength converter 5. Namely, the conversion efficiency becomes remarkably high at the beam waist position $P_{BW}$ of a fundamental laser beam in the wavelength converter 5 where the fundamental laser beam passes through. In the present embodiment, the condensing optics 2 are arranged at a specific position on a beam path along which the fundamental laser beam is injected between the reflective surfaces 3 and 4, so that the beam waist positions $P_{BW}$ of the fundamental laser beams can be dispersed in the wavelength converter 5 while the fundamental laser beam reciprocates between the reflective surfaces 3 and 4.

When the beam waist positions $P_{BW}$ are concentrated in the wavelength converter disposed between the reflective surfaces, there arise problems that the wavelength converter breaks due to light-induced damage and the wavelength conversion becomes unstable at the position where the beam waist points $P_{BW}$ are concentrated. These problems, however, can be solved by dispersing the beam waists $P_{BW}$ of the fundamental laser beams in the wavelength converter as in the foregoing structure of the present embodiment.

In particular, let f1 and f2 be focal lengths of the first concave mirror (first reflective surface) 3 and the second concave mirror (second reflective surface) 4, respectively, then, in a confocal alignment where the distance between the reflective surfaces is given by f1+f2 (in a case where the refractive index of the wavelength converter is not considered), the beam waist positions of the fundamental laser beam are concentrated on the confocal point of the two reflective surfaces. This concentration raises problems, such as light-induced damage on the wavelength converter and instability of wavelength conversion.

In the present embodiment, however, by adjusting the beam waist positions $P_{BW}$ of the fundamental laser beam by the condensing optics 2, it becomes possible to achieve a stable output of the wavelength conversion laser device even when the confocal alignment is used. More specifically, in the first embodiment, the beam waist $P_{BW}$ of the fundamental laser beam is formed by the condensing optics 2 before it goes incident on the first reflective surface as shown in FIG. 1A to avoid the beam waists from being formed at the confocal point of the first and second reflective surfaces in several passes. Accordingly, the wavelength conversion is performed at the different beam waist positions $P_{BW}$ dispersed in the wavelength converter 5, thereby obtaining wavelength-converted laser beams under stable conditions. By scattering the beam waist positions $P_{BW}$ by the condensing optics 2, it becomes possible to perform wavelength conversion by beam passes having different phase matching conditions at the respective beam waist positions $P_{BW}$ in a stable manner. This is the essential structure of the present embodiment capable of extracting wavelength-converted laser beams to be summed up in a stable manner.

FIG. 2 is a graph showing the relation of the pass number of the fundamental laser beam and the incident angle of each beam pass into the wavelength converter 5 according to the first embodiment of the invention.

In the first embodiment, the first concave mirror 3 having the focal length f1 of 25 nun and the second concave mirror 4 having the focal length f2 of 20 mm are used. The second concave mirror 4 is cut off to be smaller than the first concave mirror 3, to allow a fundamental laser beam to be injected between the two reflective surfaces from this cut-off portion. The principal ray axis ML linking the respective centers of the two reflective surfaces is, as shown in FIG. 1B, an optical axis linking the centers of curvatures of the both reflective surfaces. Owing to the condensing optics 2, the fundamental laser beam enters into the wavelength converter 5 and the first concave mirror 3 to be parallel to the principal ray axis ML. As the wavelength converter 5, MgO:LiNbO$_3$ (length: 26 mm and width: 10 mm) having the poled structure is used. A distance between the reflective surfaces is set to 58.4 mm and it is shifted slightly from the confocal alignment. As shown in FIG. 2, the fundamental laser beam repetitively passes through the wavelength converter 5 by reciprocating between the reflective surfaces while changing the incident angle at the wavelength converter 5.

The phase matching condition referred to herein is a condition under which wavelength converted beams generated by a nonlinear optical material (wavelength converter) are phase-matched and the wavelength conversion efficiency reaches the maximum ($\Delta k=0$). The phase matching condition is determined by the wavelength of a laser beam, the refractive index of the nonlinear optical material, the incident angle of the laser beam, periods of the poled structure in the wavelength converter, and so forth. In a case where the wavelength conversion is performed by the conventional structure, the refractive index of the nonlinear optical material is adjusted by temperatures and the incident angle of a laser beam is adjusted so as to be matched with the phase matching condition. With the conventional structure, shifts in temperatures or incident angles would result in phase matching conditions ($\Delta k>0$) and a lower conversion efficiency. Furthermore, shifts in wavelengths would cause shifts in phase matching condition, and therefore re-adjustment or modification of the structure are required.

In the present embodiment, because the incident angle at the wavelength converter is changed for each pass, various factors (the wavelength of a laser beam, the refractive index (temperature) of the nonlinear optical material, the poling period, and so forth) satisfying the phase matching condition also vary from one pass to another. Accordingly, the wavelength conversion laser of the present embodiment has a plurality of phase matching conditions. In a case where wavelength conversion to a certain laser beam wavelength is performed, because there is more than one temperature satisfying the phase matching condition, even when the temperature shifts from a given phase matching condition, the temperature matches the phase matching conditions for other passes. It is therefore possible to compensate for a lower conversion efficiency.

Figure 3:
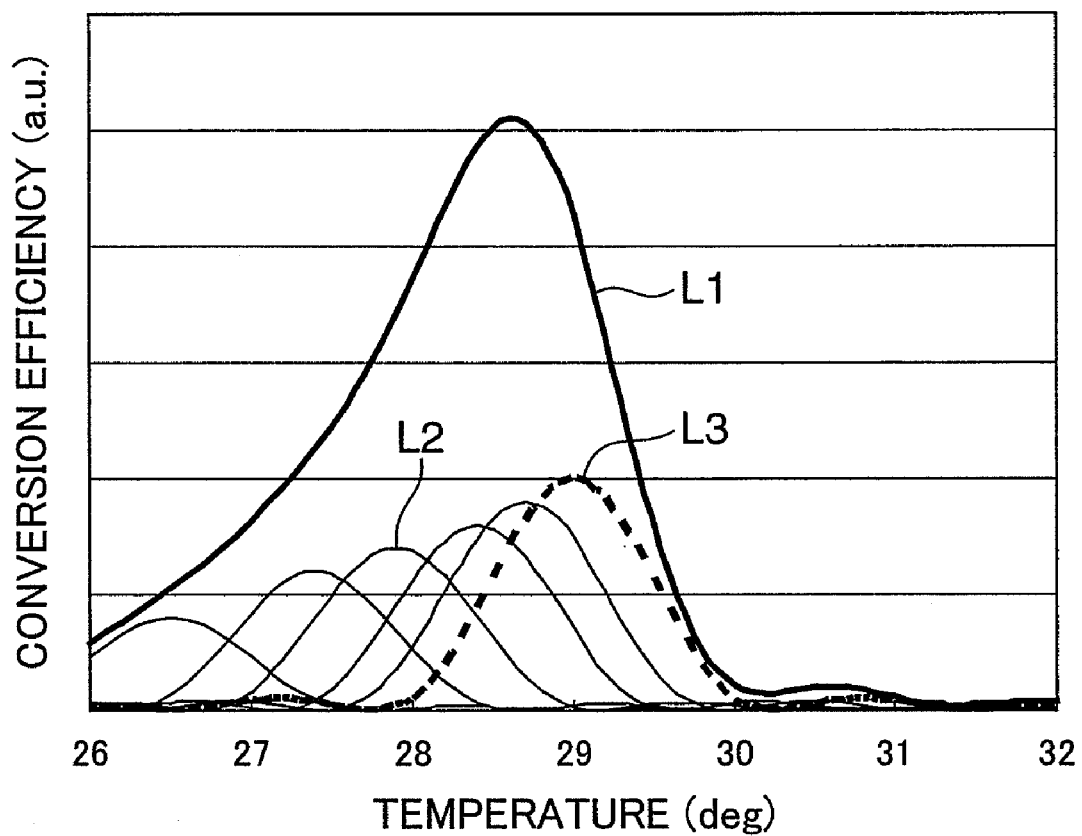
FIG. 3 is a view showing the relation of the temperature of the wavelength converter and the conversion efficiency in the first embodiment of the invention.

FIG. 3 shows a relation of the temperature of the wavelength converter 5 and the conversion efficiency in the first embodiment. Referring to FIG. 3, L1 denotes total conversion efficiency in the present embodiment, L2 denotes the conversion efficiency by each pass in the present embodiment, and L3 denotes the conversion efficiency by the conventional structure.

In the first embodiment, the temperature satisfying the phase matching condition differs for each pass because the incident angle of the fundamental laser beam at the wavelength converter 5 differs in each pass. The overall conversion efficiency, which is found by adding up the conversion efficiency of each pass, is hardly lowered even when the temperature of the wavelength converter 5 drops. In the case of the conventional structure shown in FIG. 27, the full width at half maximum of conversion efficiency is 1.1 degrees. On the contrary, the full width at half maximum of the conversion efficiency in the first embodiment is 2.6 degrees. The structure of the present embodiment therefore realizes two or three times wider tolerance ranges than that of the conventional structure. Moreover, an improved total conversion efficiency can be realized in a wider temperature range as compared to the conventional structure by arranging the fundamental laser beams to be repetitively injected into the wavelength converter 5. In the first embodiment, total conversion efficiency is high and conversion efficiency reaches 60% or higher, which is twice as high as the conversion efficiency of the conventional structure.

In the wavelength conversion laser device 100 of the present embodiment, the wavelength converter 5 is disposed between two reflective surfaces each reflecting therefrom a laser beam and having a curvature, and a laser beam is injected between the reflective surfaces by the condensing optics 2 from a portion without a reflection coating. By allowing the laser beam to reciprocate between the reflective surfaces to repetitively pass through the wavelength converter 5 while changing an incident angle at the wavelength converter 5, the wavelength conversion is repetitively performed with shifts in phase matching conditions. Here, the characteristic feature lies in that the condensing optics 2 are arranged to disperse beam waist positions $P_{BW}$ of laser beams in the wavelength converter 5, which reciprocate between the two reflective surfaces. Additionally, at least one of a pair of the reflective surfaces disposed so as to face one another transmits the wavelength-converted laser beams to emit the wavelength-converted laser beams. According to the structure described above, the tolerance ranges for phase matching conditions for temperatures and the like are widened by having more than one phase matching condition while maintaining high conversion efficiency. It is therefore possible to obtain wavelength-converted laser beams that are stable against environmental changes. Also, by dispersing the beam waist positions $P_{BW}$ of the laser beam in the wavelength converter 5, it becomes possible to obtain high-output wavelength-converted laser beams with which light-induced damage on the wavelength converter 5 and instability of wavelength conversion are eliminated.

In the first embodiment, a fiber laser having the center wavelength of 1064 nm and the spectrum full width at half maximum of 0.1 nm is used as the fundamental laser light source 1. However, the fundamental laser light source 1 is not limited to the foregoing example, and other than a fiber laser, for example, a solid-state laser, a semiconductor laser, a gas laser, a wavelength conversion laser, and so forth can be adopted. Additionally, in the first embodiment, wavelength conversion to second harmonic waves is performed. However, the wavelength conversion laser device 100 of the present embodiment can be used for wavelength-converted laser beam generation, such as sum frequency generation, difference frequency generation, and optical parametric oscillation, with an appropriate selection for the laser light source.

The first embodiment is a preferable embodiment in which let D be the distance between two reflective surfaces, f1 and f2 be the respective focal lengths of the two reflective surfaces, and L be the length of the wavelength converter, then the following relationship holds:

$$f1+f2<D<f1+f2+L \quad (2).$$

In the first embodiment, D is set to 58.4 mm when f1 is 25 mm, f2 is 20 mm, and L is 26 mm. When the distance D between the reflective surfaces is set so as to satisfy the above expression (2), total conversion efficiency to the wavelength-converted laser beams can be increased because it is close to the confocal alignment of the two reflective surfaces and the fundamental laser beams pass through the wavelength converter 5 a greater number of times as the number of reciprocation times of the beam pass increases. The focal length of the reflective surface is, in the case of a lens having an asymmetric reflective surface, a focal length in a direction in which an incident beam injected between the reflective surfaces shifts with respect to the principal ray axis ML. Let n be the refractive index of the wavelength converter, then it is preferable that the distance D between the reflective surfaces satisfies the condition of:

$$D \neq f1+f2+(1-1/n) \times L (=\text{confocal alignment}) \quad (3).$$

The confocal alignment referred to herein is the distance D at which the focal points of the two reflective surfaces are present at the same position. In a case where the distance D between the reflective surfaces is set to the confocal alignment, a laser beam may converge to the principal ray axis ML, which may possibly give rise to light-induced damage on the wavelength converter and instability of wavelength conversion at a high output. It is therefore preferable to set the distance D between the reflective surfaces to fall within the range satisfying the above expression (2), at which positions the reflective surfaces are slightly displaced from the confocal alignment. To be more concrete, the distance D is set so that two reflective surfaces are disposed at positions displaced by about 0.1 mm to 3 mm from the confocal alignment. It is particularly preferable to set the distance D to fall within a range so that the distance is shorter by 0.1 mm to 3 mm from the confocal alignment. By shortening the distance by the range specified above from the distance between the two reflective surfaces in the confocal alignment, not only it becomes possible to prevent the fundamental laser beam from converging to the focal positions of the reflective surfaces by ensuring the number of reciprocation times of the fundamental laser beam between the reflective surfaces, but it also becomes possible to increase margins for the fundamental laser beam injected between the reflective surfaces and the effective diameter of the second concave mirror 4 (second reflective surface). The effective diameter of the reflective surface referred to herein is a length in the longitudinal direction of a range within which a laser beam hits the reflective surface.

As shown in FIG. 1A, the condensing optics 2 of the first embodiment is made up of a fiber collimator 2a and a plano-convex lens 2b. The condensing optics 2 controls a fundamental laser beam so that it is condensed inside the wavelength converter 5 at a point other than the focal points of the two reflective surfaces for the beam waist positions $P_{BW}$ of the fundamental laser beam reciprocating between the reflective surfaces to be dispersed in the wavelength converter 5. At the focal points of the two reflective surfaces, overlapping of the laser beam may occur, which possibly gives rise to breaking of the wavelength converter and instability of wavelength conversion. Likewise, in a case where wavelength conversion is performed intensively at one point, breaking of the wavelength converter and instability of wavelength conversion possibly occur. In the wavelength converter, the wavelength conversion is performed intensely at the condensed beam waist positions $P_{BW}$. However, the beam waist positions $P_{BW}$ are dispersed at positions other than the focal points of the two reflective surfaces. In the present embodiment, by performing wavelength conversion at the beam waist positions $P_{BW}$ dispersed in the wavelength converter 5, wavelength-converted laser beams can be outputted in a stable manner. It should be noted here a problem is not raised when the beam waist positions $P_{BW}$ of the laser beam converge to the focal positions of the two reflective surfaces after repetitively carrying out the wavelength conversion at the beam waist positions $P_{BW}$ dispersed in the wavelength converter 5.

As shown in FIG. 1A, the present embodiment is a preferable embodiment wherein a fundamental laser beam is condensed by the condensing optics 2 between the reflective surfaces of the first concave mirror 3 and the second concave mirror 4 before it is reflected from the first concave mirror 3. By having a focal point (beam waist position $P_{BW}$) between the reflective surfaces before the fundamental laser beam is reflected from the reflective surface, it is possible to form the beam waists in many laser beam passes none of which passes by the vicinity of the focal points of the reflective surfaces.

According to the structure of the present embodiment, a beam waist is formed between the reflective surfaces before a fundamental laser beam is first reflected from one of the reflective surfaces. It is therefore possible to disperse many beam waist positions in a wide range in the wavelength converter 5, which in turn realizes a wavelength conversion under stable conditions even with a high output power. The foregoing characteristic feature that a wavelength conversion is performed also before the laser beam is first reflected from one of the reflective surfaces (the first concave mirror 3), offers an effect that by monitoring the laser beam subjected to the wavelength conversion in the first pass in the wavelength converter, it is possible to adjust the wavelength-converted beams independently of the reflective surfaces, which makes it possible to manufacture a compact wavelength conversion laser device. Furthermore, the foregoing characteristic feature offers another effect that the total conversion efficiency can be improved.

In the first embodiment, spherical concave mirrors are used as the two reflective surfaces. It should be appreciated, however, that spherical or flat reflective surfaces can be used as well. At least one of the two reflective surfaces has a curvature to bend the beam path of a laser beam, so that the laser beam reciprocates between the reflective surfaces plural times and the beam waists of the laser beam are formed between the reflective surfaces. A combination of two reflective surfaces can be designed freely. It is sufficient to allow a laser beam to enter into the wavelength converter provided between the two reflective surfaces at two incident angles, at least, by reflecting the laser beam from the two reflective surfaces plural times.

At least one of the two reflective surfaces transmits wavelength-converted laser beams so as to output the wavelength-converted laser beams. In the first embodiment, the first concave mirror 3 transmits wavelength-converted second harmonic waves. The first concave mirror 3 reflects the fundamental laser beam (wavelength: 1064 nm) at reflectance of 99.5% and transmits the second harmonic laser beam (wavelength: 532 nm) at transmittance of 99%. The second concave mirror 4 reflects both the fundamental laser beam and the second harmonic laser beam at reflectance of 99.5% for the fundamental wave (1064 nm) and at reflectance of 99% for the second harmonic wave (532 nm). It is preferable that the reflective surface has higher reflectance for the laser beam (fundamental wave) because a loss is lessened. It may be configured in such a manner that both of the two reflective surfaces transmit the wavelength-converted laser beams or only one reflective surface transmits the wavelength-converted laser beams.

In the first embodiment, MgO:LiNbO$_3$ (periodically poled lithium niobate, abbreviated as PPLN) having the poled structure is used as the wavelength converter 5, and it is of a rectangular prism shape (length: 26 mm, width: 10 mm, and thickness: 1 mm). The wavelength converter 5 is made of a nonlinear optical crystal capable of performing wavelength conversion. For example, nonlinear optical crystals, such as KTP, LBO, CLBO, and LT, can be used as the wavelength converter 5. In particular, because the wavelength converter 5 having the poled structure and performing pseudo phase matching can form different phase matching conditions within the same frequency converter depending on the poling periods, it is preferable to use the wavelength converter 5 in the wavelength conversion laser device of the present embodiment. As described, by having different phase matching conditions in the same frequency converter, it is possible to realize wider tolerance ranges for the temperature or the wavelength as the overall wavelength conversion laser device.

The wavelength converter 5 of the first embodiment is disposed so as to have an incident surface perpendicular to the principal ray axis ML. The poled structure in the wavelength converter 5 is formed at periods parallel to the incident surface, and the poling period is about 7 μm. The poling period described above is not necessarily the same in the frequency converter, and the poled structure may be formed by changing the period or the direction. An AR (Anti Reflection) coating for the laser beam (fundamental wave) and the wavelength-converted laser beam (second harmonic wave) is applied on the incident and emitting surfaces of the wavelength converter 5. In order to avoid unnecessary reflection between the reflective surfaces, it is preferable to form the AR coating for the laser beam and the wavelength-converted laser beam on the wavelength converter 5 in this manner.

In the first embodiment, the first concave mirror 3 has the effective diameter of ϕ5 mm, the second concave mirror 4 has the effective diameter of ϕ4 mm, the width in which the laser beam reciprocates in the wavelength converter 5 is 5 mm, and the wavelength conversion laser device is of a compact elongate shape, from which high-power wavelength-converted laser beams can be outputted in a stable manner. The first embodiment is a preferable embodiment in which the fundamental laser beam going incident on the first concave mirror 3 has the beam diameter of ϕ0.3 mm and the beam diameter of the fundamental laser beam injected between the reflective surfaces is 1/5 or less of the effective diameter of the reflective surface (second concave mirror) 4 that is one of the two reflective surfaces having the smaller effective diameter. Because the beam diameter of the fundamental laser beam injected between the reflective surfaces is sufficiently small for the effective diameters of the reflective surfaces, not only can overlapping of the fundamental laser beam between the reflective surfaces be relaxed, but also the number of reciprocation times of the laser beam between the reflective surfaces can be increased. Owing to relaxation of overlapping and an increase of the number of reciprocation times as above, the wavelength conversion laser device of the first embodiment can be compact yet capable of achieving both a high output and high conversion efficiency. It should be noted that when the diameter of an incident beam is made larger than 1/5 of the effective diameter of the reflective surface in the structure of the first embodiment, the number of reciprocation times between the reflective surfaces is reduced to about three and the conversion efficiency is lowered.

In the first embodiment, the center wavelength λ of the fundamental laser beam emitted from the fundamental laser light source 1 is 1064 nm, the spectrum full width at half maximum Δλ is 0.1 nm, and the coherence length ($\lambda^2/\Delta\lambda$) is 11.3 mm. Because the distance D between the reflective surfaces is set to 58.4 mm, the coherence length of the laser beam is less than twice the distance between the reflective surfaces. The present embodiment has a preferable feature in that the coherence length of the fundamental laser beam is less than two times the distance between the reflective surfaces. If the coherence length of the laser beam is set two or more times the distance between the reflective surfaces, an interference is likely occur at overlapping points of the laser beams reciprocating between the reflective surfaces, which raises problems associated with the breaking of the wavelength converter and the instability of wavelength conversion at a point caused by the interference at which the beam intensity is high. The present embodiment solves a problem of coherence by making the coherence length of the fundamental laser beam reciprocating between the reflective surfaces shorter than the reciprocating distance.

Additionally, in the first embodiment, the fundamental laser beam is repetitively reflected from the first concave mirror 3 and the second concave mirror 4 to form at least three beam waists in the wavelength converter 5. In this instance, as shown in FIG. 1A, the beam waists are numbered as i, ii and iii sequentially from the one formed first by the condensing optics 2. In the present embodiment, the beam waist radius at the beam waist i formed first by the condensing optics 2 is 75 μm. As the fundamental laser beam is reflected from the first concave mirror 3 (f1: 25 mm) and the second concave mirror 4 (f2: 20 mm), the beam waist radius at the beam waist ii is reduced to 60 μm, and the beam waist radius at the beam waist iii is reduced further to 48 μm. The first embodiment is a preferable embodiment in which at least three beam waists $P_{BW}$ are dispersed in the wavelength converter 5 by the condensing optics and the two reflective surfaces each having a curvature, and let i, ii, and iii be the beam waists $P_{BW}$ sequentially from the one that the fundamental laser beam forms first in the wavelength converter 5 and r_i, r_ii, and r_iii be the radii of these beam waists, then the following relationship holds:

r_i>r_ii>r_iii.

The wavelength conversion laser device 100 of the present embodiment generates wavelength-converted beams by multi passes by which the fundamental laser beam passes through the wavelength converter 5. The power, however, is lowered while the fundamental laser beam repetitively undergoes wavelength conversion. In a region of the wavelength converter 5 where the beam waist is formed first or at the initial stage, because the power of the fundamental laser beam is high, the pass in this instance may possibly give rise to breaking of the wavelength converter 5 and instability of wavelength conversion in comparison with the passes thereafter. According to the wavelength conversion laser device of the present embodiment, the power density of the fundamental laser beam is liable to be increased, particularly for the first two beam waist positions $P_{BW}$.

In response, according to the structure of the present embodiment, by adjusting the power density of the laser beam by reducing the beam waist radii sequentially from the beam waist formed first in the wavelength converter 5, it is possible to prevent a breaking of the wavelength converter 5 or the like, and to perform a wavelength conversion under stable conditions. Furthermore, total wavelength conversion efficiency can be increased by suppressing a reduction in conversion efficiency resulting from a drop in power of the laser beams that pass at later times.

According to the structure of the present embodiment, by reducing the radii of the beam waists sequentially from the radius of the beam waist formed first or in an initial stage to those formed subsequently, it is possible to suppress the power density of a fundamental laser beam, and to perform wave conversion under stable conditions.

It is more preferable to arrange such that at least five beam waists $P_{BW}$ are dispersed in the wavelength converter 5 and set the radii of the beam waists to establish a relation: r_i>r_ii>r_iii>r_iv>r_v. With the structure wherein the radii of the five beam waists are reduced sequentially from the beam waist i formed first, it is possible to realize a still higher wavelength conversion efficiency and stable wavelength conversion at the same time.

Second Embodiment

Figure 4:
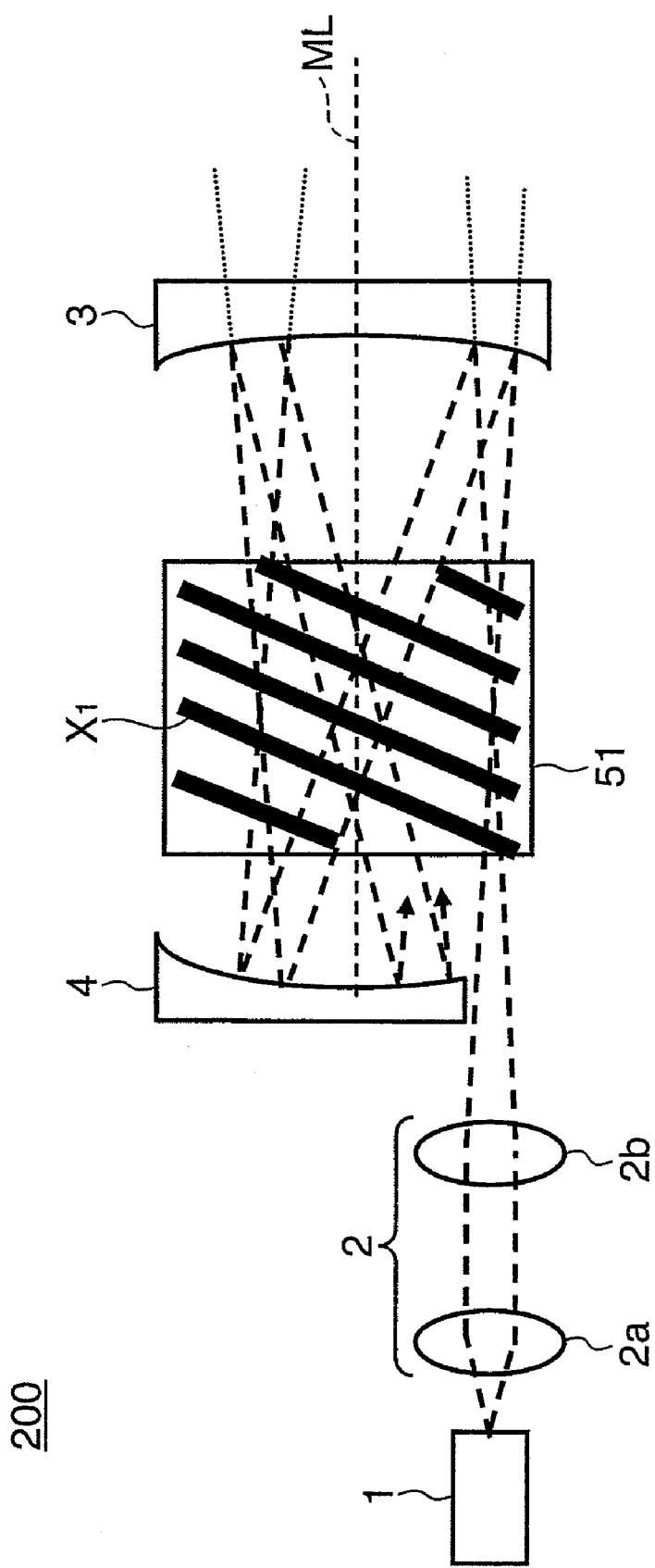
FIG. 4 is a schematic view of a wavelength conversion laser device according to a second embodiment of the invention.

FIG. 4 shows a schematic view of a wavelength conversion laser device 200 according to a second embodiment. Members having the same structures and functions as those of the first embodiment above are designated by the same reference numerals. The wavelength conversion laser device 200 shown in FIG. 4 includes a fundamental laser light source 1, condensing optics 2, a first concave mirror 3, a second concave mirror 4, and a wavelength converter 51.

The wavelength converter 51 of the wavelength conversion laser device 200 is made of a nonlinear optical crystal having the poled structure, and the poled structure $X_1$ is formed so as to incline with respect to the principal ray axis ML, which is an optical axis linking the centers of the two reflective surfaces. As shown in FIG. 4, the poled structure is formed at periods inclined from the principal ray axis ML with respect to the traveling direction of a beam. In the wavelength conversion laser device 200 of this embodiment, as shown in FIG. 2, a fundamental laser beam repetitively enters into the wavelength converter 51 while changing an incident angle at the wavelength converter 51. Changing the incident angle of the fundamental laser beam into the wavelength converter 51 having the poled structure $X_1$ means that the poling period changes with the incident angle.

Incidentally, in a case where the poled structure $X_1$ is parallel to the incident plane in the wavelength converter, the poling period becomes longer in response to the absolute value of the incident angle of the fundamental laser beam. Accordingly, in the first embodiment above, a variable range of the phase matching conditions is a range of the incident angle from 0 degree to 5.7 degrees, which is the maximum incident angle.

When the fundamental laser beam is reflected from the two reflective surfaces plural times, the incident angle of the fundamental laser beam into the wavelength converter varies within almost the same range in both the plus direction and the minus direction. In the wavelength conversion laser device 200 of the second embodiment, by inclining the poled structure $X_1$ with respect to the principal ray axis ML, a change of the poling period caused by a pass of a laser beam can be comparable to a sum of the incident angle and the angle of inclination of the poled structure.

The second embodiment is a preferable embodiment in which a variable range of the phase matching conditions can be widened by forming the poled structure $X_1$ so as to incline with respect to the principal ray axis ML. By inclining the poled structure $X_1$ with respect to the principal ray axis ML, wider tolerance ranges of the wavelength conversion laser device can be realized for temperatures and wavelengths of the fundamental laser beam.

In particular, by providing the poled structure at or greater than the angle of the laser beam in the wavelength converter when the incident angle of the fundamental laser beam is the maximum, a variable range of the phase matching conditions can be about two times the range of the first embodiment above. The present embodiment is therefore a preferable embodiment to fully utilize a change of the incident angle. In order to incline the poled structure from the principal ray axis ML, it may be configured in such a manner that the wavelength converter itself is inclined from the principal ray axis ML.

Third Embodiment

Figure 5:
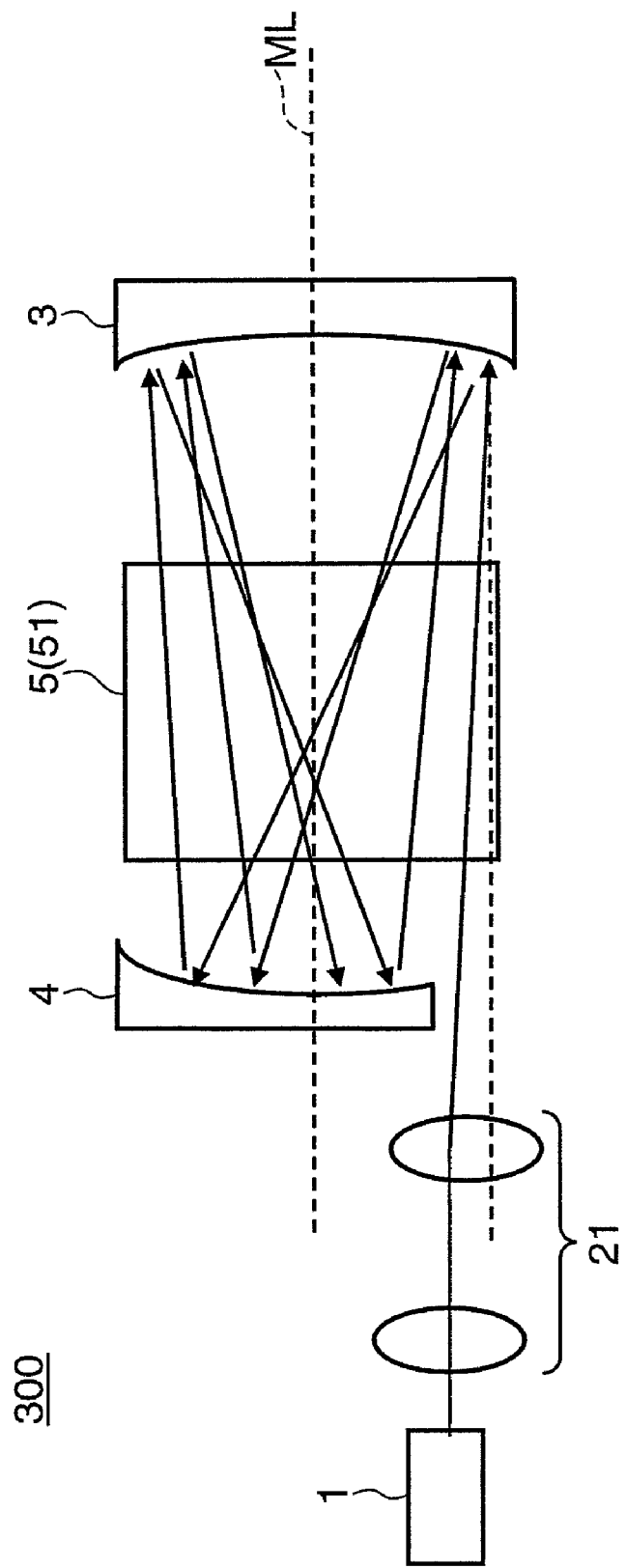
FIG. 5 is an explanatory view which explains the schematic structure of a wavelength conversion laser device according to a third embodiment of the invention and a beam path of a fundamental laser beam therein.

FIG. 5 is a view schematically showing a beam path of a principal ray FM of the fundamental laser beam in a wavelength conversion laser device 300 according to a third embodiment. Members having the same structures and functions as those of the first and second embodiments above are designated by the same reference numerals. The wavelength conversion laser device 300 shown in FIG. 5 includes a fundamental laser light source 1, condensing optics 21, a first concave mirror 3, a second concave mirror 4, and a wavelength converter 5 (or wavelength converter 51).

In the wavelength conversion laser device 300, a fundamental laser beam is injected between the reflective surfaces by inclining the fundamental laser beam with respect to the principal ray axis ML, which is an optical axis linking the respective centers of the reflective surfaces, by the condensing optics 21. A fundamental laser beam injected between the reflective surfaces made up of the first concave mirror 3 and the second concave mirror 4 is injected in a state inclined from the principal ray axis ML. Accordingly, a point at which it crosses with the principal ray axis ML varies from one pass to another. This means that overlapping of a laser beam that is repetitively reflected between the reflective surfaces is dispersed to several points. It is therefore possible to avoid concentration of the power of the laser beam at particular points between the reflective surfaces.

The present embodiment is a preferable embodiment in which a laser beam is injected between the reflective surfaces in a state where it is inclined from the principal ray axis ML by the condensing optics 21. In the present embodiment, it is possible to emit high-output wavelength-converted laser beams in a stable manner by avoiding concentration of the power of the laser beam, and hence breaking of the crystal forming the wavelength converter 5 (or 51) and instability of wavelength conversion.

The reflective surfaces of the present embodiment have a point symmetrical shape from the center of each reflective surface with respect to the principal ray axis ML except for an injection section for the fundament laser beam.

The wavelength conversion laser device 300 is a preferable embodiment in which the inclination of the fundamental laser beam injected between the reflective surfaces is in a dispersion direction (a direction spreading from left to right in FIG. 5) with respect to the principal ray axis ML. In a case where the two reflective surfaces are made up of concave mirrors, by allowing the fundamental laser beam to go incident on the first reflective surface on which the fundamental laser beam is first reflected in a beam path inclined in the dispersion direction with respect to the principal ray axis ML, it is possible to reduce the effective diameter of the second reflective surface (second concave mirror 4) on which the fundamental laser beam is reflected for the second time in comparison with a case where no such inclination is provided (that is, in the case of being parallel to the principal ray axis ML). In the wavelength conversion laser device 300, the fundamental laser beam is injected between the reflective surfaces from a cut-off portion of the second reflective surface and it is preferable to inject the fundamental laser beam between the reflective surfaces from the second reflective surface side. In this instance, by inclining the traveling direction of the fundamental laser beam with respect to the principal ray axis ML as described above, the effective diameter of the second reflective surface can be smaller. By making the effective diameter of the second reflective surface smaller, it becomes easier to make adjustments when injecting the fundamental laser beam between the reflective surfaces. It is therefore possible to eliminate shading on the second reflective surface occurring when the fundamental laser beam is injected between the reflective surfaces.

A range of 0.1 degree to 1 degree is preferable for the inclination of the traveling direction with respect to the principal ray axis ML when the fundamental laser beam goes incident on the first reflective surface. When the inclination is smaller than 0.1 degree, the effect of inclination cannot be achieved, and when the inclination is larger than 1 degree, the number of reciprocation times between the reflective surfaces decreases markedly.

Fourth Embodiment

Figure 6A:
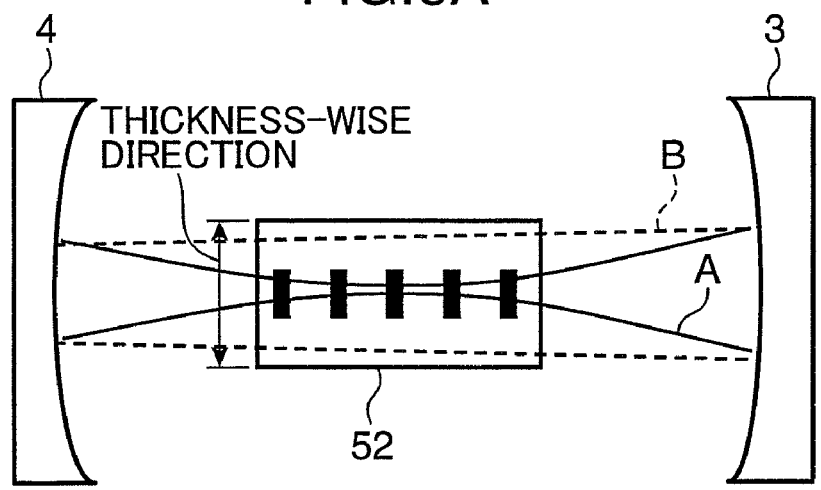
FIG. 6A is a schematic view showing a wavelength converter and first and second concave mirrors according to a fourth embodiment of the invention.
Figure 6B:
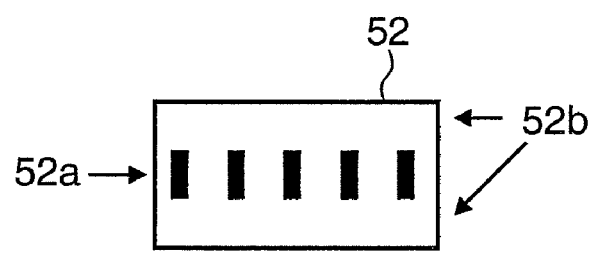
FIG. 6B is a schematic view showing an example of the wavelength converter according to the fourth embodiment of the invention.
Figure 6C:
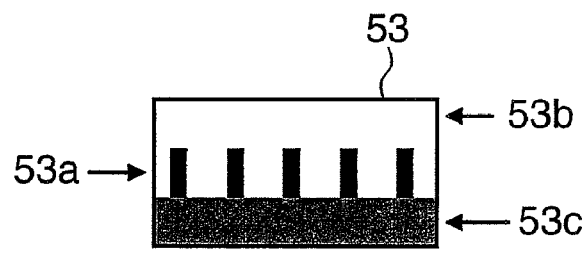
FIG. 6C is a schematic view showing another example of the wavelength converter according to the fourth embodiment of the invention.

FIG. 6A through FIG. 6C are schematic views of wavelength converters 52 and 53 according to a fourth embodiment. Members having the same structures and functions as those of the first through third embodiments above are designated by the same reference numerals.

The wavelength converters 52 and 53 perform wavelength conversion by pseudo phase matching of the poled structure. The wavelength converter 52 includes a portion with periodically poled structure 52a and portions without periodically poled structure 52b in the thickness-wise direction of the frequency converter. The thickness-wise direction of the wavelength converter 52 referred to herein is a direction perpendicular to the sheet surface of FIG. 1 and it is a direction in which a beam path of a laser beam reciprocating between the reflective surfaces hardly shifts. When a laser beam reciprocates between the reflective surfaces, the incident angle of the laser beam into the wavelength converter 52 hardly changes in the thickness-wise direction of the wavelength converter 52. As shown in FIG. 6A, a converged beam indicted by a laser beam path A (solid line) or a near-parallel beam indicated by a laser beam path B (dotted line) repetitively enters into the wavelength converter 52. The beam diameter of the laser beam is increased by diffraction while the laser beam repetitively enters into the wavelength converter 52. A laser beam whose beam diameter becomes too large to enter into the wavelength converter 52 from the incident surface can no longer reciprocate between the reflective surfaces and becomes a loss.

In the present embodiment, in order to ensure a sufficient number of reciprocation times without any loss of a laser beam, the thickness of the wavelength converter 52 is set to 1 mm or larger, and more preferably 2 mm or larger. In order to prevent the occurrence of a loss of a beam, it is necessary to bring the center portion of the wavelength converter 52 in the thickness-wise direction into coincidence with the center of the beam. In this instance, because the beam waist positions $P_{BW}$ at which the wavelength conversion efficiency is high are in the center portion of the wavelength converter 52 in the thickness-wise direction, it is preferable that the portion with periodically poled structure 52a is formed at around the center of the wavelength converter 52 in the thickness-wise direction. By forming the portion with periodically poled structure 52a in the center portion of the wavelength converter 52, wavelength conversion can be performed efficiently. It should be noted that it is sufficient that a part of the polling formed portion 52a is present at the center of the wavelength converter 52 in the thickness-wise direction.

Figure 27:
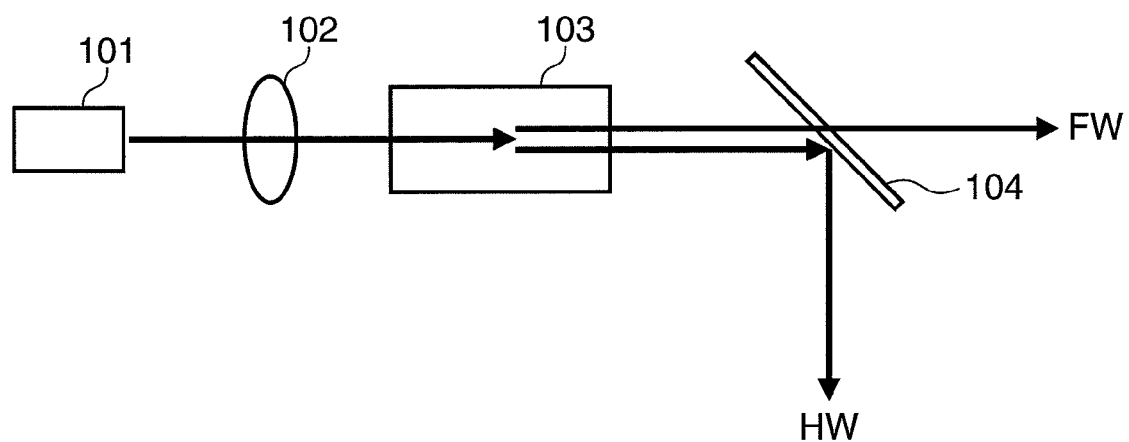
FIG. 27 is schematic view of a conventional wavelength conversion laser device.

In the case of the conventional structure shown in FIG. 27, the portion with periodically poled structure only has to be provided in a region where a condensed laser beam passes through once. Hence, neither is it necessary to make the wavelength converter 103 thick nor to provide the portion with periodically poled structure at the center of the wavelength converter 103. Additionally, there is a problem that the poling forming process makes it difficult to manufacture periodical poling uniformly in the thickness-wise direction of the wavelength converter. To overcome this problem, the wavelength converters 52 and 53 are wavelength converters having the poled structure suitable to the present embodiment. That is to say, the wavelength converters 52 and 53 do not have the portion with periodically poled structure uniformly in the thickness-wise direction, and instead, they respectively have the portions with periodically poled structure 52a and 53a only at the center. Additionally, the wavelength converters 52 and 53 respectively have the non-poled crystal portions 52b and 53b in which no poling is formed in the thickness-wise direction, and adjust the portions with periodically poled structure 52a and 53a to be, respectively, at the center of the wavelength converters 52 and 53 in the thickness-wise direction. The portions without periodically poled structure 52b and 53b have the refractive index same as that of the portions with periodically poled structure 52a and 53a.

The non-poled crystal portions 52b and 53b may be regions in the nonlinear optical crystals where no poling was formed at the time of poling formation. Particularly preferable portions without periodically poled structure 52b and 53b are the following two regions. One is a region where a crystal in which is formed no poling is laminated to a nonlinear optical crystal after the poled structure is formed therein. The other is a region obtained by laminating a crystal in which the poling is hardly formed to a nonlinear optical crystal and then forming the poled structure therein. The other region is the region in which no poling was formed in the laminated crystal in which the poling is hardly formed.

The wavelength converter 52 shown in FIG. 6B is a preferable embodiment in which portions with periodically poled structure 52a is sandwiched by the non-poled crystal portions 52b from the both sides in the thickness-wise direction, so that the wavelength converter 52 is made thicker and the portion with periodically poled structure 52a is present at the center. The wavelength converter 53 shown in FIG. 6C is a preferable embodiment in which, in addition to the non-inverting crystal portion 53b, a poling aperiodical portion 53c is formed when the poling is formed, so that the portion with periodically poled structure 53a is present at the center of the wavelength converter 53 in the thickness-wise direction and the wavelength converter 53 is made thicker.

Fifth Embodiment

FIG. 7A and FIG. 7B are schematic views of a wavelength conversion laser device 400 according to a fifth embodiment. FIG. 7A is schematic top view of the wavelength conversion laser device 400 showing the width-wise direction of the wavelength converter 5. FIG. 7B is a schematic side view of the wavelength conversion laser device 400 showing the thickness-wise direction of the wavelength converter 5. Members having the same structures and functions as those of the first through fourth embodiments above are designated by the same reference numerals. The wavelength conversion laser device 400 shown in FIG. 7A and FIG. 7B includes a fundamental laser light source 1, condensing optics 22, a first concave mirror 3, a second concave mirror 4, and a wavelength converter 5.

The condensing optics 22 that controls and condenses a laser beam to be injected between the reflective surfaces is a preferable embodiment in which the lens power in the thickness-wise direction of the wavelength converter 5 is smaller than the lens power in the width-wise direction of the wavelength converter 5, and the emission numerical aperture (NA) for a laser beam to be injected between the reflective surfaces is larger in the thickness-wise direction than in the width-wise direction. According to the foregoing structure, a laser beam is shaped into an elliptical beam between the reflective surfaces. In the wavelength conversion laser device 400, the beam waist is formed before a fundamental laser beam goes incident on the first concave mirror 3 in the width-wise direction of the wavelength converter 5 as shown in FIG. 7A, whereas the beam waists are formed by a loosely converged beam after the fundamental laser beam is reflected from the first mirror 3 in the thickness-wise direction of the wavelength converter 5 as shown in FIG. 7B. The laser beam repetitively entering into on the wavelength converter 5 by reciprocating between the reflective surfaces is shaped into an elliptical beam, and the position at which the beam waist is formed differs with the directions (the width-wise direction and the thickness-wise direction of the wavelength converter 5). As described, in the present embodiment, by changing the beam waist positions $P_{BW}$ with the directions, the beam waist positions $P_{BW}$ are extremely well dispersed, thereby performing a wavelength conversion in a stable manner. Additionally, in the present embodiment, by making the lens power smaller in the thickness-wise direction of the wavelength converter 5 than in the width-wise direction, the diffraction in the thickness-wise direction is made smaller. It is therefore possible to prevent a loss generated when the beam diameter becomes too large in the thickness-wise direction of the wavelength converter 5. Diffraction of the laser beam in the thickness-wise direction of the wavelength converter 5 imposes the limitations to the laser beam reciprocating between the reflective surfaces. The present embodiment, however, can reduce such limitations.

The condensing optics 22 is made up of a combination of a fiber collimator 22a and an anamorphic lens 22b. It is preferable for the condensing optics 22 that the emission NA in the thickness-wise direction of the wavelength converter 5 for injection between the reflective surfaces is less than ½ of the NA in the width-wise direction of the wavelength converter 5. In the condensing optics 22, the emission NA in the direction for injection between the reflective surfaces in the thickness-wise direction may be formed in the convergence direction or in the dispersion direction, and it is formed in such a manner that the angle of convergence or the angle of dispersion of the beam becomes smaller than the one in the width-wise direction. As the condensing optics 22, a lens system including a cylindrical lens can be used.

Sixth Embodiment

FIG. 8A and FIG. 8B are schematic views of a wavelength conversion laser device 500 according to a sixth embodiment. FIG. 8A is a schematic top view of the wavelength conversion laser device 500 indicating the width-wise direction of the wavelength converter 5. FIG. 8B is a schematic side view of the wavelength conversion laser device 500 indicating the thickness-wise direction of the wavelength converter 5. Members having the same structures and functions as those of the first embodiment above are designated by the same reference numerals. The wavelength conversion laser device 500 shown in FIG. 8A and FIG. 8B includes a fundamental laser light source 1, condensing optics 2, an anamorphic reflection mirror 31, a second concave mirror 4, and a wavelength converter 5.

In the present embodiment, the anamorphic reflection mirror 31 is used instead of the first concave mirror used in the first embodiment above. A coating that reflects a fundamental laser beam and transmits a second harmonic laser beam (wavelength-converted laser beam) is applied on the concave surface of the anamorphic reflection mirror 31.

The anamorphic reflection mirror 31 is a reflective surface having different curvatures in the width-wise direction and the thickness-wise direction of the wavelength converter 5. The anamorphic reflection mirror 31 has a focal length f1 of 25 mm in the width-wise direction of the wavelength converter 5 and a focal length f1t of 20 mm in the thickness-wise direction of the wavelength converter 5, and f1t<f1. The other reflective surface is the second concave mirror 4 having a focal length f2 of 20 mm. In the wavelength conversion laser device 500, a direction in which a beam injected between the reflective surfaces shifts is the width-wise direction of the wavelength converter 5. The distance D between the reflective surfaces is set in the vicinity of the confocal alignment. The number of reciprocation times of a fundamental laser beam between the reflective surfaces that is determined by the width-wise direction of the wavelength converter 5 is thus ensured.

The present embodiment is a preferable embodiment in which an anamorphic reflection mirror is used as the reflective surface. When a fundamental laser beam reciprocating between the reflective surfaces is reflected from the anamorphic reflection mirror 31, it is reflected at the curvatures that differ with the directions (the width-wise direction and the thickness-wise direction of the wavelength converter 5). The fundamental laser beam is therefore shaped into an elliptical beam and takes the beam waist positions $P_{BW}$ that differ with the directions. Accordingly, the beam waist positions $P_{BW}$ at which wavelength conversion is performed are extremely well dispersed in the wavelength converter 5. It is therefore possible to obtain a wavelength conversion laser beam in a stable manner even with a high output.

Let f1t be the focal length of the anamorphic reflection mirror 31 (first reflective surface) in the thickness-wise direction of the wavelength converter 5 and f2t be the focal length of the second mirror 4 (second reflective surface) in the thickness-wise direction of the wavelength converter 5. In the wavelength conversion laser device 500, f2=f2t=20 mm. Hence, let Dn be the beam path length between the reflective surfaces, then it is preferable to establish the relation expressed as:

$$0 \leq (1-Dn/(2 \times f1t)) \times (1-Dn/(2 \times f2t)) \leq 1 \quad (4).$$

The beam path length Dn between the reflective surfaces is expressed as:

$$Dn = D - (1 - 1/n) \times L \quad (5).$$

By satisfying the relation expressed by the above expression (4), the reflective surfaces can be used as a stable resonator with respect to the thickness-wise direction of the wavelength converter 5. In this instance, a laser beam reciprocating between the reflective surfaces has no increase of the beam diameter by diffraction in the thickness-wise direction, which makes it possible to eliminate a loss in the thickness-wise direction. The wavelength conversion laser device 500 is a preferable embodiment in which Dn is 44.8 mm, f1t is 20 mm, and f2t is 20 mm, and thereby satisfies the above expression (4).

Both the first and second reflective surfaces may be anamorphic mirrors, or either one of the first reflective surface and the second reflective surface may be an anamorphic mirror. Alternatively, it may be configured in such a manner that an anamorphic lens, such as a cylindrical lens, is inserted between the reflective surfaces to make the synthetic focal length of the reflective surfaces anamorphic.

Seventh Embodiment

Figure 9:
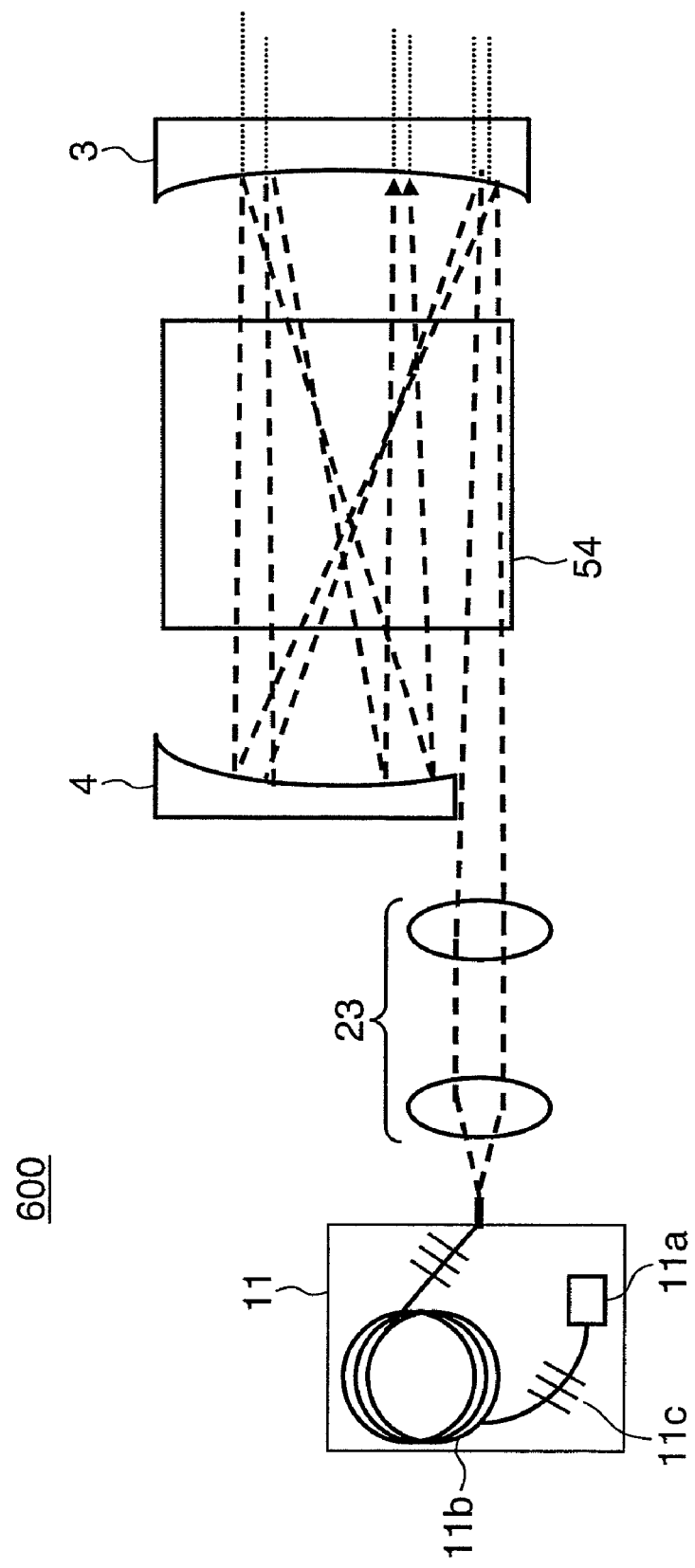
FIG. 9 is a schematic view of a wavelength conversion laser device according to a seventh embodiment of the invention.

FIG. 9 is a schematic view of a wavelength conversion laser device 600 according to a seventh embodiment. Members having the same structures and functions as those of the first through sixth embodiments above are designated by the same reference numerals. The wavelength conversion laser device 600 shown in FIG. 9 includes a broadband fiber laser 11, condensing optics 23, a first concave mirror 3, a second concave mirror 4, and a wavelength converter 54.

The wavelength conversion laser device 600 uses the broadband fiber laser 11 as a laser light source that generates a fundamental laser beam. The broadband fiber laser 11 has a pumping LD (Laser Diode) 11a, an Yb-doped fiber 11b, and a fiber Bragg grating (abbreviated as FBG) 11c, and locks an oscillation wavelength by the FBG 11c in an extremely wide gain range of Yb. In the broadband fiber laser 11, the FBG 11c has a broadband characteristic and the oscillation spectrum is in a multi-mode. Also, the center wavelength λ is 1064.4 nm and the spectrum full width at half maximum Δλ is 0.8 nm. The broadband FBG 11c can be designed by synthesizing a plurality of periods into the grating period, inserting randomness into the period, reducing the period repetition number, and so forth.

The condensing optics 23 condenses a fundamental laser beam so that the beam waists are formed after it is reflected from the first mirror 3. The fundamental laser beam repetitively passes through the wavelength converter 54 while changing the incident angle at the wavelength converter 54 while it reciprocates between a pair of the reflective surfaces made up of the first mirror 3 and the second mirror 4. The beam waist positions $P_{BW}$ of the fundamental laser beam reciprocating between the reflective surfaces are controlled by the condensing optics 23 so that they are dispersed in the wavelength converter 54. As the wavelength converter 54, MgO:LiNbO$_3$ (length: 13 mm, width: 10 mm, and thickness: 2 mm) having the poled structure is used.

Figure 10:
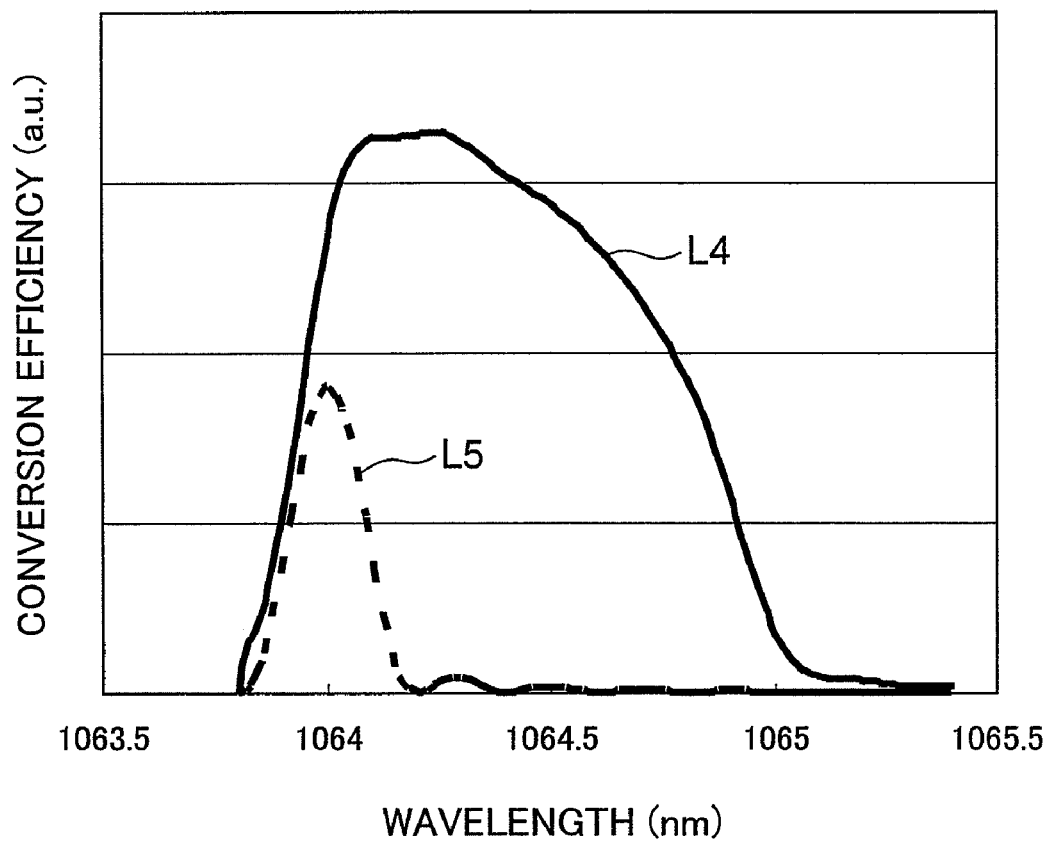
FIG. 10 is a view showing total conversion efficiency versus the wavelength in the seventh embodiment of the invention.

FIG. 10 shows the tolerance ranges for wavelengths in wavelength conversion. Referring to FIG. 10, L4 denotes total conversion efficiency in a case where the wavelength of a fundamental laser beam of the wavelength conversion laser device 600 is changed, and L5 denotes conversion efficiency in a case where the wavelength of a fundamental laser beam of the conventional wavelength conversion laser device is changed. In the present embodiment, a fundamental laser beam repetitively enters into the wavelength converter 54 while changing the incident angle, so that wavelength conversion is performed repetitively by changing the phase matching condition. It is therefore possible to achieve both an extremely wide tolerance ranges for wavelengths and high conversion efficiency. In the wavelength conversion laser device 600, a laser beam wavelength range over which high conversion efficiency is maintained is as wide as about 1 nm, which is wider than the range achievable in the conventional device. More specifically, in the wavelength conversion laser device 600, the tolerance ranges for wavelengths (full width at half maximum (FWHM)) is widened by five times to 0.9 nm from the conventionally achievable 0.18 nm. Conventionally, even when a broadband laser light source is used, an output wavelength-converted laser beam has a narrow bandwidth because of the narrow tolerance ranges for wavelengths. On the contrary, in the present embodiment, it is possible to widen the bandwidth for a wavelength-converted laser beam to be outputted by using a broadband laser light source. The present embodiment is a preferable embodiment in which a longitudinal multi-mode broadband laser light source that emits a laser beam having the spectrum full width at half maximum of 0.5 nm or wider is used. By widening the bandwidth of the wavelength-converted laser beam to be outputted, the coherency of the laser beam can be lowered. It is therefore possible to reduce the interference noises, which are problematic in the video field. In particular, it is possible to reduce random noises called speckle noises that give rise to coherency of the laser. To date, it has been impossible to widen the bandwidth of a wavelength-converted laser beam at high efficiency and this inability poses a critical problem. The wavelength conversion laser device 600 of the present embodiment is provided to solve this problem.

The present embodiment is a preferable embodiment in which the laser light source is a fiber laser device having a broadband fiber Gragging grating, with which the wavelength thereof is locked. For the fiber laser whose wavelength is locked by the broadband FBG, not only can the center wavelength and the bandwidth of a laser beam to be generated be designed, but also a high output can be achieved by the FBG. The performance of the FBG is extremely suitable as a laser light source of the present embodiment to generate a broadband wavelength-converted laser beam. It is therefore possible to widen the bandwidth and increase efficiency and an output power of the wavelength-converted laser beam.

In the wavelength conversion laser device 600, the maximum angle θ of the fundamental laser beam with respect to the poling period is 3 degrees. The wavelength conversion laser device 600 is a preferable embodiment in which let λ be the center wavelength of the fundamental laser beam and $\Delta\lambda$ be the spectrum full width at half maximum of the fundamental laser beam, then a relation expressed as below is established in order to convert the wavelength component of the fundamental laser beam entering into the wavelength converter 54:

$$\cos\theta \leq \lambda/(\lambda+\Delta\lambda/2) \quad (6).$$

The wavelength conversion laser device 600 of the present embodiment performs wavelength conversion in a wide bandwidth by changing the angle of the fundamental laser beam with respect to the poling period of the wavelength converter 54. However, by configuring in such a manner that the angle of the fundamental laser beam changes within the range to satisfy the relation expressed by the above expression (6), it is possible to convert the wavelength width across the entire region of the fundamental laser beam entering into the wavelength converter 54. By satisfying the above expression (6), it becomes possible to widen the bandwidth of the wavelength-converted laser beam in a manner so as to suit to the laser light source.

In the wavelength conversion laser device 600, it is possible to change the center wavelength of the wavelength-converted laser beam to be emitted by changing the temperature of the wavelength converter 54. It is preferable for the present embodiment to have a temperature switching mechanism of the wavelength converter 54. By having the temperature switching mechanism of the wavelength converter 54, the device is enabled to emit a wavelength tunable wavelength-converted laser beam. The wavelength tunable wavelength-converted laser beam is expected to be applicable to the analytic field and the like.

It is also preferable to use a fiber amplifier and laser device having a wavelength tunable seed light generator as the laser light source in the wavelength conversion laser device 600. The fiber amplifier and laser device amplifies seed light injected therein and outputs the amplified light. Because the fiber amplifier and laser device has a gain width in a wide bandwidth, seed light can be amplified at high efficiency even when the wavelength thereof is changed. The wavelength tunable seed light generator has a mechanism that makes switching described as below to a resonator that outputs seed light. That is, the wavelength tunable seed light generator has a switching mechanism to select an arbitrary resonator among a plurality of resonators or a mechanism to switch resonant wavelengths of the resonator. By changing the wavelength of the seed light with the switching mechanism described above, it become possible to select a bandwidth of an output from the fiber amplifier and laser device. Because the tolerance ranges for wavelengths are extremely wide in the wavelength conversion laser device 600 of the present embodiment, it is possible to achieve high efficiency and a high output by switching the bandwidths with the use of the fiber amplifier and laser device having the wavelength tunable seed light generator. The present embodiment is particularly preferable in that laser characteristics can be obtained, which cannot be realized from the conventional structure.

Eighth Embodiment

Figure 11A:
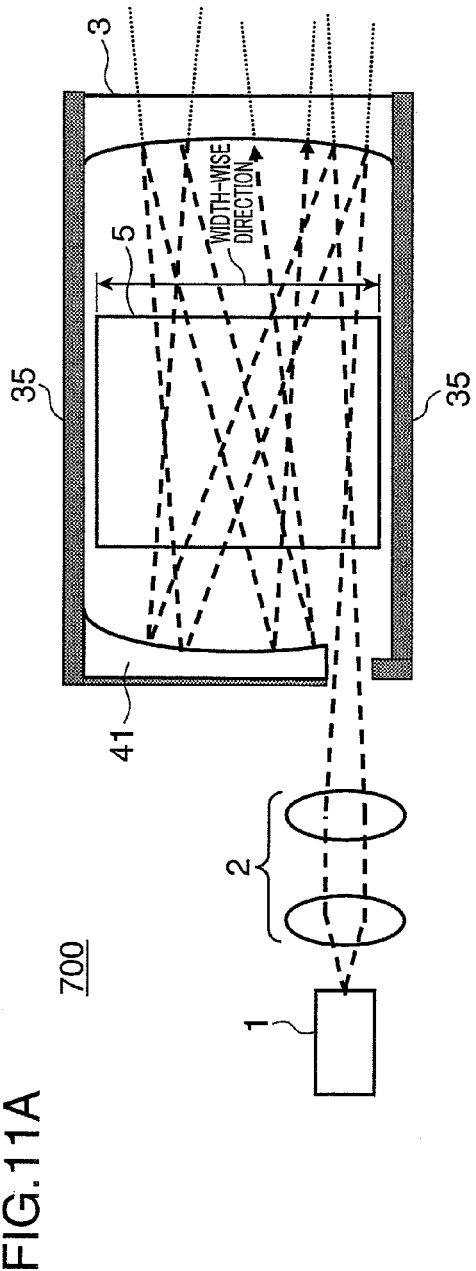
FIG. 11A is a schematic top view of a wavelength conversion laser device according to an eighth embodiment of the invention.
Figure 11B:
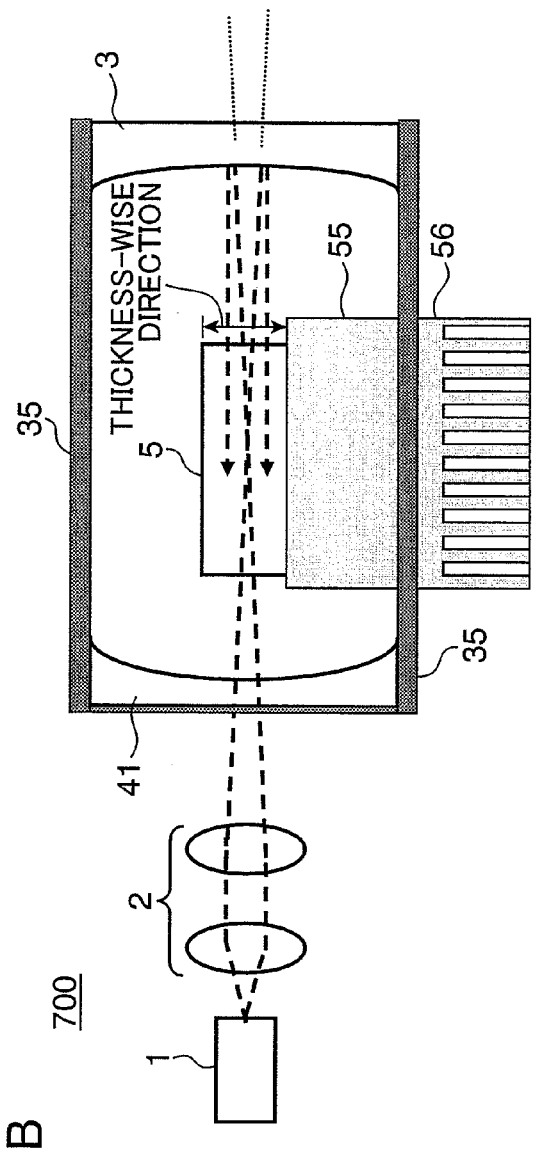
FIG. 11B is a schematic side view of the wavelength conversion laser device according to the eighth embodiment of the invention.

FIG. 11A and FIG. 11B are schematic views of a wavelength conversion laser device 700 according to an eighth embodiment. FIG. 11A is a schematic top view of the wavelength conversion laser device 700 indicating the width-wise direction of the wavelength converter 5. FIG. 11B is a schematic side view of the wavelength conversion laser device 700 indicating the thickness-wise direction of the wavelength converter 5. Members having the same structures and functions as those of the first through seventh embodiments above are designated by the same reference numerals.

The wavelength conversion laser device 700 shown in FIG. 11A and FIG. 11B includes a fundamental laser light source 1, condensing optics 2, a first concave mirror 3, a second concave mirror 41, a wavelength converter 5, coverings 35 for a space between the reflective surfaces, a wavelength converter holder 55, and a radiation heat sink 56 for an absorbed laser beam.

The wavelength conversion laser device 700 has the coverings 35 for a space between the reflective surfaces that prevent a laser beam from leaking to the outside between a pair of the reflective surfaces made up of the first concave mirror 3 and the second mirror 41. The coverings 35 for a space between the reflective surfaces absorb a laser beam. A reflection coating for the fundamental laser beam and the wavelength-converted laser beam is applied on the surface (concave surface) of the second concave mirror 41 and a light shield coating is applied to the back surface so that a transmitted beam will not leak to the outside. Accordingly, owing to the coverings 35 for a space between the reflective surfaces and the light shield coating on the second concave mirror 41, the reflective surfaces and a space between the reflective surfaces are covered with a covering member that absorbs a laser beam except for a region from which a laser beam is injected between the reflective surfaces and a region from which the wavelength-converted laser beam is emitted. As shown in FIG. 11B, the wavelength converter 5 is supported by the wavelength converter holder 55 and provided on the principal ray axis between the reflective surfaces. The radiation heat sink 56 for an absorbed laser beam releases heat generated as the wavelength converter holder 55 absorbs a laser beam and heat generated as the coverings 35 for a space between the reference surfaces absorb a laser beam. The coverings 35 for a space between the reflective surfaces also serve as reflective surface holders that support the first concave mirror 3 and the second concave mirror 41.

The wavelength conversion laser device 700 is a preferable embodiment in which the reflective surface holders or the wavelength converter holder has the heat sink, so that heat generated when these holders absorb a laser beam is released. In the wavelength conversion laser device 700 of the present embodiment, a laser beam stops reciprocating between the reflective surfaces because of reflection, dispersing, and absorption of a laser beam in the respective frequency converters and influences of diffraction of the laser beam. The laser beam is then absorbed in the wavelength converter holder and the reflective surface holders and generates heat. In particular, when the wavelength converter 5 is thin, a laser beam that can no longer reciprocate due to diffraction is absorbed in the wavelength converter holder and generates heat. In the wavelength conversion laser device 700, heat generation by a laser beam that stopped reciprocating between the reflective surfaces can cause an output power of the wavelength-converted laser beam to vary at a high output. In the present embodiment, however, because the reflective surface holders or the wavelength converter holder each generating heat has the heat sink, it is possible to release an amount of heat generated by a laser beam that stopped reciprocating between the reflective surfaces, thereby ensuring stable operations of the device.

The wavelength conversion laser device 700 is a preferable embodiment in which the reflective surfaces and the space between the reflective surfaces are covered by the covering member that absorbs a laser beam except for a region from which a fundamental laser beam is injected between the reflective surfaces and a region form which the wavelength-converted laser beam is emitted. In the present embodiment, a part of a laser beam that stopped reciprocating between the reflective surfaces is outputted from between the reflective surfaces to the outside. Because the direction of such an output laser beam varies with the alignment of the reflective surfaces and the wavelength converter 5, the direction differs from device to device and such an output laser beam is therefore difficult to handle. In particular, at a high output, it is necessary to consider the safety in the outside. In the present embodiment, a laser beam outputted from between the reflective surfaces to the outside is absorbed in the covering member to be converted to heat. It is thus possible to ensure the safety in the outside of the wavelength conversion laser device 700.

Ninth Embodiment

Figure 12:
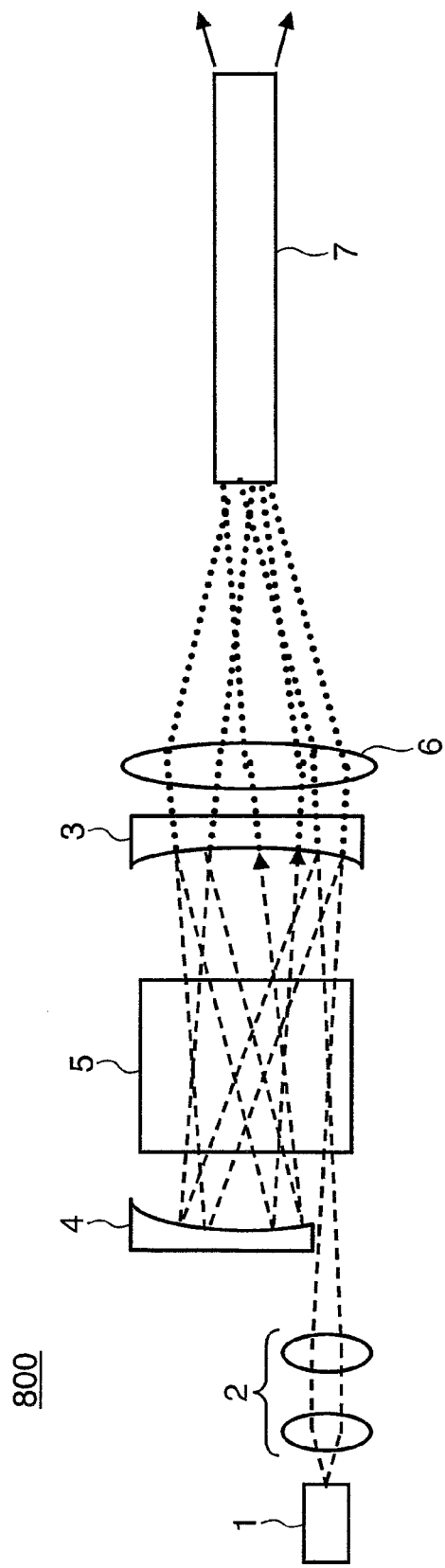
FIG. 12 is a schematic view of a wavelength conversion laser device according to a ninth embodiment of the invention.

FIG. 12 is a schematic view of a wavelength conversion laser device 800 according to a ninth embodiment. Members having the same structures and functions as those of the first through eighth embodiments above are designated by the same reference numerals. The wavelength conversion laser device 800 shown in FIG. 12 includes a fundamental laser light source 1, condensing optics 2, a first concave mirror 3, a second concave mirror 4, a wavelength converter 5, a lens 6, and an internal reflection integrator 7.

The wavelength conversion laser device 800 has the internal reflection integrator 7 that homogenizes linear wavelength-converted laser beams emitted from the first concave mirror 3 and the lens 6 that collects wavelength-converted laser beams emitted from the first concave mirror 3 on the incident surface of the internal reflection integrator 7. The internal reflection integrator 7 homogenizes the beam intensity by superimposing laser beams on the emitting surface by letting the beams entering therein undergo internal reflection on the side surface. The internal reflection integrator 7 includes a type that uses total reflection and a type that is hollow and has a coating on the interior. Additionally, the internal reflection integrator 7 has a rod integrator provided with rectangular incident and emitting surfaces and a fiber type provided with a circular incident surface.

In the wavelength conversion laser device 800 of the present embodiment, wavelength-converted laser beams are difficult to handle because they are outputted from the first concave mirror 3 in a linear shape with an inhomogeneous intensity distribution. Additionally, the angle at which the wavelength-converted laser beams are outputted from the first concave mirror 3 varies with the frequency components thereof. Accordingly, a problem in this device is to homogenize beams outputted from the first concave mirror 3. In the present embodiment, the intensities and the frequency components of the wavelength-converted laser beams outputted from the first concave mirror 3 are averaged. It is therefore possible to obtain low coherent wavelength-converted laser beams with a homogeneous intensity distribution. In the present embodiment, when beams are collected on the incident surface of the internal reflection integrator 7 by the lens 6, the frequencies are averaged by avenging the angular directions of the wavelength-converted laser beams and the intensities of the wavelength-converted laser beam are averaged by the internal reflection integrator 7.

In particular, it is preferable for the internal reflection integrator 7 to have a rectangular incident surface, so that the long side direction coincides with a direction in which a laser beam to be injected between the reflective surfaces shifts markedly with respect to the principal ray axis. By aligning the long side direction to the direction specified above, it becomes possible to increase in-take efficiency of the wavelength-converted laser beams into the internal reflection integrator 7, which can in turn lessen a propagation loss.

Tenth Embodiment

Figure 13:
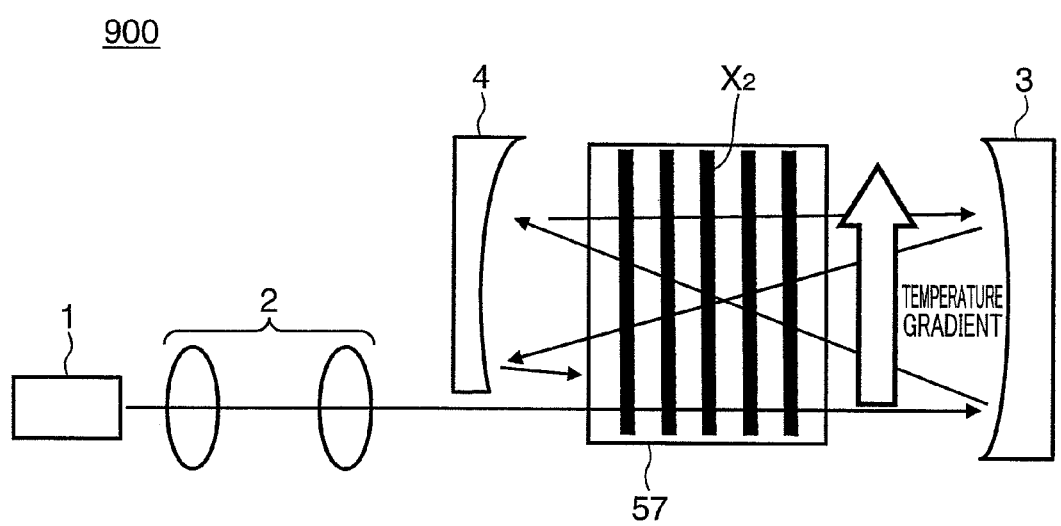
FIG. 13 is a schematic view of a wavelength conversion laser device according to a tenth embodiment of the invention.

FIG. 13 is a schematic view of a wavelength conversion laser device 900 according to a tenth embodiment. Members having the same structures and functions as those of the first through ninth embodiments above are designated by the same reference numerals. The wavelength conversion laser device 900 shown in FIG. 13 includes a fundamental laser light source 1, condensing optics 2, a first concave mirror 3, a second concave mirror 4, and a wavelength converter 57.

The wavelength converter 57 has a temperature gradient in a direction perpendicular to a periodically poled structure $X_2$. As shown in FIG. 13, the wavelength converter 57 has the temperature gradient in the width-wise direction of the wavelength converter 57, which is the top-bottom direction in the drawing. In order to form such a temperature gradient in the wavelength converter 57, an temperature control element (not shown) that performs heating and cooling is provided to the wavelength converter 57 on one end face in the width-wise direction. As the temperature control element, a Peltier element and a heater can be used.

A fundamental laser beam reciprocating between the first concave mirror 3 and the second concave mirror 4 repetitively enters into the wavelength converter 57 while changing the incident angle. In this instance, the wavelength converter 57 changes the phase matching condition for a laser beam passing through the wavelength converter 57 using the temperature gradient of the wavelength converter 57 in addition to a change of the incident angle. Hence, even when the incident angle is the same, the phase matching condition changes with the temperature gradient of the wavelength converter 57, and the center wavelength of a laser beam subjected to wavelength conversion varies. The present embodiment is a preferable embodiment as a broadband wavelength conversion laser device capable of converting wavelengths over an extremely wide range. By setting the temperature gradient of the wavelength converter 57 in a direction perpendicular to the periodically poled structure $X_2$, a temperature change of the wavelength converter 57 in each pass of the laser beam can be suppressed. It is therefore possible to prevent a reduction in wavelength conversion efficiency.

The temperature gradient of the wavelength converter 57 is not limited to a linear gradient and it may be a nonlinear gradient. It is preferable that a difference between the highest temperature and the lowest temperature in the wavelength converter 57 is 1° C. or larger. By setting the temperature difference to 1° C. or larger, the phase matching condition can be changed in a satisfactory manner in the wavelength converter 57.

Eleventh Embodiment

Figure 14:
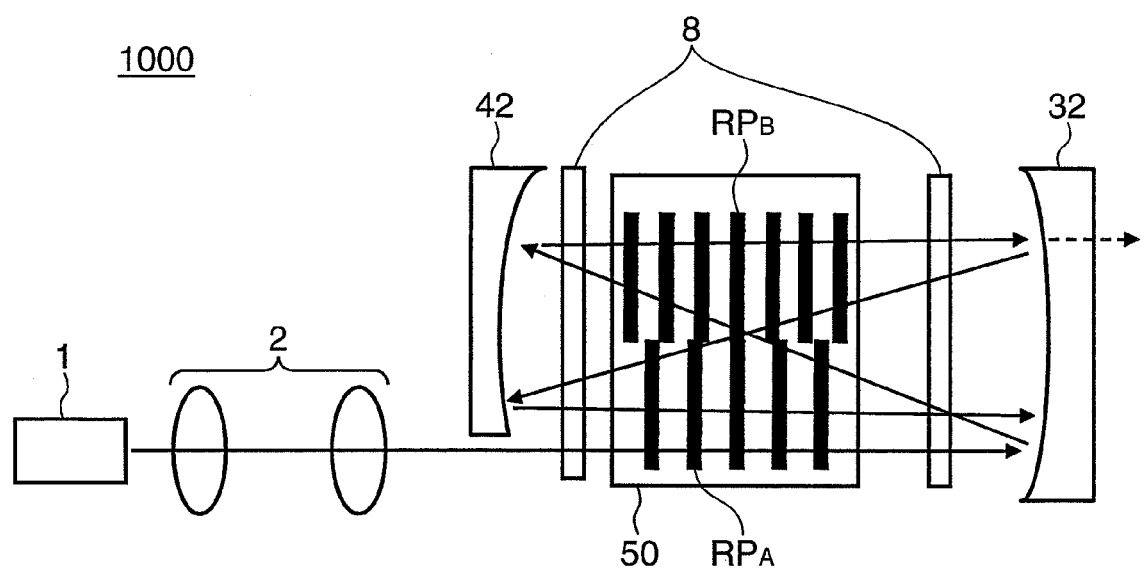
FIG. 14 is a schematic view of a wavelength conversion laser device according to an eleventh embodiment of the invention.

FIG. 14 is a schematic view of a wavelength conversion laser device 1000 according to an eleventh embodiment. Members having the same structures and functions as those of the first through tenth embodiments above are designated by the same reference numerals. The wavelength conversion laser device 1000 shown in FIG. 14 includes a fundamental laser light source 1, condensing optics 2, a first concave mirror 32, a second concave mirror 42, and a wavelength converter 50.

The wavelength conversion laser device 1000 is to output a third harmonic wave of a fundamental laser beam generated from the fundamental laser light source 1. The wavelength conversion laser device 1000 includes the wavelength converter 50. The wavelength converter 50 has two types of periodically poled structures. To be more concrete, the wavelength conversion laser device 1000 has a periodically poled structure $RP_A$ that converts a fundamental wave to a second harmonic wave, and a periodically poled structure $RP_B$ that converts the fundamental wave and the second harmonic wave to third harmonic waves.

Additionally, the wavelength conversion laser device 1000 includes the first concave mirror 32, the second concave mirror 42, and chromatic aberration correction elements 8. The first concave mirror 3 reflects a fundamental wave and a second harmonic wave and transmits a third harmonic wave. The second concave mirror 42 reflects a fundamental wave and second and third harmonic waves. The chromatic aberration correction elements 8 are provided between the first concave mirror 32 and the wavelength converter 50 and between the second concave mirror 42 and the wavelength converter 50, and correct chromatic aberration so that beam paths of the fundamental wave and the second harmonic wave coincide with each other in the wavelength converter 50.

The present embodiment is a preferable embodiment in which the wavelength converter having at least two types of periodically poled structures and the reflective surfaces reflecting a plurality of wavelengths are used. In the present embodiment, it is possible to have wide tolerance ranges and to achieve high conversion efficiency using an event that a laser beam repetitively enters into the wavelength converter. In the present embodiment, by using the wavelength converter having at least two types of periodically poled structures and the reflection mirrors reflecting a plurality of wavelengths, it becomes possible to perform various types of wavelength conversion, such as conversion to a third harmonic wave, at high conversion efficiency while maintaining high stability.

It is preferable to use the chromatic aberration elements 8 in a case where laser beams having two or more wavelengths are repetitively reflected between the reflective surfaces when generating a third harmonic wave, a sum frequency, or a difference frequency. The present embodiment has a problem that the beam path is shifted and the angle is changed by the wavelength of a laser beam while laser beams having two or more wavelengths are repetitively reflected between the reflective surfaces due to the wavelength dispersion of the wavelength converter. The chromatic aberration correction elements can compensate for such a shift and a change to bring the beam paths of two or more wavelengths into coincidence inside the wavelength converter. It is therefore possible to achieve efficient wavelength conversion. The chromatic aberration elements can be made up of an element having dispersion opposite to that of the wavelength converter or an element of a prism shape.

It should be noted that in the present embodiment, it is possible to perform wavelength conversion that generates a sum frequency or a difference frequency using a light source that emits laser beams having a plurality of wavelengths as the laser light source. In this case, it is preferable that laser beams are injected between the reflective surfaces by the condensing optics after laser beams having a plurality of wavelengths are adjusted to be coaxial using a dichroic mirror or the like.

Twelfth Embodiment

Figure 15:
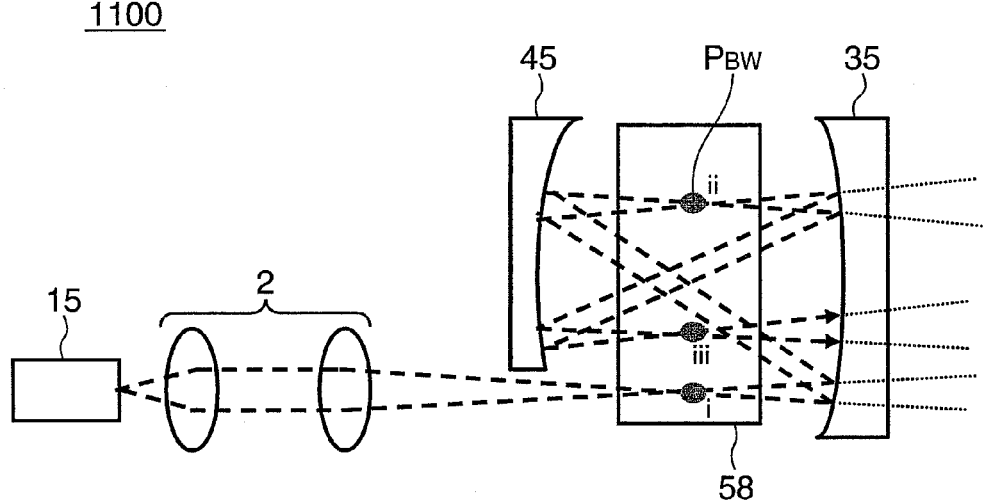
FIG. 15 is a schematic view of a wavelength conversion laser device according to a twelfth embodiment of the invention.

FIG. 15 is a schematic view of a wavelength conversion laser device 1100 according to a twelfth embodiment. Members having the same structures and functions as those of the first embodiment above are designated by the same reference numerals. The wavelength conversion laser device 1100 shown in FIG. 15 includes a fundamental pulse laser light source 15, condensing optics 2, a first concave mirror 33, a second concave mirror 45, and a wavelength converter 58.

As the fundamental pulse laser light source 15, a Nd:YAG laser capable of emitting pulses with a pulse width of a laser beam of the order of μsec or smaller is used. The oscillation wavelength of the fundamental pulse laser light source 15 is 1.064 μm. It is sufficient for the fundamental pulse laser light source 15 to emit pulses, and a fiber laser or an LD can be used as well. As the wavelength converter 58, $MgO:LiTaO_3$ (periodically poled lithium tantalite, abbreviated as PPLT) having the poled structure is used, and it is of a rectangular prism shape (length: 5 mm, width: 8 mm, and thickness: 1 mm). The poling period of the wavelength converter 58 is 8 μm.

The first concave mirror 33 has a focal length f defined as f=4, and the second concave mirror has a focal length f defined as f=5, and the distance between the mirrors is 11.7 mm. An AR coating for a fundamental laser beam and a wavelength-converted beam is applied on the surface of the PPLT (wavelength converter 58). Additionally, an HR (High Reflectance) coating for a fundamental laser beam and an AR coating for a wavelength-converted beam are applied on the concave surface of the first concave mirror 33. Further, an HR coating for a fundamental laser beam and a wavelength-converted beam is applied on the concave surface of the second concave mirror 45.

The pulse width of a fundamental laser beam emitted from the fundamental pulse laser light source 15 is 20 nsec, and the repetition frequency thereof is 50 kHz. In this instance, the wavelength conversion efficient is 50% only for a first pass in which the fundamental laser beam directly enters into the wavelength converter 58 from the condensing optics 2, and total wavelength conversion efficiency calculated from the wavelength-converted beams formed by adding up multi passes is 78%. In the present embodiment, the beam waist radius at the beam waist i formed by the first pass is set to 200 μm and focus diameters of the beam waists (ii, iii, and so forth) except for the one formed by the first pass are made larger than the focus diameter of the first pass, so that the wavelength conversion efficient by the first pass will not become high.

The present embodiment is a preferable embodiment in which a laser light source that emits a pulsed fundamental laser beam and the wavelength converter having the periodically poled structure are used, and let T be the pulse width of the fundamental laser beam, L be the element length of the wavelength converter, Λ be the poling period, λ be the wavelength of the fundamental laser beam, and c be the velocity of light, then a relation expressed as below is established:

$$(L \cdot \lambda)/(0.3 \cdot \Lambda \cdot c) < T \tag{7}$$

and an output power of the wavelength-converted beam generated from a beam path in which the fundamental laser beam first passes through the wavelength converter is less than ⅔ of a total output power of the wavelength-converted beams generated from multi beam paths in the wavelength converter.

By increasing instantaneous intensity of power by emitting a pulsed fundamental laser beam as in the present embodiment, it becomes possible to increase the wavelength conversion efficiency. However, when the pulse width is made too short, the wavelength of the fundamental laser beam may possibly expand, in which case phase matching cannot be performed in the wavelength converter and it becomes difficult to perform wavelength conversion. In this instance, by making the pulse width T of the fundamental laser beam longer than (L·λ)/(0.3·Λ·c) to satisfy the above expression (7), it becomes possible to suppress expansion of the wavelength of the fundamental laser beam. It is therefore possible to perform phase matching in the wavelength converter in a stable manner to output wavelength-converted beams. Additionally, in a case where the fundamental laser beam is turned into pulses, instantaneous light intensity of the wavelength-converted beams increases in the pass that enters first into the wavelength converter. Such an increase may possibly break the wavelength converter at the beam waist positions or generate heat. In the present embodiment, by setting an output power of the wavelength-converted beam generated from a beam path that first passes through the wavelength converter is less that ⅔ of a total output power of all the passes, it becomes possible to prevent the wavelength-converted beams from being generated intensively in the first beam path. It is therefore possible to suppress breaking or generation of heat of the wavelength converter, so that both further higher wavelength conversion efficiency and a stable operation can be achieved. It is more preferable to set an output power of the wavelength-converted beam of the beam path that first passes through the wavelength converter to be less than ½ of a total output. By setting the output to be less than ½ of a total output in this manner, the wavelength conversion laser device is enabled to operate in a stable manner even when a peak power as high as or higher than 100 W is required.

Thirteenth Embodiment

Figure 16:
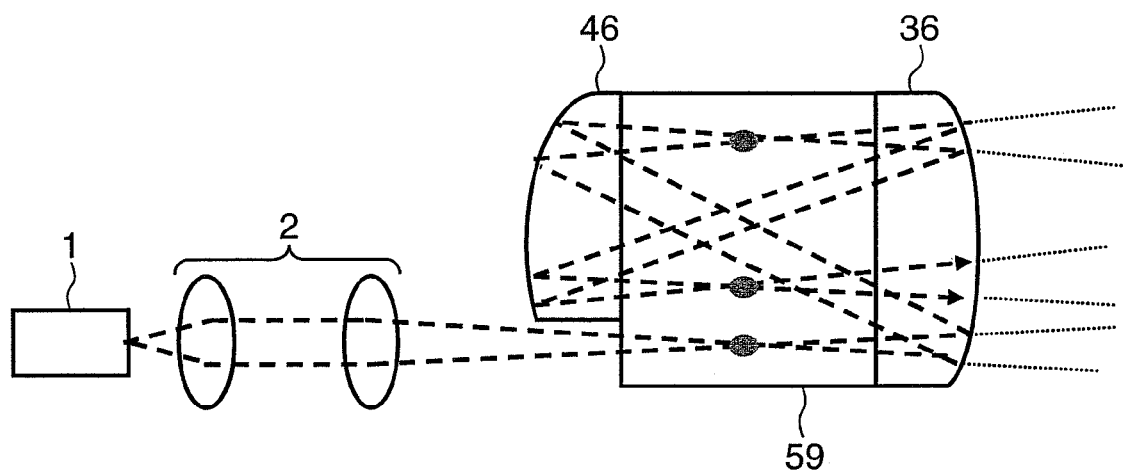
FIG. 16 is a schematic view of a wavelength conversion laser device according to a thirteenth embodiment of the invention.

FIG. 16 is a schematic view of a wavelength conversion laser device 1200 according to a thirteen embodiment. Members having the same structures and functions as those of the first embodiment above are designated by the same reference numerals. The wavelength conversion laser device 1200 shown in FIG. 16 includes a fundamental laser light source 1, condensing optics 2, a first convex prism 36, a second convex prism 46, and a wavelength converter 59.

The first convex prism 36 and the second convex prism 46 are optical members serving as the reflective surfaces for a fundamental laser beam. A reflection coating for a fundamental laser beam is applied on the convex surface side of each and the other end face is a flat surface. The flat surface sides of the first and second convex prisms 36 and 46 are joined to the wavelength converter 59. The wavelength converter 59 and the first and second convex prisms 36 and 46 are therefore made into one unit. In order prevent unwanted reflection, the refractive indices of the materials are matched at the boundary surfaces between the wavelength converter 59 and the first and second convex prisms 36 and 46.

An AR coating for a wavelength-converted beam is applied on the convex surface of the first convex prism 36 so that the wavelength-converted beams are outputted from the first convex prism 36. The convex surface of each of the first convex prism 36 and the second convex prism 46 is of a spherical shape having a curvature radius of 25 mm and a curvature radius of 20 mm, respectively. The center of each spherical surface coincides with the center axis of the wavelength converter 59. As the wavelength converter 59, MgO:LiNbO₃ (PPLN) having the poled structure is used, and it is of a rectangular prism shape (length: 20 mm, width: 10 mm, and thickness: 1 mm). The shapes of the first and second convex prisms 36 and 46 are matched with the shape of the wavelength converter 59 so as to be joined to the wavelength converter 59, and the thickness thereof is set to 1 mm. The second convex prism 46 is cut off only at a portion where a fundamental laser beam from the condensing optics 2 enters into the wavelength converter 59, and this cut-off portion serves as an injection section for a fundamental laser beam.

A fundamental laser beam is reflected from the two convex prisms and repetitively passes through the wavelength converter 59 while changing the incident angle, so that the beam waists are dispersed in the wavelength converter 59. The wavelength conversion laser device 1200 is therefore capable of performing wavelength conversion in a stable and efficient manner.

The present embodiment is a preferable embodiment in which the optical members serving as the reflective surfaces for a laser beam are joined to the wavelength converter and the wavelength converter and the optical members serving as the laser beam reflective surfaces are made into one unit. By joining the optical members serving as the reflective surfaces to the wavelength converter, misalignment between the reflective surfaces and the wavelength conversion can be eliminated, and so can an adjustment of the positional relation. It is therefore possible to enhance the reliability of the device and reduce the number of steps in the manufacturing process.

It should be noted that the optical members to be joined to the wavelength converter do not necessarily have the same refractive index as that of the wavelength converter. It may be configured in such a manner that they have a coating on the joined surfaces so as to prevent reflection. Preferably, the optical members to be joined to the wavelength converter are manufactured on the wavelength converter by means of injection molding. When configured in this manner, it becomes possible to manufacture the reflective surfaces in reference to the wavelength converter and the manufacturing at a low cost can be achieved.

Fourteenth Embodiment

Figure 17:
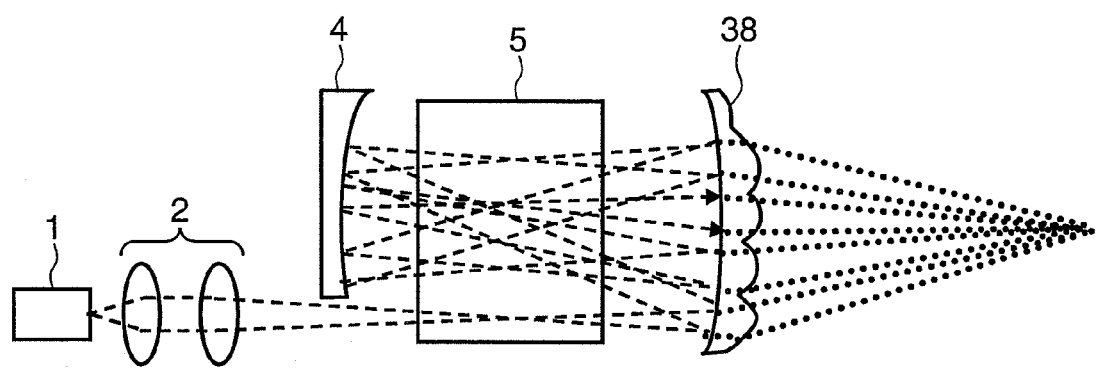
FIG. 17 is a schematic view of a wavelength conversion laser device according to a fourteenth embodiment of the invention.

FIG. 17 is a schematic view of a wavelength conversion laser device 1300 according to a fourteenth embodiment. Members having the same structures and functions as those of the first embodiment above are designated by the same reference numerals. The wavelength conversion laser device 1300 shown in FIG. 17 includes a fundamental laser light source 1, condensing optics 2, a coupling mirror 38, a second concave mirror 4, and a wavelength converter 5.

The wavelength conversion laser device 1300 is the same as the counterpart of the first embodiment except that the coupling mirror 38 is used as a member serving as the reflective surface for a fundamental laser beam and the transmission surface for wavelength-converted beams. The coupling mirror 38 reflects a fundamental laser beam using the concave surface side as the reflective surface for a fundamental laser beam and thereby allows the fundamental laser beam to re-enter into the wavelength converter 5 and condenses the fundamental laser beam. Additionally, the coupling mirror 38 transmits wavelength-converted beams and the coupling mirror 38 is provided with a lens array corresponding to wavelength-converted beams generated by the respective passes on the wavelength-converted beam output surface side. Owing to this lens array, beams by the respective passes are collected and the passes are combined, so that the wavelength-converted beams generated by the respective passes are collected to a single point. In the present embodiment, beams by four passes are collected to a single point. By having the lenses corresponding to the respective passes, the coupling mirror 38 becomes capable of combining output beams made up of a plurality of beams at a single point. Owing to the coupling mirror 38, beams dispersed inside the wavelength converter 5 can be combined together.

The present embodiment is a preferable embodiment in which the device has the lens array corresponding to each single pass for wavelength-converted beams generated inside the wavelength converter by different passes. By having the lens array corresponding to each single pass, it becomes possible to converge output beams made up of a plurality of beams. In particular, it is preferable to provide the lens array to an optical member serving as the reflective surface for a fundamental laser beam as in the present embodiment. When configured in this manner, the respective passes and the lens array can be adjusted simultaneously by adjusting the reflective surface for a fundamental laser beam.

Besides the lens array, the surface transmitting wavelength-converted beams alone of the member having the reflective surface for a fundamental laser beam may be worked into various shapes that conform to the device to be used, such as a plurality of flat planes each having a different incident angle for each emitted beam and a diffraction grating having a plurality of patterns, so that wavelength-converted beams to be outputted can have a desired intensity distribution.

Fifteenth Embodiment

Another object of the invention is to provide a wavelength conversion laser device capable of obtaining high conversion efficiency even when light absorption occurs in the wavelength converter as well as performing multi-mode wavelength conversion and emission of a high-output converted wave. Hereinafter, an embodiment to achieve this object will be described.

Figure 18A:
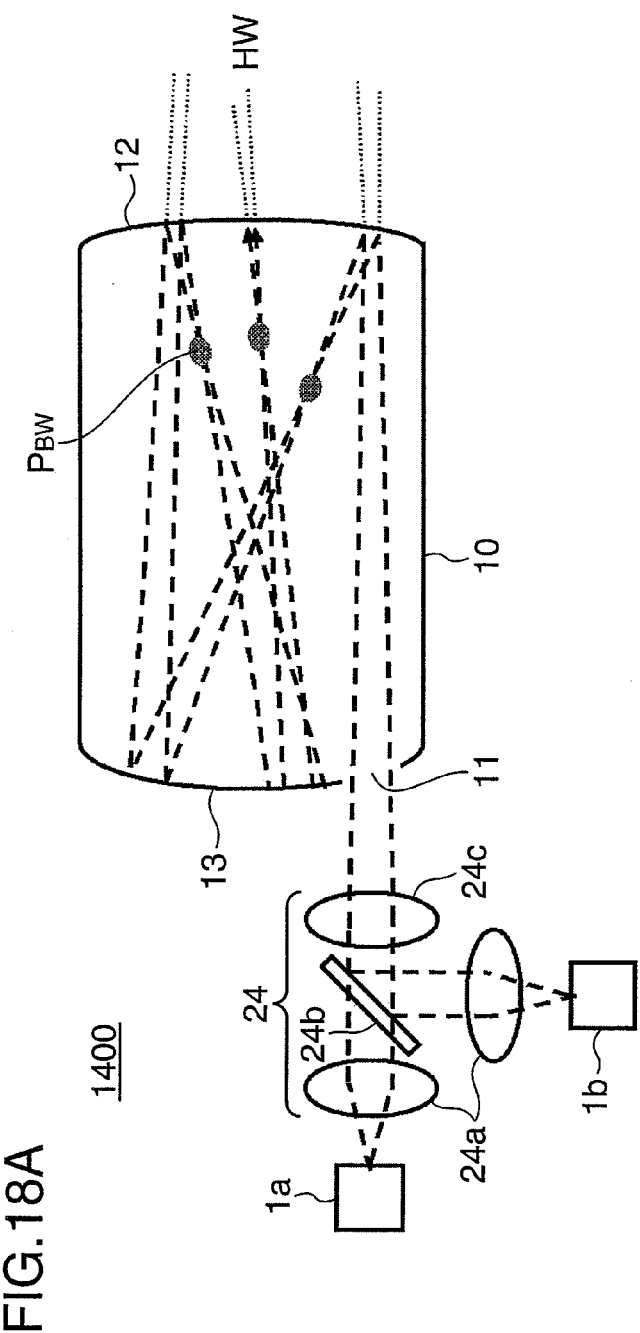
FIG. 18A is a schematic view of a wavelength conversion laser device according to a fifteenth embodiment of the invention.
Figure 18B:
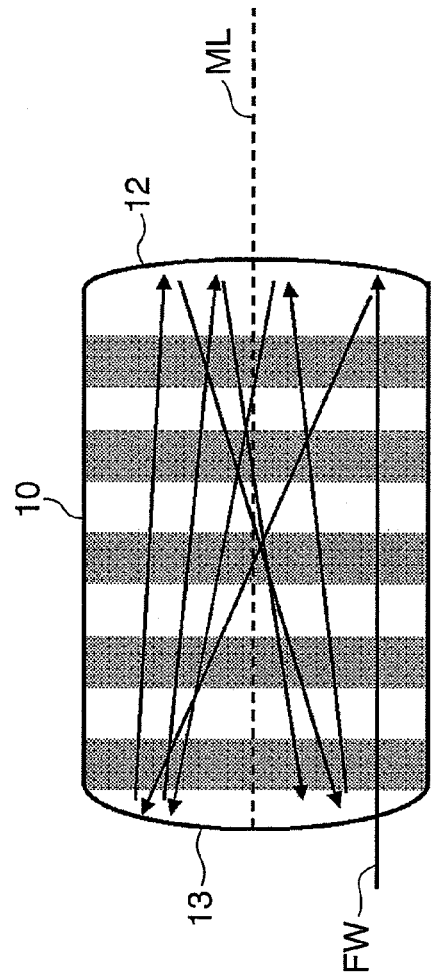
FIG. 18B is an explanatory view which explains a beam path of a fundamental laser beam in the wavelength conversion laser device according to the fifteenth embodiment of the invention.

FIG. 18A is a view schematically showing the structure of a wavelength conversion laser device 1400 according to a fifteenth embodiment of the invention. FIG. 18B is a view showing only a principal ray of a laser beam to show a manner in which a laser beam passes through a wavelength converter while changing an incident angle at the wavelength converter each time it is reflected from the refection surfaces. The wavelength conversion laser device 1400 shown in FIG. 18A includes laser light sources 1a and 1b, condensing optics 24, and a wavelength converter 10.

The wavelength conversion laser device 1400 has two laser light sources 1a and 1b each emitting a laser beam having a different wavelength. The laser light source 1a is made up of a fiber laser that oscillates a beam having a wavelength of 1060 nm and the laser light source 1b is made up of a fiber laser that oscillates a beam having a wavelength of 1080 nm. Each fiber laser is made up of an Yb-doped fiber and the oscillation wavelength is locked by the fiber Bragg grating (FBG). Beams emitted from the laser light sources 1a and 1b are combined at a dichroic mirror 24b by passing through the corresponding collimators 24a. The beams thus combined are collected by a collective lens 24c to enter into the wavelength converter 10 from an injection section 11. The condensing optics 24 is made up of the collimators 24a, the dichroic mirror 24b, and the collective lens 24c described above, and condenses a laser beams and inputs the condensed laser beam into the wavelength converter 10.

The wavelength converter 10 is made of a MgO:LiNbO$_3$ crystal having the periodically poled structure and has the length of 10 mm, the width of 5 mm, and the thickness of 2 mm. The incident and emitting end faces for a laser beam, which respectively correspond to the left and the right in FIG. 18A and FIG. 18B, are polished in a convex shape. The drawings are top views of the wavelength converter 10. The left-right direction in the drawings is the length-wise direction of the wavelength converter 10 and the top-bottom direction in the drawings is the width-wise direction of the wavelength converter 10. In the MgO:LiNbO$_3$, the thickness-wise direction is the z axis of the crystal and the polarization of the z axis is inverted so that the poling is formed at periods of 6.9 μm in the direction shown in the schematic view of FIG. 18B (the length-wise direction of the wavelength converter 10). By utilizing the angle of a laser beam into the wavelength converter, the wavelength converter 10 generates three wavelength-converted beams HW at 530 nm and 540 nm, which are second harmonic waves of laser beams having two wavelengths (1060 nm and 1080 nm), and at 535 nm, which is a sum frequency of these two wavelengths.

One end face 12 of the wavelength converter 10 is a convex spherical surface having a curvature radius of 12 mm and a reflection coating for infrared light to reflect the laser beams and an AR coating for green light, which is the wavelength-converted beam, are formed thereon. The end face 12 serves as the emitting surface for the wavelength-converted beams made up of a plurality of beams. The other end face 13 of the wavelength converter 10 is a convex spherical surface having a curvature radius of 8 mm and a reflection coating for infrared light and green light is applied thereon. The end face 12 and the end face 13 serve as two reflective surfaces that reflect a laser beam, which is infrared light. The injection section 11 of the wavelength converter 10 is formed by making a portion having no reflection coating for infrared light in a part of the end face 13, so that a laser beam is injected between the reflective surfaces. The injection section 11 is formed in the wavelength element 10 by masking a part thereof when the reflection coatings are formed. The end face 12 and the end face 13 are disposed so that the centers of curvatures of the respective spherical surfaces oppose each other. In the wavelength conversion laser device 1400, an axis linking the respective centers of curvatures of the end face 12 and the end face 13 is referred to as the principal ray axis ML of the wavelength conversion laser.

The end face 12 and the end face 13 function as concave mirrors for a laser beam and also serve as condensing surfaces to provide light-gathering power to a laser beam passing through the wavelength converter 10 for the laser beam to form a focal point (beam waist). Because the condensing surfaces are curved planes, a laser beam repetitively passes through the wavelength converter 10 by changing an incident angle at the wavelength converter 10 while it reciprocates between the reflective surfaces. Incidentally, focal points are converged to a single point by the light-gathering power provided from the end face 12 and the end face 13 alone. In order to avoid this inconvenience, a laser beam condensed by the condensing optics 2 is allowed to enter into the wavelength converter 10. By the condensing surfaces present between the reflective surfaces and the condensing optics 2, a plurality of beam waists are formed by a laser beam passing through the wavelength converter 10, so that the beam waist positions $P_{BW}$ are dispersed in the wavelength converter 10. The light intensity is increased at the beam waist positions $P_{BW}$ and the conversion efficiency per beam path is increased. In a case where there is only one beam waist position, a heat generation portion of the wavelength converter 10 resulting from light absorption is concentrated to a single point, which gives rise to breaking of the wavelength converter 10 and deterioration of conversion efficiency caused by inhomogeneous temperatures.

A laser beam injected between the reflective surfaces from the injection section 11 is injected near-parallel to the principal ray axis ML and has no inclination with respect to the periodically poled structure. The laser beam thus passes through the wavelength converter 10 at an angle to intersect with the periodically poled structure and generates a wavelength-converted beam at 530 nm. When the laser beam and the wavelength-converted beam reach the end face 12, the wavelength-converted beam is emitted from the end face 12 while the laser beam is reflected from the end face 12 and condensed. In this instance, because the laser beam has been condensed by the condensing optics 2, the focal point is formed at a position different from and before the focal position of the end face 12. The injection section 11 is at a position shifted by 2 mm from the principal ray axis in the width-wise direction of the wavelength converter 10, and the laser beam is reflected from the end face 12 at an inclination of about 19 degrees from the principal ray axis. Because the laser beam passes through the periodically poled structure at a large angle, the poling period for the laser beam is substantially extended. In this beam path inclined by about 19 degrees from the principal ray axis, the phase is matched with the second harmonic generation of 1080 nm. The wavelength converter 10 thus generates a wavelength-converted beam at 540 nm. The wavelength-converted beam at 540 nm is reflected from the end face 13 and outputted from the end face 12. The laser beam passes through the wavelength converter 10 by changing the incident angle at the wavelength converter 10 each time it is reflected from the end face 13 and the end face 12. When the inclination of the laser beam from the principal ray axis reaches about 14 degrees, the phase is matched with the generation of a sum frequency of 1060 nm and 1080 nm. The wavelength converter 10 thus generates a wavelength-converted beam at 535 nm. The wavelength-converted beam at 535 nm is also emitted from the end face 12. In the beam path in which a laser beam passes through at an inclination close to 0 degree, the phase is matched with the second harmonic wave at 1060 nm. The wavelength-converted beam at 530 nm is thus generated and emitted from the end face 12.

The present embodiment is characterized in that the device has the wavelength converter, the condensing surfaces, and the wavelength-converted beam emitting surfaces between the two laser beam reflective surfaces and the wavelength-converted beams are repetitively generated by changing the phase matching condition by injecting a laser beam between the reflective surfaces from a portion having no reflection capability by the condensing optics so as to repetitively pass through the wavelength converter by changing the incident angle at the wavelength converter while the laser beam reciprocates between the reflective surface, so that a plurality of beam waist positions are dispersed in the wavelength converter by the condensing optics and the condensing surfaces for emitting the wavelength-converted beams made up of a plurality of beams.

In the present embodiment, the multi-mode phase matching is enabled in the same wavelength converter by changing the phase matching condition by making the angle of the laser beam into the wavelength converter different for a different pass. Additionally, the phase matching in an extremely wide range and high conversion efficiency in total are achieved by allowing the laser beam to pass through the wavelength converter many times while changing the phase matching condition. Owing to the phase matching in a wide range, it becomes possible to perform wavelength conversion for wavelength in a wide bandwidth and in a wide temperature range. In the present embodiment, the light-gathering power is provided to a reciprocating laser beam by providing the condensing surfaces between the reflective surfaces. Accordingly, even when the beam path of the laser beam becomes longer, the laser beam can be maintained in a high light intensity state, so that the conversion efficiency can be increased. Additionally, the condensing surfaces change the angle of the beam path passing through the wavelength converter. By dispersing the beam waist positions in the wavelength converter by the condensing optics and the condensing surfaces between the reflective surfaces, it becomes possible to avoid damage on the wavelength converter and deterioration of conversion efficiency caused by light absorption. Further, by emitting the wavelength-converted beams made up of a plurality of beams, it becomes possible to obtain low coherent wavelength-converted beams.

The present embodiment is a preferable embodiment in which the laser light source is made up of a plurality of light sources having different oscillation wavelengths, so that wavelength-converted beams, including second harmonic waves of the respective laser beams emitted from the plurality of laser light sources and a sum frequency or a difference frequency of the plurality of laser beams, are generated in the wavelength converter and emitted. In the present embodiment, two second harmonic waves and the sum frequency are emitted simultaneously. By applying a plurality of laser beams having different oscillation wavelengths to the structure of the present embodiment, it becomes possible to output multi-mode wavelength-converted beams having different longitudinal modes simultaneously. Because the wavelength-converted beams in the longitudinal multi-mode have a small interference noise, they can be used extensively in the fields of videos and lighting. In order to lower the coherency of the wavelength-converted beams to be emitted, it is preferable that the center frequencies of a plurality of laser light sources are different by 0.1 nm or larger. Additionally, because multi-mode wavelength conversion corresponding to the respective oscillation wavelengths is performed in the same wavelength converter in response to a change of the phase matching condition according to a change of the angle of the laser beam, it is preferable that a difference between the shorted oscillation wavelength and the longest oscillation wavelength is less than 40 nm.

The wavelength converter 10 is a preferable embodiment in which the end faces thereof serve as the laser beam reflective surfaces of a convex shape and thereby play a role of the condensing surface and a role of the laser beam reflective surfaces at the same time. By using the end faces of the wavelength converter as the laser beam reflective surfaces and the condensing surfaces, it becomes possible to reduce the components and the adjustment steps in comparison with a case where optical members, such as the reflective surfaces and the condensing surfaces, are disposed on the outside of the wavelength converter. Additionally, the structure can be made compact. In particular, in the case of using a plurality of laser beams having different wavelengths as in the present embodiment, by making the end faces of the wavelength converter to be the convex reflective surfaces, separation of a laser beam caused by color dispersion in the wavelength converter can be eliminated. It is therefore possible to allow a plurality of laser beams to propagate in the wavelength converter repetitively in the same beam path even when the wavelengths of the laser beams are different. The wavelength conversion between modes and high conversion efficiency can be thus achieved.

Besides the laser fiber, various types of laser light sources, such as a semiconductor laser and a solid-state laser, can be used as the laser light sources. The condensing optics is not particularly limited and various optical components are available as long as it is capable of injecting a laser beam between the reflective surface from the injection section and also capable of controlling and condensing the laser beam. Various nonlinear materials can be used as the wavelength converter.

For example, LBO or KTP, or $LiNbO_3$ or $LiTaO_3$ having the periodically poled structure can be used as the wavelength converter.

In the present embodiment, the emitting surface of the wavelength-converted beams is provided only to one end face (end face 12) of the wavelength converter. However, a transmission coating for wavelength-converted beams may be applied also on the end face 13, so that the converted waves can be outputted from the both end faces.

Sixteenth Embodiment

FIG. 19 is view schematically showing the structure of a wavelength conversion laser device 1500 according to a sixteenth embodiment of the invention.

The wavelength conversion laser device 1500 includes a wide stripe LD 1c serving as a laser light source, condensing optics 25, a concave mirror 37 and a cylindrical concave mirror 47 serving as reflective surfaces and condensing surfaces for a laser beam, and a wavelength converter 60.

The wide stripe LD 1c is a high-output LD having the center oscillation wavelength of 1064 nm and the stripe width of 100 µm and oscillating in the longitudinal and lateral multi-modes. The wavelength converter 60 has a length of 25 mm, the width of 5 mm, and the thickness of 1 mm and a laser beam traveling direction is the length-wise direction thereof. The cylindrical concave mirror 47 has a curvature in the width-wise direction of the wavelength converter 60 and the end portion (on the front side in FIG. 19) is cut off. This cut-off portion serves as an injection section for injecting a laser beam between the reflective surfaces. A laser beam emitted from the wide stripe LD 1c shifts in the width-wise direction of the wavelength converter 60 from the principal ray axis linking the respective centers of curvatures of the concave mirror 37 and the cylindrical concave mirror 47 and is injected between the reflective surfaces from the injection section. The laser beam passes through the wavelength converter 60 by changing the incident angle in the width-wise direction of the wavelength converter 60 as it is reflected from the concave mirror 37 and the cylindrical concave mirror 47 each having a curvature. After the beam waist is formed in the wavelength converter 60 by the condensing optics 25, the laser beam reaches the concave mirror 37, and thereafter, it reciprocates between the reflective surfaces (between the concave mirror 37 and the cylindrical concave mirror 47). Owing to the light-gathering power of the condensing optics 25 and the curvatures of the two mirrors 37 and 47, the laser beam forms a plurality of beam waists at different positions in the wavelength converter 60 while it reciprocates between the reflective surfaces. In the wavelength conversion laser device 1500, by using the cylindrical concave mirror 47, different beam waists are formed in the principal ray axis direction of the laser beam to promote the dispersion of the beam waist positions (focal points) P. It is therefore possible to avoid concentration of light intensity inside the wavelength converter 60.

The wavelength converter 60 is made of a $MgO:LiNbO_3$ crystal having the periodically poled structure and the periodically poled structure is formed uniformly in the longitudinal direction. In the wavelength converter 60, the passing periods of a laser beam is changed by allowing the laser beam to pass through the wavelength converter 60 by changing the angle due to the curvatures of the condensing surfaces, and a wavelength-converted beam having 532 nm at the center, which is a sum frequency of the second harmonic wave of the laser beam and the longitudinal multi-mode, is generated. The concave mirror 37 is a spherical mirror having the curvature radius of 25 mm. It has an HR coating for a laser beam having the wavelength of 1064 nm and an AR coating for a wavelength-converted beam having a wavelength of 532 nm, and thereby serves as the emitting surface for the wavelength-converted beam. The cylindrical concave mirror 47 has a curvature of 20 mm in the width-wise direction of the wavelength converter 60 and has a reflection coating for a laser beam and a wavelength-converted beam. The distance between the concave mirror 37 and the cylindrical concave mirror 47 is about 36 mm, which is in the vicinity of a sum of the focal lengths of the two mirrors 37 and 47. According to the foregoing structure, a laser beam passes through the wavelength converter 60 ten times or more. In the present embodiment, the laser beam repetitively passes through the wavelength converter 60 by changing the incident angle at the wavelength converter 60, so that the beam waist positions $P_{BW}$ are dispersed in the wavelength converter 60. It is therefore possible to have the phase matching condition in a wide range and thereby to achieve high conversion efficiency and a stable output.

The wide stripe LD 1c is disposed in such a manner that the width-wise direction of the stripe and the width-wise direction of the wavelength converter 60 coincide with each other. The width-wise direction of the wavelength converter 60 referred to herein specifies a direction in which the incident angle at the wavelength converter 60 is changed while the laser beam reciprocates between the reflective surfaces. In order to change the incident angle of the laser beam in the width-wise direction, the wavelength converter 60 has to be of a shape having a large width. In order to reduce the size and the cost, of the width and thickness-wise directions in a passing plane for the laser beam, the wavelength converter 60 has to make the width-wise direction longer. The wavelength converter 20 is of a rectangular prism shape and the width is longer than the thickness. Also, the width-wise direction of the stripe specifies a direction in which a laser beam cannot be reduced sufficiently by the wide stripe LD 1c. In a case where a mirror or the like is disposed between the laser light source and the wavelength converter and the direction of a laser beam is changed before the laser beam is injected between the reflective surfaces, it is arranged in such a manner that the width-wise direction of the wavelength converter and the direction in which the laser beam cannot be reduced sufficiently coincide with each other.

The condensing optics 25 includes a collimator 25a and a collective lens 25b and forms a focal point in the wavelength converter 60 before the laser beam goes incident on the reflective surface. Further, the condensing optics 25 includes a λ/2 plate 25c between the collimator 25a and the collective lens 25b, and thereby plays a role of aligning the polarization direction of the laser beam to the z axis direction of the $LiNbO_3$.

The present embodiment is a preferable embodiment in which the laser light source is made up of a wide stripe LD that emits a multi-mode laser beam, the width-wise direction of the active layer in the wide stripe and the width-wise direction of the wavelength converter coincide with each other, and the wavelength converter generates multi-mode wavelength-converted beams made up of a plurality of beams while the laser beam reciprocates between the reflective surfaces for emitting the multi-mode wavelength-converted beams. Conventionally, because the wide stripe LD has low conversion efficiency due to multi-mode oscillation and is not used as the fundamental light source for wavelength conversion. However, according to the structure of the present embodiment, it is possible to increase the conversion efficiency by increasing the variety of the phase matching condition and allowing a laser beam to pass through the wavelength converter plural times. It is therefore possible to achieve a wavelength conversion laser device using a wide stripe LD with high luminous efficiency.

Also, according to the structure of the present embodiment, a laser beam passes through the wavelength converter by changing the incident angle at the wavelength converter. Hence, there is a characteristic that the wavelength converter is long in the width-wise direction in which the angle is changed (that is, the width-wise direction of the laser beam passing plane of the wavelength converter is longer than the thickness-wise direction) and the tolerance for a beam diameter is large. By bringing the width-wise direction of the wavelength converter and the stripe width-wise direction of the wide stripe LD into coincidence, even when the wide stripe LD is used, a laser beam is allowed to pass through the wavelength converter plural times and the variety of the phase matching condition is increased. It is therefore possible to output multi-mode wavelength-converted beams at high conversion efficiency. Additionally, because the luminous efficiency of the wide stripe LD is high, it is possible to increase the efficiency as the wavelength conversion laser device.

Further, the wavelength conversion laser device of the present embodiment is capable of obtaining a low coherent laser most suitable for videos and lighting by emitting longitudinal multi-mode wavelength-converted beams. The wide stripe LD of the present embodiment means an LD having a stripe width of 5 μm or larger and performs multi-mode oscillation. In particular, in order to obtain high conversion efficiency, the stripe width is preferably in a range of 5 μm to 200 μm, both inclusive. When the stripe width is wider than 200 μm, light intensity drops considerably and the conversion efficiency is lowered. Also, when the conversion stripe is wider than 200 μm, the field intensity expands exceedingly to the extent that the luminous efficiency of the wide stripe LD is lowered.

Seventeenth Embodiment

FIG. 20 is a view schematically showing the structure of a wavelength conversion laser device 1600 according to a seventeenth embodiment of the invention.

The wavelength conversion laser device 1600 includes a bar type LD 1*d*, a lens array 26 serving as condensing optics, and a wavelength converter 61. The bar type LD 1*d* has two single-mode LD stripes each oscillating a beam having a wavelength of 1040 nm inside the same stack at an interval of 1 mm and emits two laser beams. The lens array 26 is arrayed at the same interval as that of the LD stripes, and condenses laser beams emitted from the respective stripes so as to have focal points in the wavelength converter 61. The lens array 26 allows the two laser beams to enter into the wavelength converter 61 from regions denoted as 61*a* and 61*b* serving as laser beam injection sections of the wavelength converter 61.

The wavelength converter 61 is made of a LiTaO$_3$ crystal having the periodically poled structure and has the length of 12 mm, the width of 1.5 mm, and the thickness of 0.8 mm. The end face on the incident side for a laser beam and the end face on the emitting side for a wavelength-converted beam are worked to have a convex shape. The z axis of the LiTaO$_3$ crystal is the width-wise direction of the wavelength converter 61 and coincides with the bar direction of the bar type LD 1*d*. Additionally, the periodically poled structure is formed so that the direction of the periods is in the length-wise direction of the wavelength converter 61. In the wavelength converter 61, two laser beams are converted to second harmonic waves, which are the wavelength-converted beams generated by the periodically poled structure. Also, in a case where two laser beams overlap, the wavelength converter 61 also generates sum frequency.

In the wavelength converter 61, the convex cylindrical end face 61*c* serving as the incident surface for a laser beam is worked to have a convex cylindrical shape and has a curvature in the bar direction of the bar type LD 1*d*. The curvature radius is 8 mm. The convex cylindrical end face 61*c* has a reflection coating for a laser beam and a wavelength-converted beam except for the injection sections 61*a* and 61*b* and thereby serves as the reflective surface and the condensing surface for a laser beam. The injection sections 61*a* and 61*b* have an AR coating for a laser beam and thereby form inlets through which a laser beam is injected between the reflective surfaces.

In the wavelength converter 61, the convex spherical end face 61*d* positioned on the opposite side of the convex cylindrical end face 61*c* in the length-wise direction is worked into a convex spherical surface and the curvature radius thereof is 16 mm. The convex spherical end face 61*d* has a reflection coating for a laser beam and an AR coating for a wavelength-converted beam. Hence, it serves not only as the reflective surface and the condensing surface for a laser beam but also as the emitting surface for wavelength-converted beams. Being of a convex spherical shape, the convex spherical surface end face 61*d* also has a light-collecting function of a lens for wavelength-converted beams and prevents expansion of emitted beam of the wavelength-converted beams.

In the wavelength conversion laser device 1600, the two end faces 61*c* and 61*d* of the wavelength converter 61 serve as the reflective surfaces and the condensing surfaces for a laser beam. Accordingly, a laser beam passes through the wavelength converter 61 by changing the incident angle at the wavelength converter 61 and the wavelength converter 61 generates wavelength-converted beams under the phase matching condition that varies with the angle. Additionally, the wavelength conversion laser device 1600 is capable of obtaining a stable high output characteristic by dispersing a plurality of beam waists positions $P_{BW}$ in the wavelength converter using the condensing optics and the condensing surfaces.

The present embodiment is a preferable embodiment in which the laser light source is made up of a plurality of light sources emitting a plurality of laser beams, and the plurality of laser beams are injected between the two laser beam reflective surfaces from different points having no reflection capability. As described, an output power of the wavelength-converted beams can be increased by increasing the laser light sources while using the single wavelength converter. It is therefore possible to increase an output and reduce the size of the wavelength conversion laser device. Additionally, in the present embodiment, the optics that combines a plurality of laser beams can be eliminated and both the cost and the size can be reduced. The present embodiment has the phase matching condition in a wide range by changing the incident angle of a laser beam into the wavelength converter. Accordingly, it becomes possible to simultaneously convert wavelengths of a plurality of laser beams entering into the wavelength converter from different portions. Additionally, in the present embodiment, it is possible to perform wavelength conversion using a plurality of laser beams, such as a sum frequency and a difference frequency, by utilizing overlapping of laser beams in the wavelength converter. A multi-mode wavelength-converted beam can be thus obtained. In the case of a high output, the injection section for a laser beam into the wavelength converter may possibly be damaged. However, by providing the injection sections for a plurality of laser beams at different points using the structure of the present embodiment, it becomes possible to provide a highly reliable high-output wavelength conversion laser device by preventing damage on the wavelength converter.

The wavelength conversion laser device 1600 of the present embodiment is a preferable embodiment in which the bar type LD (multi-stripe LD) is used as a plurality of laser light sources and the lens array is used as the condensing optics. According to the foregoing structure, it becomes possible to dispose a plurality of light sources and corresponding condensing opticses in a compact size. This facilitates adjustments of the plurality of light sources and the corresponding condensing opticses. The wavelength conversion laser device can be reduced in size, too. The wavelength converter 61 is a preferable embodiment in which the width and the thickness are 2 mm or smaller and the end faces thereof serve as the reflective surfaces for a laser beam. According to the foregoing structure, not only can the wavelength conversion laser device be reduced in size, but also the emission area for wavelength-converted beams can be smaller. It is therefore possible to introduce the wavelength-converted beams into a fiber.

Eighteenth Embodiment

FIG. 21A and FIG. 21B are views schematically showing the structure of a wavelength conversion laser device 1700 according to an eighteenth embodiment of the invention. Members having the same structures and functions as those of the fifteenth through seventeenth embodiments above are designated by the same reference numerals.

The wavelength conversion laser device 1700 includes a laser light source 1a, condensing optics 27, a wavelength converter 62, and a first concave mirror 34 and a second concave mirror 48 serving as reflective surfaces for a laser beam. The laser light source 1a is an Yb-doped fiber laser oscillating a beam having a wavelength of 1060 nm. The condensing optics 27 is made up of a collimator 27a and a collective lens 27b. The collective lens 27b is disposed off-center in the thickness-wise direction of the wavelength converter 62 and inclines a laser beam in the thickness-wise direction. The second concave mirror 48 is cut off in the shape of a capital D and this cut-off portion serves as the injection section for a laser beam to be injected between the reflective surfaces.

The first concave mirror 34 is a spherical surface having a curvature radius of 25 mm. It has a reflection coating for a laser beam and an AR coating for a wavelength-converted beam and thereby serves as an emitting surface for a wavelength-converted beam. The second concave mirror 48 is a spherical surface having a curvature radius of 20 mm and has a reflection coating for a laser beam and a wavelength-converted beam. The first concave mirror 34 and the second concave mirror 48 are disposed so that the centers of curvatures oppose each other. An axis linking the respective centers of curvatures is referred to as the principal ray axis ML of the wavelength conversion laser device.

A laser beam injected between the reflective surfaces from the position shifted from the principal ray axis ML in the width-wise direction of the wavelength converter 62 by the condensing optics 27 forms the beam waist in the wavelength converter 62, and then reaches the first concave mirror 34. The laser beam is injected by the condensing optics 27 with an inclination with respect to the principal ray axis in the thickness-wise direction of the wavelength converter 62. As shown in FIG. 21A, the laser beam repetitively passes through the wavelength converter 62 by changing the angle with respect to the shift direction of the entering position from the principal ray axis ML. Also, as shown in FIG. 21B, the laser beam repetitively changes the angle in the thickness-wise direction by entering into the wavelength converter 62 while being inclined from the principal ray axis ML in the thickness-wise direction, too. In this manner, the laser beam repetitively passes through the wavelength converter 62 by changing the angle at which it passes through the wavelength converter 62 in two axes in the width-wise direction and the thickness-wise direction of the wavelength converter 62. The focal points of the laser beam are also dispersed in the two axes in the width-wise direction and the thickness-wise direction of the wavelength converter 62.

The wavelength converter 62 is made of a $MgO:LiNbO_3$ crystal having the periodically poled structure and is of a rectangular prism shape having the length of 25 mm, the width of 5 mm, and the thickness of 2 mm. The wavelength converter 62 has the poling periods in the thickness-wise direction thereof and generates a second harmonic wave of a laser beam, which is the wavelength-converted beam. Because the laser beam passes through the wavelength converter 62 at various angles, it has the phase matching condition in a wide range in a total of multi beam paths.

The present embodiment is a preferable embodiment in which a laser beam repetitively passes through the wavelength converter by changing the angle at which the laser beam passes through the wavelength converter in two axes. By changing angles of beam passes in biaxial directions, it becomes possible to increase a volume of the beam paths passing through the wavelength converter so that heat generated in the wavelength converter due to light absorption can be dispersed. Additionally, by also dispersing the beam waist positions $P_{BW}$ of the laser beam in the wavelength converter in two axes, it becomes possible to avoid concentration of the beam waist positions $P_{BW}$. Heat generated by light absorption in the wavelength converter causes a lower conversion efficiency at high output power. However, by dispersing the heat generation portions, it becomes possible to prevent a lower conversion efficiency by mitigating a temperature rise.

In the wavelength conversion laser device 1700, the beam diameter of the beam waist formed for the second time and thereafter becomes smaller than the beam diameter of the beam waist formed first in the wavelength converter 62 by the condensing optics 27. For example, given 125 μm as the beam diameter of the first beam waist, then the beam diameter of the second beam waist is 100 μm and the beam waist of the third beam waist is 80 μm. In the beam paths in the wavelength converter 62 on which the second and third beam waists are formed, the beam diameters in the wavelength converter 62 are smaller than the beam diameter on the beam path that first passes through the wavelength converter 62, and the conversion efficiency is higher. Accordingly, power of the wavelength-converted beams generated on the second and third beam paths is larger than that on the beam path that first passes through the wavelength converter 62.

The present embodiment is a preferable embodiment in which power of the wavelength-converted beam outputted from a beam path passing through the wavelength conversion at later times is larger than that of the wavelength-converted beam outputted from the beam path along which a laser beam first passes through the wavelength converter. Because the power of the laser beam is the highest on the beam path that first passes through the wavelength converter, damage on the wavelength converter caused by light absorption and the thermal lens readily occur. However, by suppressing the generation of a wavelength-converted beam, an increase of light absorption can be prevented. It is therefore possible to prevent the occurrence of the damage and the thermal lens. In particular, it is preferable to make the beam diameters of the beam waists smaller on the beam paths at later times than the beam diameter on the beam path that first passes through the wavelength converter. Accordingly, in the case of the temperature condition under which the phases are matched on the beam path that first passes through the wavelength converter, the light intensity is small because the beam diameter at the beam waist position $P_{BW}$ is large. It is therefore possible to prevent damage on the wavelength converter, which makes it possible to prevent the conversion efficiency on the beam path that first passes through the wavelength converter from becoming exceedingly high.

Nineteenth Embodiment

FIG. 22 is a schematic view showing power modulation of a laser beam in a case where a pulsed beam having the pulse width of the order of msec is outputted from a wavelength conversion laser device of the present embodiment. Members having the same structures and functions as those of the fifteenth through eighteenth embodiments above are designated by the same reference numerals. In the present embodiment, the wavelength conversion laser device 1700 of the eighteenth embodiment above is used.

In the present embodiment, a wavelength-converted beam having a pulse width of 2.4 msec is emitted at the repetition frequency of 120 Hz. In this instance, a laser beam to be emitted from the laser light source is also emitted with a pulse width of 2.4 msec at the repetition frequency of 120 Hz. Hence, an output power of the laser beam is modulated as shown in FIG. 22. In short, the power of a laser beam in a pulse becomes larger at the ending (immediately after the falling of the pulse) than at the beginning (immediately after the rising of the pulse). In the present embodiment, in order to emit a wavelength-converted beam at a 6 W peak, the power of a laser beam is modulated linearly so that it is 9 W at the beginning and 10 W at the end within a pulse. By modulating the power of a laser beam within a pulse as described above, the power of a wavelength-converted beam to be emitted becomes constant within a pulse.

The present embodiment is a preferable embodiment in which the laser light source emits a pulse laser beam having a pulse width of 0.1 msec or longer; and the pulse laser beam has a larger power at an end than that at a beginning. The wavelength conversion laser device of the present embodiment may possibly cause a power variance within a pulse due to a temperature change of the wavelength converter when a pulsed beam having the pulse width of 0.1 msec or longer is emitted. At the time of a high output, light absorption becomes particularly noticeable. However, as in the present embodiment, by modulating power within a pulse so that it is larger at the ending than at the beginning, it becomes possible to reduce a power variance within a pulse, which makes it possible to make an output power of a wavelength-converted beam constant within a pulse. In particular, it is preferable that the power at the ending is higher by 5% or more than the power at the beginning. By increasing the power by 5% or more in this manner, it becomes possible to compensate for power down occurring at the ending within a pulse even at a high output. When a laser beam having a pulse width shorter than 0.1 msec is outputted, because of the time response of a temperature change in the wavelength converter, a temperature variance within a pulse is small and so is a power variance within a pulse. A power variance is therefore negligible. The power modulation of the present embodiment is required in a case where a laser beam having a pulse width of 0.1 msec or longer is outputted. In the wavelength conversion laser device of the present embodiment, because a laser beam passes through the wavelength converter plural times, light absorption in the overall wavelength converter becomes larger than that in the conventional structure in which a laser beam passes through only once. Hence, the power modulation of the present embodiment is useful for the structure of the wavelength conversion laser device of the present embodiment. In particular, in a case where the wavelength conversion laser device of the present embodiment is used for videos, a drop of the output within a pulse at the ending can disturb the expression of grayscales or reduce the luminance to be displayed. The power modulation of the present embodiment is therefore effective.

In the present embodiment, as shown in FIG. 22, the power of a laser beam within a pulse is modulated linearly so that the power becomes larger at the ending than at the beginning. It should be appreciated, however, that the invention is not limited to the foregoing structure and it is sufficient to configure in such a manner that the power of a laser beam within a pulse becomes larger at the ending than at the beginning. For example, nonlinear modulation or step modulation by which the power level increases step by step from the beginning to the ending are also available.

Twentieth Embodiment

FIG. 23 is a view schematically showing the configuration of a wavelength conversion laser device 1800 according to a twentieth embodiment of the invention. Members having the same structures and functions as those of the fifteenth through nineteenth embodiments above are designated by the same reference numerals.

The wavelength conversion laser device 1800 shown in FIG. 23 includes a laser light source 1e, condensing optics 28, a first concave mirror 38, a second concave mirror 49, a first nonlinear optical crystal 63, and a second nonlinear optical crystal 64.

In the wavelength conversion laser 1800, the wavelength converter disposed between the reflective surfaces that reflect a laser beam is made up of the first nonlinear optical crystal 63 and the second nonlinear optical crystal 64. The laser light source 1e that emits a laser beam is a single-mode LD configured to emit a laser beam having a wavelength of 1040 nm. The first nonlinear optical crystal 63 is made of a MgO: $LiNbO_3$ crystal having the periodically poled structure and generates a first wavelength-converted beam having a wavelength of 520 nm, which is a second harmonic wave of the laser beam. The second nonlinear optical crystal 64 is made of LBO ($LiB_3O_5$) and generates a second wavelength-converted beam having a wavelength of 260 nm, which is a second harmonic wave of the first wavelength-converted beam.

Both the first nonlinear optical crystal 63 and the second nonlinear optical crystal 64 are of a rectangular prism shape and have an AR coating for a laser beam and the first wavelength-converted beam on the end faces from which a laser beam comes in and goes out. The second nonlinear optical crystal 64 has a reflection coating for the second wavelength-converted beam on the end face on the first nonlinear optical crystal 63 side and an AR coating for the second wavelength-converted beam on the end face on the first concave mirror 38 side. The first concave mirror 38 has a reflection coating for a laser beam and the first wavelength-converted beam and an AR coating for the second wavelength-converted beam and thereby serves as the emitting surface for the second wavelength-converted beam. The second concave mirror 49 has a reflection coating for a laser beam and the first wavelength-converted beam. The first concave mirror 38 and the second concave mirror 49 serve as the reflective surfaces and the condensing surfaces for a laser beam and also serve as the reflective surfaces and the condensing surfaces for the first wavelength-converted beam. The second concave mirror 49 is cut off in the shape of a capital D and this cut-off portion forms the injection section for a laser beam.

The first nonlinear optical crystal 63 is provided on the upstream side in the traveling direction of a laser beam entering therein from the injection section. The second nonlinear optical crystal 64 is provided on the downstream side in the traveling direction of the laser beam. Accordingly, a laser beam from the laser light source 1*e* enters first into the first nonlinear optical crystal 63 via the condensing optics 28.

A laser beam is injected between the laser beam reflective surfaces from the injection section by the condensing optics 28 made up of a collimator 28*a* and a collective lens 28*b* and forms a beam waist in the second nonlinear optical crystal 64, after which it reaches the first concave mirror 38. In this instance, the first wavelength-converted beam is generated inside the first nonlinear optical crystal 63. The first wavelength-converted beam also forms the beam waist within the second nonlinear optical crystal 64. The second wavelength-converted beam is then generated inside the second nonlinear optical crystal 64. The second wavelength-converted beam thus generated is emitted from the first concave mirror 38 whereas the laser beam and the first wavelength-converted beam are reflected from the first concave mirror 38 to enter into the second nonlinear optical crystal 64. The first wavelength-converted beam is converted and the second wavelength-converted beam is generated again inside the second nonlinear optical crystal 64. The second wavelength-converted beam is reflected from the end face of the second nonlinear optical crystal 64 on the first nonlinear optical crystal 63 side and then emitted from the first concave mirror 38. The laser beam forms a plurality of beam waists while it reciprocates between the first concave mirror 38 and the second concave mirror 49 and enters into the first wavelength converter by changing the incident angle. The laser beam thereby repetitively generates the first wavelength-converted beams. The first wavelength-converted beam generated in the first wavelength converter (first nonlinear optical crystal 63) reciprocates between the first concave mirror 38 and the second concave mirror 49. Hence, the first wavelength-converted beam repetitively enters into the second wavelength converter (second nonlinear optical crystal 65) by changing the incident angle in this instance and generates the second wavelength-converted beams.

The present embodiment is a preferable embodiment in which the wavelength converter is made up of at least the first nonlinear optical crystal 63 and the second nonlinear optical crystal 64, so that the first wavelength-converted beams of a laser beam are generated on multi beam paths in the first nonlinear optical crystal 63 and the second wavelength-converted beams using the first wavelength-converted beams are generated on multi beam paths in the second nonlinear optical crystal 64 for emitting the second wavelength-converted beams. Conventionally, the conversion efficiency is low in the high-order harmonic generation called third harmonic generation and fourth harmonic generation, and a resonator configuration, such as an external resonator, is required in order to increase the conversion efficiency. It is, however, necessary for the resonator configuration to adjust optical components at accuracy in the order of wavelength for maintaining resonance. This raises problems in terms of the cost and stability. On the contrary, in the present embodiment, two nonlinear optical crystals are used as the wavelength converter, and by exploiting an event that a laser beam changes an angle at which it passes through the wavelength converter, the first wavelength-converted beam is allowed to pass through the second nonlinear crystal 64 plural times by changing an angle at which the first wavelength-converted beam passes through the second nonlinear optical crystal 64. Accordingly, the conversion efficiency can be increased when generating the second wavelength-converted beam using the first wavelength-converted beam, which can in turn widen the range of the phase matching condition to obtain the second wavelength-converted beam. The wavelength conversion laser beam 1800 of the present embodiment is thus capable of obtaining the second wavelength-converted beams, which are high-order harmonic waves, at high conversion efficiency in a stable manner. Different from the resonator configuration, the optical components can be adjusted easily, and both the cost and the size can be reduced. Additionally, by using two types of nonlinear optical crystals, it becomes possible to select crystals having small light absorption and high conversion efficiency with respect to the respective wavelength-converted beams separately for the first wavelength-converted beam generation and the second wavelength-converted beam generation. Further, it becomes possible to increase the conversion efficiency while preventing heat generation occurring because a laser beam and the first wavelength-converted beam pass through the wavelength converter plural times.

The wavelength conversion laser device 1800 of the present embodiment is a preferable embodiment in which the second wavelength-converted beam is UV light having the wavelength shorter than 380 nm. Conventionally, UV light has problem, such as UV-induced damage and heat generation, resulting from light absorption in the nonlinear optical crystals, and imposes the limitation on the range of nonlinear optical crystals available for a high output. The high conversion efficiency cannot be therefore obtained. Nevertheless, in the present embodiment, because UV light is generated on multi beam paths, the light intensity of UV light is low even at a high output. Damage and heat generation can be thus avoided and various nonlinear optical crystals become available. It is thus possible to increase the conversion efficiency while obtaining a high output.

The second nonlinear optical crystal 64 is a preferable embodiment in which the reflective surface for the second wavelength-converted beam is provided on the end face on the first wavelength-converted optical crystal 63 side. Instead of this configuration, it is possible to provide the reflective surface for the second wavelength-converted beam to the first nonlinear optical crystal 63 on the end face on the second nonlinear optical crystal 64 side. In the present embodiment, it is preferable that the reflective surface or the emitting surface for the second wavelength-converted beam is present between the first nonlinear optical crystal 63 and the second nonlinear optical crystal 64. By configuring in such a manner so as to prevent the second wavelength-converted beam from entering into the first nonlinear optical crystal 63 as described above, it becomes possible to eliminate light absorption of the second wavelength-converted beam inside the first nonlinear optical crystal 63. Hence, not only is it possible to increase the conversion efficiency by eliminating heat generation in the first nonlinear optical crystal 63 induced by the second wavelength-converted beam, but it is also possible to widen the range of selections for the first nonlinear optical crystal 63 used at a high output. In the present embodiment, a MgO: $LiNbO_3$ crystal that absorbs UV rays but has a large nonlinear optical constant can be used as the first nonlinear optical crystal 60. The conversion efficiency can be thus increased.

The wavelength conversion laser device 1800 is a preferable embodiment in which the focal point formed by the condensing optics 28 is present within the second nonlinear optical crystal 64, so that a plurality of beam waists of the first wavelength-converted beams are formed within the second nonlinear optical crystal 64. The conversion efficiency is readily lowered in the generation of the second wavelength-converted beams. However, by forming a plurality of beam waists of the first wavelength-converted beams within the second nonlinear optical crystal 64, the conversion efficiency can be increased.

The present embodiment is a preferable embodiment in which the first wavelength-converted beam is reflected from the two laser beam reflective surfaces, the first concave mirror 38 and the second concave mirror 49, so that the first wavelength-converted beam that is not converted to the second wavelength-converted beam passes through again the second nonlinear optical crystal 64. By reflecting the first wavelength-converted beam on the laser beam reflective surfaces so as to reciprocate between the reflective surfaces, an output power of the first wavelength-converted beam entering into the second nonlinear optical crystal 64 becomes larger. The conversion efficiency can be thus increased. Additionally, because the angle of the first wavelength-converted beam passing through the second nonlinear optical crystal 64 changes in various manners, there are various phase matching conditions. Hence, by putting multi beam paths together, the device can have an extremely wide phase matching range. When the phase matching range is wide, high conversion efficiency can be maintained even when the temperature or the incident wavelength changes, which in turn enables the wavelength conversion laser device to operate in a stable manner.

Twenty-First Embodiment

FIG. 24 is a view schematically showing the configuration of a wavelength conversion laser device 1900 according to a twenty-first embodiment of the invention. Members having the same structures and functions as those of the fifteenth through twentieth embodiments above are designated by the same reference numerals. The wavelength conversion laser device 1900 shown in FIG. 24 includes a laser light source 1e, condensing optics 29, a concave mirror 39, a first nonlinear optical crystal 65, and a second nonlinear optical crystal 66.

The wavelength conversion laser device 1900 has a wavelength converter made up of the first nonlinear optical crystal 65 and the second nonlinear optical crystal 66 as well as the concave mirror 39 serving as the condensing surface for a laser beam between the reflective surfaces for a laser beam. The laser light source 1e is a single-mode LD that oscillates a beam having a wavelength of 1040 nm. The first nonlinear optical crystal 65 is made of a MgO:LiNbO$_3$ crystal having the periodically poled structure and generates a first wavelength-converted beam having the wavelength of 520 nm, which is a second harmonic wave of a laser beam. The end face 65a of the first nonlinear optical crystal 65 on the side opposite to the concave mirror 39 has a reflection coating for a laser beam and an AR coating for the first wavelength-converted beam and thereby serves as the reflective surface for a laser beam and the emitting surface for the first wavelength-converted beam. The second nonlinear optical crystal 66 is made of LBO and generates a second wavelength-converted beam having a wavelength of 260 nm, which is a second harmonic wave of the first wavelength-converted beam. The end face 66a of the second nonlinear optical crystal 66 on the side opposite to the concave mirror 39 has a reflection coating for a laser beam, the first wavelength-converted beam, and the second wavelength-converted beam and thereby serves as the reflective surface for a laser beam and the like. The concave mirror 39 has a reflection coating for a laser beam and the first wavelength-converted beam and an AR coating for a second wavelength-converted beam and thereby serves as the emitting surface for the second wavelength-converted beam.

In the wavelength conversion laser device 1900, a laser beam emitted from the laser light source 1e undergoes a condensing operation by the condensing optics 29 and then passes by the vicinity (side) of the second nonlinear optical crystal 66 to be injected between the reflective surfaces. In short, the side of the second nonlinear optical crystal 66 forms an injection section 70 between the reflective surfaces. A laser beam forms a beam waist at the side of the second nonlinear optical crystal 66 owing to the condensing optics 29 and is reflected from the concave mirror 39 to enter into the first nonlinear optical crystal 65. The first wavelength-converted beam generated before a laser beam reaches the end face 65a of the first nonlinear optical crystal 65 is emitted from the end face 65a of the first nonlinear optical crystal 65. The laser beam is reflected from the end face 65a of the first nonlinear optical crystal 65 and the first wavelength-converted beam is generated again in the first nonlinear optical crystal 65. The laser beam and the first wavelength-converted beam are reflected from the concave mirror 39 and then enter into the second nonlinear optical crystal 66 and form the beam waists within the second nonlinear optical crystal 66. In the second non-linear optical crystal 66, the second wavelength-converted beam is generated from the first wavelength-converted beam. The laser beam and the first and second wavelength-converted beams are reflected from the end face 66a of the second nonlinear optical crystal 66 and then reach the concave mirror 39. The second wavelength-converted beam is emitted from the concave mirror 39. Thereafter, the laser beam and the first wavelength-converted beam reflected from the concave mirror 39 enter into the first nonlinear optical crystal 65 at incident angles different from the angles before. The laser beam is converted to the first wavelength-converted beam inside the first nonlinear optical crystal 65 and the first wavelength-converted beam is emitted from the end face 65a of the first nonlinear optical crystal 65. The laser beam reflected from the end face 65a is converted again to the first wavelength-converted beam inside the first nonlinear optical crystal 65, and it is then reflected from the concave mirror 39 together with the first wavelength-converted beam, after which they enter into the second nonlinear optical crystal 66 at angles different from the angles before. In this manner, the laser beam repetitively passes through the nonlinear optical crystals by changing the incident angle at the nonlinear optical crystals while it reciprocates between the reflective surfaces, and repetitively generates the first wavelength-converted beams. Further, the second wavelength-converted beams are repetitively generated on multi beam paths from the first wavelength-converted beams generated as described above. Consequently, the first wavelength-converted beams and the second wavelength-converted beams are emitted from the wavelength conversion laser device 1900.

In the wavelength conversion laser device 1900, the end face 65a of the first nonlinear optical crystal 65 serves as the emitting surface for the first wavelength-converted beams and the concave mirror 39 serves as the emitting surface for the second wavelength-converted beams. The present embodiment is a preferable embodiment in which the first wavelength-converted beams and the second wavelength-converted beams are emitted to the outside and the emitting surface for the first wavelength-converted beams and the emitting surface for the second wavelength-converted beams are different. Accordingly, not only can a plurality of different wavelength-converted beams be obtained from the wavelength conversion laser device, but also the respective wavelength-converted beams can be obtained without the need to separate these beams. The present embodiment is a preferable embodiment in which the emitting surface for the second wavelength-converted beams is present between the first nonlinear optical crystal 65 and the second nonlinear optical crystal 66. It is therefore possible to prevent the occurrence of damage and light absorption in the first nonlinear optical crystal 65 by preventing the second wavelength-converted beams from entering into the first nonlinear optical crystal 65.

It should be appreciated that the invention is not limited to the embodiments described above and can be modified as needed without deviating from the scope of the invention. It goes without saying that the respective embodiments of invention above can be combined. It should be noted that the wavelength conversion laser device may be configured so as to output a difference frequency in addition to the second harmonic wave and a sum frequency. Additionally, the wavelength converter may be formed to have more than one type of poled structure each having a different period within the frequency converter.

Twenty-Second Embodiment

FIG. 25 is a schematic view of an image display device 2000 according to a twenty-second embodiment. Members having the same structures and functions as those of the fifteenth through twenty-first embodiments above are designated by the same reference numerals. The image display device 2000 shown in FIG. 25 includes a green wavelength conversion laser device 2100, a blue laser device 2001, a red laser device 2002, a collective lens 2010, a cross prism 2011, a rod integrator 71, a relay lens 2012, a field lens 2013, a spatial light modulator (abbreviated as SLM) 2014, a projection lens 2015, and a screen 2016.

The image display device 2000 is a full-color laser projector having the green wavelength conversion laser device 2100, the blue laser device 2001, and the red laser device 2002 described above.

The green wavelength conversion laser device 2100 has a fundamental laser light source 1, condensing optics 2, a meniscus mirror 80, a second concave mirror 4, and a wavelength converter 5. In other words, the green wavelength conversion laser device 2100 is of the same configuration as the wavelength conversion laser device 100 (see FIG. 1) of the first embodiment above except that the meniscus mirror 80 is used instead of the first concave mirror as the member serving as the reflective surface for a laser beam and the transmission surface for wavelength-converted beams.

The concave surface of meniscus mirror 80 serves as the reflective surface for a laser beam and reflects a laser beam for allowing the laser beam to re-enter into the wavelength converter 5 and for condensing the laser beam. Also, the meniscus mirror 80 transmits wavelength-converted beams and thereby functions as a meniscus lens having the concave surface and the convex surface for the wavelength-converted beams. The wavelength-converted beams made up of a plurality of beams are collected on the incident surface of the rod integrator 71 by the meniscus mirror 80. In the present embodiment, the convex surface of the meniscus mirror 80 has a curvature larger than that of the concave surface and thereby serves as a collective lens. Alternatively, it may be configured in such a manner that the center of curvature of the convex surface and the center of curvature of the concave surface of the meniscus mirror 80 are aligned so that multi beam paths of the wavelength-converted beams become near-parallel to one another by canceling out the curvature of the convex lens for the wavelength-converted beams. By using a meniscus mirror as a mirror for outputting the wavelength-converted beams in this manner, it becomes possible to directly collect the wavelength-converted beams outputted from a multi passes or make these beams near-parallel to one another. In the green wavelength-conversion laser device 2100 of the present embodiment, the wavelength-converted beams to be outputted are made up of a plurality of beams. However, by using the meniscus mirror 80 as an output mirror, these beams can be used with ease.

Blue and red laser beams emitted, respectively, from the blue laser device 2001 and the red laser device 2002 are collected on the incident surface of the rod integrator 71 by the collective lens 2010. The red, green, and blue laser beams are combined by the cross prism 2011 and enter into the rod integrator 71. The red, green, blue laser beams are superimposed one on another by the rod integrator 71 and have a rectangular homogeneous intensity distribution. The rod integrator 71 shapes a plurality of beams emitted from the green wavelength conversion laser device 2100 to have a homogeneous intensity distribution by superimposing these beams even when the beam intensity varies from one beam to another. Laser beams emitted from the rod integrator 71 illuminate the SLM 2014 by way of the relay lens 2012 and the field lens 2013. The SLM 2014 is made of transmissive liquid crystals and modulates red, green, and blue laser beams which are sequentially emitted in a time sharing manner. The beams modulated by the SLM 2014 are expanded by the projection lens 2015 and then projected onto the screen 2016.

The image display device of the present embodiment is a preferable embodiment in which the device has the wavelength conversion laser device (green wavelength conversion laser device 2100), the optics (rod integrator 71) that superimposes a plurality of wavelength-converted beams emitted therefrom, and the element (SLM 2014) that modulates the wavelength-converted beams. Because the wavelength conversion laser device of the present embodiment performs wavelength conversion by multi passes, it emits a plurality of beams each having different intensity. However, by superimposing these beams, it becomes possible to obtain the homogeneity required for the image display device. Additionally, a low coherent beam is required for the image display device in order to suppress an interference noise. Interference among beams is low for a plurality of beams emitted from the wavelength conversion laser device of the present embodiment and low coherent beams can be obtained by using these beams in a superimposed state. In particular, green light has higher visibility than the other colors and interference noises are easy to see for the viewer. It is therefore preferable to use low coherence beams using the configuration of the present embodiment. In the present embodiment, the wavelength-converted beams are modulated using the SLM 2014 and an image corresponding to an image signal can be displayed on the screen 2016.

As the SLM 2014, spatial light modulation elements, such as a reflective LCOS (Liquid Crystal On Silicon) and a DMD (Digital Micromirror Device, the registered trademark of Texas Instrument Inc., USA), can be used as well. Alternatively, it may be configured in such a manner that a spatial modulation element is used for each of red, green, and blue laser beams referred to as a triple LCD (Liquid Crystal Display). It should be appreciated that the element used to modulate the wavelength-modulated beams is not limited to the SLM and it may be formed by combining the intensity modulation of the wavelength-converted beams and a scanning optics.

In the present embodiment, the rod integrator is used as the optics to superimpose the wavelength-converted beams. However, a fly-eye lens and a lenticular lens can be used as well.

In the present embodiment, the green wavelength conversion laser device 2100 is used as the wavelength conversion laser device applied to the image display device. It should be appreciated that the invention is not limited to this configuration. More specifically, as the wavelength conversion laser device applied to the present embodiment, for example, the wavelength conversion laser devices described in the first through twenty-first embodiment above can be used.

Twenty-Third Embodiment

FIG. 26 is a schematic view of an image display device 3000 according to a twenty-third embodiment. Members having the same structures and functions as those of the fifteenth through twenty-first embodiments above are designated by the same reference numerals. The image display device 3000 shown in FIG. 26 includes a green wavelength conversion laser device 2100, a blue laser device 2001, a red laser device 2002, a collective lens 2010, a cross prism 2011, a waveguide rod 72, an optical waveguide 73, and a liquid crystal panel 74.

The image display device 3000 is a full-color liquid crystal display having the green wavelength conversion laser device 2100, the blue laser device 2001, and the red laser device 2002 described above.

Red, green, and blue laser beams emitted from the corresponding laser devices are combined in the cross prism 2011, and then enter into the waveguide rod 72. The laser beams entering into the waveguide rod 72 are guided to the optical waveguide 73. In this instance, the laser beams have a homogenous intensity distribution owing to the waveguide rod 72 and the optical waveguide 73 and illuminate the liquid crystal panel 74.

In the present embodiment, output beams made up of a plurality of beams emitted from the green wavelength conversion laser device 2100 are superimposed by the waveguide rod 72 and the optical waveguide 73.

The image display device of the present embodiment is a preferable embodiment in which the device has the wavelength conversion laser device (green wavelength conversion laser device 2100) of the present embodiment, the optics (waveguide rod 72 and optical waveguide 73) that superimposes a plurality of wavelength-converted beams emitted therefrom, and the element that modulates the wavelength-converted beams (liquid crystal panel 74). Because the wavelength conversion laser device of the present embodiment performs wavelength conversion by multi passes, it emits a plurality of beams each having different intensity. However, by superimposing these beams, it is possible to obtain the homogeneity required for the image display device. Additionally, a low coherent beam is required for the image display device in order to suppress an interference noise. Interference among beams is low for a plurality of beams emitted from the wavelength conversion laser device of the present embodiment and low coherent beams can be obtained by using these beams in a superimposed state. In particular, green light has higher visibility than the other colors and interference noises are easy to see for the viewer. It is therefore preferable to use low coherence beams using the configuration of the present embodiment. In the present embodiment, the wavelength-converted beams are modulated using the liquid crystal panel 74 and an image corresponding to an image signal can be displayed thereon.

In the present embodiment, the waveguide rod and the optical waveguide are used as the optics to superimpose the wavelength-converted beams. However, a circular or elliptical multi-mode optical fiber can be used as well.

In the present embodiment, the green wavelength conversion laser device 2100 is used as the wavelength conversion laser device applied to the image display device. It should be appreciated that the invention is not limited to this configuration. More specifically, as the wavelength conversion laser device applied to an image display device of the invention, for example, the wavelength conversion laser devices described in the first through twenty-first embodiment above can be used.

As described, a wavelength conversion laser device according to one aspect of the invention includes: a laser light source which emits a laser beam; two reflective surfaces which reflect therefrom a laser beam; a wavelength converter which converts a laser beam into a wavelength-converted laser beam, the wavelength converter being provided between the two reflective surfaces; and condensing optics which condense the laser beams to be injected between the two reflective surfaces, wherein at least one of the two reflective surfaces has a curvature for reflecting a laser beam to be re-injected into the wavelength converter between the two reflective surfaces repeatedly while forming multi paths of laser beams injected into the wavelength converter at different incident angles, and the condensing optics are arranged to disperse beam waists of the laser beams in the wavelength converter, which reciprocate between the two reflective surfaces.

According the foregoing structure, the wavelength converter is disposed between the two reflective surfaces at least one of which has a curvature, so that the laser beam reciprocates between the reflective surfaces plural times by changing the incident angle at the wavelength converter. The phase matching condition therefore changes by passes of the laser beam into the wavelength converter. The wavelength conversion laser device therefore has a plurality of phase matching conditions, even when a phase matching condition is shifted by a given pass, the phase matching conditions will match by other passes. It is therefore possible to compensate for deterioration of the conversion efficiency. As a result, wavelength converted laser beams can be obtained under stable conditions against environmental changes by realizing wider tolerance ranges for the phase matching conditions, such as temperatures and wavelengths, while maintaining high conversion efficiency. Additionally, low coherent wavelength-converted beams that perform laser oscillation with a wide spectrum width can be obtained. Further, by dispersing the beam waist positions of the laser beams within the wavelength converter by the condensing optics, it is possible to obtain high-output wavelength-converted beams with which light-induced damage on the wavelength converter while eliminating a problem with regard to the instability of wavelength conversion.

According to the foregoing structure, it is possible to realize a wavelength conversion laser device which is capable of obtaining high conversion efficiency and a stable high-output emission while outputting low coherent wavelength-converted beams with reduced speckle noises.

With the foregoing structure, it is preferable to arrange such that at least one of the two reflective surfaces has an incident section, which allows the condensed laser beam by the condensing optics to be injected between the two reflective surfaces.

By forming the injection section, which allows the condensed laser beam by the condensing optics to be injected between the two reflective surfaces as in the foregoing structure, a wider selection for the design choices becomes available for the structure of injecting the laser beam condensed by the condensing optic between the reflective surfaces. Furthermore, by increasing the reciprocating number of laser beams between the reflective surfaces, it is possible to realize an improved conversion efficiency.

With the foregoing structure, it is preferable to arrange such that at least one of the two reflective surfaces is transmissive to a wavelength-converted laser beam to be output therefrom.

According to the foregoing structure, the wavelength-converted beams can be extracted to the outside of the device suitably.

With the foregoing structure, it is preferable that the condensing optics condenses the laser beam so that a beam waist of the laser beam is formed within the wavelength converter before the laser beam is first reflected from one of the reflective surfaces.

According to the foregoing structure, the beam waist positions can be dispersed to many points over a wide range within the wavelength converter by forming a beam waist between the reflective surfaces before the laser beam is first reflected from one of the reflective surfaces. It is therefore possible to perform wavelength conversion under stable conditions even with a high output. Furthermore, the foregoing characteristic feature offers another effect that the total conversion efficiency can be improved.

With the foregoing structure, it is preferable that at least three beam waist positions of laser beams are dispersed in the wavelength converter; and let i, ii, iii be beam waists of laser beams which are formed in this order in the wavelength converter, and r_i, r_ii, and r_iii be beam waist radii of i, ii, and iii, respectively, then the following relationship holds:

r_i>r_ii>r_iii.

By adjusting the power density of the laser beam by reducing the beam waist radii sequentially from the beam waist formed first in the wavelength converter as in the foregoing structure, it is possible to prevent a breaking of the wavelength converter or the like, and to perform a wavelength conversion under stable conditions. Furthermore, total wavelength conversion efficiency can be increased by suppressing a reduction in conversion efficiency resulting from a drop in power of the laser beams that pass at later times.

With the foregoing structure, it is preferable that the wavelength converter has a periodically poled structure; and given that an optical axis linking respective centers of the two reflective surfaces is a principal ray axis, then the periodically poled structure is inclined with respect to the principal ray axis.

According to the foregoing structure, it is possible to obtain wavelength-converted beams under stable conditions against environmental changes or the like by realizing wider tolerance ranges for the phase matching conditions, for temperatures or the like.

With the foregoing structure, it is preferable to arrange such that the laser light source emits a pulse laser beam; the wavelength converter has a periodically poled structure; and let T be a pulse width of the laser beam, L be a length of the wavelength converter, Λ be a poling period of the poled structure, λ be a wavelength of the laser beam, and c be a velocity of light, then the pulse width of the laser beam is set to hold the following relationship: (L·λ)/(0.3·Λ·c)<T.

According to the foregoing structure, the wavelength conversion efficiency can be improved by increasing instantaneous power intensity by emitting a pulse laser beam. With this arrangement, by making the pulse width T of the laser beam wider than (L·λ)/(0.3·Λ·c), an expansion of the wavelength of the fundamental laser beam can be suppressed. The wavelength-converted beams can be thus outputted by performing phase matching in the wavelength converter in a stable manner.

With the foregoing structure, it is preferable that an output power of a wavelength-converted beam generated on a first beam path along which the laser beam passes through the wavelength converter is less than ⅔ of a total output power of the wavelength-converted beams generated on all beam paths along which the laser beam passes through the wavelength converter.

According to the foregoing structure, by setting an output power of the wavelength-converted beam generated on a beam path that first passes through the wavelength converter to be less than ⅔ of a total output power of all the beam paths, it is possible to suppress breaking and heat generation of the wavelength converter by preventing wavelength-converted beams from being generated intensively on the first beam path. It is therefore possible to realize a still higher wavelength conversion efficiency and stable wavelength conversion at the same time With the foregoing structure, it is preferable to arrange such that given that an optical axis linking respective centers of the two reflective surfaces is a principal ray axis, then the condensing optics injects the laser beam between the reflective surfaces with an inclination with respect to the principal ray axis.

With the foregoing structure wherein the laser beam is injected between the reflective surfaces with an inclination with respect to the principal ray axis, overlapping points of the laser beams repetitively reflected between the reflective surfaces can be dispersed to a plurality of points. It is therefore possible to avoid the concentration of the laser beam power at a certain point between the reflective surfaces. As a result, wavelength-converted beams can be emitted under stable conditions with high output power, while preventing a problem in view of the breaking of the wavelength converter and the instability of wavelength conversion.

With the foregoing structure, it is preferable to arrange such that the wavelength converter includes a portion with a periodically poled structure and a portion without a periodically poled structure which are formed in a thickness-wise direction, and the portion with a periodically poled structure is provided at least at around the center of the wavelength converter in the thickness-wise direction.

According to the foregoing structure, the wavelength converter includes not only the portion with a periodically poled structure but also the portion without a periodically poled structure. It is therefore possible to realize the structure wherein the portion with a periodically poled structure at least around the center in the thickness-wise direction of the frequency converter with ease. By forming the portion with a periodically poled structure at least at around the center in the thickness-wise direction of the wavelength converter, it is possible to eliminate shading on the reflective surface while the laser beams are reciprocating, and to perform a wavelength conversion efficiently.

With the foregoing structure, it is preferable to arrange such that the condensing optics has a larger lens power in a thickness-wise direction than that in a width-wise direction.

According to the foregoing structure, the laser beam injected between the reflective surfaces by the condensing optics is shaped into an elliptical beam and takes different beam waist positions in the thickness-wise direction and in the width-wise direction. Accordingly, the beam waist positions within the wavelength converter are dispersed further, which makes it possible to emit high-output wavelength-converted beams in a more stable manner. Moreover, the diffraction of the laser beam in the thickness-wise direction can be reduced.

With the foregoing structure, it is preferable to arrange such that at least one of the two reflective surfaces is made up of an anamorphic reflection mirror having different curvatures in a thickness-wise direction and in a width-wise direction of the wavelength converter.

According to the foregoing structure, because the laser beam is reflected from the anamorphic reflection mirror at different curvatures in the thickness-wise direction and in the width-wise direction, the laser beam is shaped into an elliptical beam and takes different beam waist positions in the thickness-wise direction and in the width-wise direction.

Accordingly, the beam waist positions within the wavelength converter can be further dispersed, thereby making it possible to high-output wavelength-converted beams in a more stable manner.

With the foregoing structure, it is preferable to arrange such that a coherence length of the laser beam is less than twice a distance between the reflective surfaces.

If the coherence length of the laser beam is set two or more times the distance between the reflective surfaces, an interference is likely occur at overlapping points of the laser beams reciprocating between the reflective surfaces, which raises problems associated with the breaking of the wavelength converter and the instability of wavelength conversion at a point caused by the interference at which the beam intensity is high. In response, by making the coherence length of the laser beam less than two times the distance between the reflective surfaces as in the configuration above as in the foregoing structure of the present embodiment, the problem in view of coherence can be avoided.

With the foregoing structure, it is preferable to arrange such that the laser light source is a laser light source in a longitudinal multi-mode, which emits a laser beam having a spectrum full width at half maximum of 0.5 nm or wider.

According to the conventional configuration, even when a broadband laser light source is used, an output wavelength-converted laser beam has a narrow bandwidth because of the narrow tolerance ranges for wavelengths. On the contrary, the tolerance ranges of the phase matching conditions for the wavelength is wide in the invention as described above. Hence, by using a longitudinal multi-mode laser light source (broadband laser light source) that emits a laser beam having the spectrum full width at half maximum of 0.5 nm or wider as in the configuration above, the bandwidth of output wavelength-converted beams can be widened. By widening the bandwidth of wavelength-converted beams in this manner, the coherence of the laser beam can be reduced, which can reduce interference noises that are problematic in the video field. In particular, it becomes possible to reduce random noises called speckle noises that provide the coherency of the laser.

With the foregoing structure, it is preferable to arrange such that the laser light source is a fiber laser device having a broadband fiber Bragging grating (FBG), with which a wavelength thereof is locked.

According to the foregoing structure, not only can the center wavelength and the bandwidth of a laser beam to be generated be designed, but also a high output can be achieved by the broadband FBG. The fiber laser device whose wavelength is locked by this broadband FBG is suitable as a laser light source for generating broadband wavelength-converted laser beams, and it becomes possible to widen the bandwidth and increase efficiency and an output power of the wavelength-converted laser beam.

With the foregoing structure, it is preferable to arrange such that laser light source is a fiber amplifier and laser device having a wavelength tunable seed light generator.

With the foregoing structure, the fiber amplifier and laser device amplifies injected seed light and outputs amplified light. Because the fiber amplifier and laser device has a gain width in a wide bandwidth, even when the wavelength of the seed light is changed, it can be amplified at high efficiency. Herein, the wavelength tunable seed light generator makes it possible to select the bandwidth of an output beam from the fiber amplifier and laser device by changing the wavelength of the seed light. As described, because the tolerance ranges of the phase matching conditions for wavelengths are wide in invention, it becomes possible to achieve high efficiency and a high output by switching the bandwidths at the same time with the use of the fiber amplifier and laser device having the wavelength tunable seed light generator as the laser light source.

With the foregoing structure, it is preferable to arrange such that the device further includes a wavelength converter holder for supporting the wavelength converter; and a heat sink mounted to the wavelength converter holder, for releasing heat.

According to the foregoing structure, by providing the heat sink for releasing heat to the wavelength converter holder that generates heat due to absorption of the laser beam, the wavelength conversion can be performed in a stable manner.

With the foregoing structure, it is preferable to arrange such that the device further includes a covering member which absorbs the laser beam, wherein the covering member covers the two reflective surfaces and a space between the two reflective surfaces other than a light incident section from which the laser beam is injected between the two reflective surfaces and an output section from which the wavelength-converted beams are outputted.

According to the foregoing structure wherein two reflective surfaces and a space between the reflective surfaces are covered with the covering member except for regions needed for injecting the laser beam and emitting the wavelength-converted beams, the laser beam can be absorbed into the covering member without being outputted to the outside the reflective surfaces, thereby ensuring the safety in the outside of the wavelength conversion laser device.

With the foregoing structure, it is preferable to arrange such that the device further includes a light-collecting section for collecting the wavelength-converted beams of a linear shape emitted from between the reflective surfaces; and an internal reflection integrator which allows the wavelength-converted beams collected by the light-collecting portion to enter therein and to emit the wavelength-converted beams after intensities and frequencies thereof are averaged.

According to the foregoing structure, the wavelength-converted beams are collected by the light-collecting portion and enter into the internal reflection integrator even when the wavelength converted light is emitted linearly with non-uniform intensity distribution. The wavelength-converted beams are then emitted from the internal reflection integrator in a state where the intensities and the frequencies are averaged. By averaging the intensities and the frequency components of the wavelength-converted beams in this manner, low coherent wavelength-converted beams can be obtained with a homogeneous intensity distribution.

With the foregoing structure, it is preferable to arrange such that the wavelength converter has a periodically poled structure, and let θ be a maximum angle of the laser beam with respect to a poling period when the laser beam passes through the wavelength converter, λ be a center wavelength of the laser beam, and Δλ, be a spectrum full width at half maximum of the laser beam, then the following relationship holds:

$$\cos\theta \leq \lambda/(\lambda+\Delta\lambda/2).$$

According to the foregoing structure, wavelength conversion in a wide bandwidth is performed as the angle of the laser beam with respect to the poling period of the wavelength converter changes. Herein, by arranging such that the angle of the laser beam changes within the range satisfying the above expression, it becomes possible to convert the wavelength width in the entire range of the laser beam entering into the wavelength converter. In other words, by satisfying the above expression, the bandwidth of the wavelength-converted beam can be widened through the wavelength conversion suitable to a laser beam that the laser light source outputs.

With the foregoing structure, it is preferable to arrange such that let D be a distance between the two reflective surfaces, f1 and f2 be focal lengths of the two reflective surfaces, and L be a length of the wavelength converter, then the following relationship holds:

$$f1+f2<D<f1+f2+L.$$

By setting the distance D between the reflective surfaces to satisfy the above expression, it becomes close to the confocal alignment of the two reflective surfaces and the laser beam passes through the wavelength converter many more times as the number of reciprocation times of the beam pass increases. Total conversion efficiency from the laser beam to wavelength-converted beams can be thus increased.

With the foregoing structure, it is preferable to arrange such that the laser beam injected between the reflective surfaces has a beam diameter equal to or smaller than ⅕ of an effective diameter of one of the two reflective surfaces, whichever has a smaller effective diameter.

According to the foregoing structure, since the beam diameter of the laser beam injected between the reflective surfaces is sufficiently small (⅕ or less) for the effective diameter of the reflective surface having the smaller effective diameter, not only can overlapping of the laser beam between the reflective surfaces be relaxed, but also the number of reciprocation times of the laser beam between the reflective surfaces can be increased. Owing to the relaxation of overlapping and an increase of the number of reciprocation times as above, the wavelength conversion laser device of the invention can be compact yet capable of achieving both a high output and high conversion efficiency.

With the foregoing structure, it is preferable to arrange such that the wavelength converter has a periodically poled structure and a temperature gradient in a direction perpendicular to a poling period of the periodically poled structure.

According to the foregoing structure, since the incident angle of the laser beam changes with respect to the poling period of the wavelength converter, the wavelength conversion in a wide bandwidth can be performed. Herein, because the wavelength converter has a temperature gradient in a direction perpendicular to the poling period of the poled structure, the phase matching condition for a laser beam passing through the wavelength converter is changed by the temperature gradient in addition to the change of the incident angle. Hence, even when the incident angle is the same, the phase matching condition is changed by the temperature gradient of the wavelength converter. This changes the center wavelength of the laser beam at which the wavelength conversion is performed. Wavelength conversion in an extremely wide bandwidth is thus enabled. Also, by aligning the temperature gradient of the wavelength converter to the direction perpendicular to the poling period, it becomes possible to avoid deterioration of the wavelength conversion efficiency by suppressing a temperature change of the wavelength converter in each pass of the laser beam.

With the foregoing structure, it is preferable to arrange such that the reflective surfaces are made up of optical members; and the optical members are jointed to the wavelength converter, so that the optical members and the wavelength converter are formed into one integral part.

According to the foregoing structure, by joining the optical members serving as the reflective surfaces to the wavelength converter, misalignment between the reflective surfaces and the wavelength converter can be eliminated, and so can the step of adjusting the positional relation. It is therefore possible to enhance the reliability of the device and to reduce the steps in the manufacturing process.

With the foregoing structure, it is preferable to arrange such that the laser light source is formed of a plurality of laser light sources each having a different oscillation wavelength; and the wavelength-converted beams generated by the wavelength converter include second harmonic waves of respective laser beams emitted from the plurality of laser light sources and sum frequency waves or difference frequency waves of a plurality of laser beams.

According to the foregoing structure, the device has a plurality of laser light sources each having a different oscillation wavelength and generates the second harmonic waves of the respective laser beams emitted from the plurality of laser light sources and a sum frequency or a difference frequency simultaneously. By using a plurality of laser beams each having a different oscillation wavelength, multi-mode wavelength-converted beams in different longitudinal modes can be outputted simultaneously. Because interference noises are small with the longitudinal multi-mode wavelength-converted beams, they can be used extensively in the field of videos and lighting.

With the foregoing structure, it is preferable to arrange such that the wavelength converter has at least a first nonlinear optical crystal and a second nonlinear optical crystal; the first nonlinear optical crystal converts the laser beam into first wavelength-converted beams on multi beam paths; and the second nonlinear optical crystal converts the first wavelength-converted beams to second wavelength-converted beams on multi beam paths.

According to the foregoing structure, the wavelength converter includes at least the first nonlinear optical crystal and the second nonlinear optical crystal and the laser beam is converted to the first wavelength-converted beams on multi beam paths while the laser beam changes the angle at which it passes through the first nonlinear optical crystal. Further, the first wavelength-converted beams are converted to the second wavelength-converted beams on multi beam paths while they change the angles at which they pass through the second nonlinear optical crystal. Accordingly, an improved conversion efficiency can be realized when converting he first wavelength-converted beams into the second wavelength-converted beams, wider ranges for the phase matching condition become available for obtaining the second wavelength-converted beams. It is therefore possible to obtain the second wavelength-converted beams, which are the high-order converted waves, in a efficient and stable manner. Additionally, because different crystals, that is, the first nonlinear optical crystal and the second nonlinear optical crystal, are used in the foregoing structure, it becomes possible to select crystals having small light absorption and high conversion efficiency with respect to the respective wavelength-converted beams separately for generation of the first wavelength-converted beam and generation of the second wavelength-converted beam. Accordingly, conversion efficiency can be increased while preventing heat generation of the wavelength converter.

With the foregoing structure, it is preferable to arrange such that a wavelength converted beam generated from a laser beam which has first passed through the wavelength converter has a smaller power than that of a wavelength converted beam generated from a laser beam which has subsequently passed through the wavelength converter.

According to the foregoing structure, power of the wavelength-converted beam generated on the beam path along which the laser beam first passes through the wavelength converter is suppressed to be lower than the power of the wavelength-converted beams generated on the beam paths thereafter. Because the power of the laser beam is the highest on the beam path that first passes through the wavelength converter, damage on the wavelength converter and thermal lens caused by light absorption readily occur. However, by suppressing the generation of the wavelength-converted beam on the first beam path, it becomes possible to prevent the occurrence of the damage and the thermal lens.

With the foregoing structure, it is preferable to arrange such that the laser light source emits a pulse laser beam having a pulse width of 0.1 msec or longer; and the pulse laser beam has a larger power at an end than that at a beginning.

When the laser light source emits a pulse laser beam having the pulse width of 0.1 msec or longer as in the configuration above, a power variance may possibly occur within a pulse due to a temperature change of the wavelength converter. However, by applying modulation so that the power within a pulse becomes larger at the ending than at the beginning as in the invention, an output power of the wavelength-converted beam within a pulse can be constant by reducing a power variance within the pulse.

With the foregoing structure, it is preferable to arrange such that the condensing optics are arranged to inject the laser beam between the two reflective surfaces at an incident angle inclined to the thickness-wise direction of the wavelength converter with respect to the principal ray axis so that laser beams repetitively pass through the wavelength converter while changing angles of beam passes in biaxial directions.

According to the foregoing structure, by changing angles of beam passes in biaxial directions, it become possible to disperse heat generation occurring in the wavelength converter by light absorption by increasing a volume of beam paths passing through the wavelength converter. By dispersing the heat generation portion in this manner, deterioration of the conversion efficiency can be prevented. Additionally, by dispersing the beam waist positions of the laser beam within the wavelength converter with respect to the two axes, concentration of the beam waist positions can be avoided. It is therefore possible to obtain high-output wavelength-converted beams with which light-induced damage on the wavelength converter and instability of wavelength conversion are eliminated With the foregoing structure, it is preferable to arrange such that the wavelength converter has end faces formed in a convex shape, which serve as the condensing surfaces and the reflective surfaces for condensing and reflecting laser beams.

According to the foregoing structure, by forming the end faces of the wavelength converter to be of a convex shape and using the end faces as the condensing surfaces and the reflective surfaces for the laser beam, there is no need to dispose optical components, such as the reflective surfaces and the condensing surfaces, on the outside of the wavelength converter. Hence, not only can the configuration be compact by reducing the components, but also the steps of adjustment can be reduced.

With the foregoing structure, it is preferable to arrange such that the laser light source includes a plurality of laser light sources for emitting a plurality of laser beams; the reflective surfaces are provided with a plurality of incident portions which allow the plurality of laser beams to pass therethrough; and the plurality of laser beams are injected between the two reflective surfaces respectively from the plurality of incident portions.

According to the foregoing structure, by increasing the laser light sources without increasing the wavelength converter, an output power of the wavelength-converted beams can be increased. It is therefore possible to increase an output power and reduce the size of the wavelength conversion laser device. Additionally, by providing a plurality of injection sections for letting a plurality of laser beams pass through, optics to combine a plurality of laser beams can be omitted. Both the cost and the size can be thus reduced. Also, because the invention has a wide range of the phase matching condition by changing the incident angle of the laser beam into the wavelength converter, it becomes possible to perform wavelength conversion simultaneously for a plurality of laser beams entering into the wavelength converter from different injection sections. Additionally, in the invention, because wavelength conversion using a plurality of laser beams, such as a sum frequency and a difference frequency, is possible by utilizing overlapping of the laser beam within the wavelength converter, it is possible to obtain multi-mode wavelength-converted beams. Further, in a case of a high output, the injection sections for the laser beam into the wavelength converter may possibly be damaged. However, by providing the injection sections for a plurality of laser beams at different points as in the configuration above, such damage on the wavelength converter can be prevented. It is therefore possible to obtain a high-output wavelength conversion laser device with high reliability.

An image display device according to another aspect of the invention includes: the wavelength conversion laser device of any one of the foregoing structures; optics for superimposing a plurality of wavelength-converted laser beams emitted from the wavelength conversion laser device; and a modulator for modulating the wavelength-converted beams superimposed by the optics.

It should be appreciated that the invention is not limited to the embodiments above and can be modified as needed without deviating from the scope of the invention. It goes without saying that the respective embodiments of the invention can be used in combination.

The wavelength conversion laser device of the invention can be used for a display device, a lighting device, a working or medical laser device, and so forth. In particular, it is most suitably used for an image display device or the like that requires a low coherent wavelength-converted laser beam.

What is claimed is:
1. A wavelength conversion laser device, comprising:
a laser light source which emits a laser beam;
two reflective surfaces which reflect therefrom the laser beam emitted from the laser light source;

a wavelength converter which converts the laser beam into a wavelength-converted laser beam, said wavelength converter being provided between said two reflective surfaces; and condensing optics which condense the laser beam emitted from the laser light source to be injected between said two reflective surfaces, wherein at least one of said two reflective surfaces has a curvature for reflecting the laser beam to be re-injected into said wavelength converter between said two reflective surfaces repeatedly while forming multi paths of laser beams injected into said wavelength converter at different incident angles, and said condensing optics are arranged to disperse beam waists of the laser beams in said wavelength converter, which reciprocate between said two reflective surfaces.

2. The wavelength conversion laser device according to claim 1, wherein:

at least one of said two reflective surfaces has an incident section, which allows the laser beam condensed by said condensing optics to be injected between said two reflective surfaces.

3. The wavelength conversion laser device according to claim 1, wherein:

at least one of said two reflective surfaces is transmissive to a wavelength-converted laser beam to be output therefrom.

4. The wavelength conversion laser device according to claim 1, wherein:

said condensing optics condense the laser beam so that a beam waist of a laser beam is formed in said wavelength converter before being first reflected from either one of said two reflective surfaces.

5. The wavelength conversion laser device according to claim 1, wherein:

at least three beam waist positions of laser beams are dispersed in said wavelength converter; and let i, ii, iii be beam waists of laser beams which are formed in this order in said wavelength converter, and $r\_i$, $r\_ii$, and $r\_iii$ be beam waist radii of i, ii, and iii, respectively, then the following relationship holds:

$r\_i > r\_ii > r\_iii$.

6. The wavelength conversion laser device according to claim 1, wherein:

the wavelength converter has a periodically poled structure; and given that an optical axis linking respective centers of said two reflective surfaces is a principal ray axis, then said periodically poled structure is inclined with respect to the principal ray axis.

7. The wavelength conversion laser device according to claim 1, wherein:

the laser light source emits a pulse laser beam;

the wavelength converter has a periodically poled structure; and let T be a pulse width of the laser beam, L be a length of the wavelength converter, $\Lambda$ be a poling period of the poled structure, $\lambda$ be a wavelength of the laser beam, and c be a velocity of light, then the pulse width of the laser beam is set to hold the following relationship:

$(L\cdot\lambda)/(0.3\cdot\Lambda\cdot c) < T$.

8. The wavelength conversion laser device according to claim 7, wherein:

an output power of a wavelength-converted beam generated on a first beam path along which the laser beam passes through the wavelength converter is less than ⅔ of a total output power of the wavelength-converted beams generated on all beam paths along which the laser beam passes through the wavelength converter.

9. The wavelength conversion laser device according to claim 1, wherein:

given that an optical axis linking respective centers of the two reflective surfaces is a principal ray axis, then the condensing optics injects the laser beam between the reflective surfaces with an inclination with respect to the principal ray axis.

10. The wavelength conversion laser device according to claim 1, wherein:

the wavelength converter includes a portion with a periodically poled structure and a portion without a periodically poled structure which are formed in a thickness-wise direction, and said portion with a periodically poled structure is provided at least at around the center of said wavelength converter in the thickness-wise direction.

11. The wavelength conversion laser device according to claim 1, wherein:

said condensing optics has a larger lens power in a thickness-wise direction than that in a width-wise direction.

12. The wavelength conversion laser device according to claim 1, wherein:

at least one of said two reflective surfaces is formed of an anamorphic reflection mirror having different curvatures in a thickness-wise direction and in a width-wise direction of said wavelength converter.

13. The wavelength conversion laser device according to claim 1, wherein:

a coherence length of the laser beam is less than twice a distance between said two reflective surfaces.

14. The wavelength conversion laser device according to claim 1, wherein:

the laser light source is a laser light source in a longitudinal multi-mode, which emits a laser beam having a spectrum full width at half maximum of 0.5 nm or wider.

15. The wavelength conversion laser device according to claim 1, wherein:

the laser light source is a fiber laser device having a broadband fiber Bragging grating, with which a wavelength thereof is locked.

16. The wavelength conversion laser device according to claim 1, wherein:

the laser light source is a fiber amplifier and laser device having a wavelength tunable seed light generator.

17. The wavelength conversion laser device according to claim 1, further comprising:

a wavelength converter holder for supporting said wavelength converter; and a heat sink mounted to said wavelength converter holder, for releasing heat.

18. The wavelength conversion laser device according to claim 1, further comprising:

a covering member which absorbs the laser beam, wherein the covering member covers said two reflective surfaces and a space between said two reflective surfaces other than a light incident section from which the laser beam is injected between said two reflective surfaces and an output section from which the wavelength-converted beams are outputted.

19. The wavelength conversion laser device according to claim 3, further comprising:

a light-collecting section for collecting the wavelength-converted beams of a linear shape emitted from between the reflective surfaces; and an internal reflection integrator which allows the wavelength-converted beams collected by the light-collecting portion to enter therein and to emit the wavelength-converted beams after intensities and frequencies thereof are averaged.

20. The wavelength conversion laser device according to claim 1, wherein:
said wavelength converter has a periodically poled structure, and
let θ be a maximum angle of the laser beam with respect to a poling period when the laser beam passes through the wavelength converter, λ be a center wavelength of the laser beam, and Δλ be a spectrum full width at half maximum of the laser beam, then the following relationship holds:

$\cos\theta \leq \lambda/(\lambda+\Delta\lambda/2)$.

21. The wavelength conversion laser device according to claim 1, wherein:
let D be a distance between the two reflective surfaces, f1 and f2 be focal lengths of the two reflective surfaces, and L be a length of the wavelength converter, then the following relationship holds:

$f1+f2 < D < f1+f2+L$.

22. The wavelength conversion laser device according to claim 1, wherein:
the laser beam injected between the reflective surfaces has a beam diameter equal to or smaller than 1/5 of an effective diameter of one of the two reflective surfaces, whichever has a smaller effective diameter.

23. The wavelength conversion laser device according to claim 1, wherein:
the wavelength converter has a periodically poled structure and a temperature gradient in a direction perpendicular to a poling period of the periodically poled structure.

24. The wavelength conversion laser device according to claim 1, wherein:
the reflective surfaces are formed of optical members; and
the optical members are jointed to the wavelength converter, so that the optical members and the wavelength converter are formed into one integral part.

25. The wavelength conversion laser device according to claim 1, wherein:
the laser light source is formed of a plurality of laser light sources each having a different oscillation wavelength; and
the wavelength-converted beams generated by said wavelength converter include second harmonic waves of respective laser beams emitted from the plurality of laser light sources and sum frequency waves or difference frequency waves of a plurality of laser beams.

26. The wavelength conversion laser device according to claim 1, wherein:
the wavelength converter has at least a first nonlinear optical crystal and a second nonlinear optical crystal;
the first nonlinear optical crystal converts the laser beam into first wavelength-converted beams on multi beam paths; and
the second nonlinear optical crystal converts the first wavelength-converted beams to second wavelength-converted beams on multi beam paths.

27. The wavelength conversion laser device according to claim 1, wherein:
a wavelength converted beam generated from a laser beam which has first passed through said wavelength converter has a smaller power than that of a wavelength converted beam generated from a laser beam which has subsequently passed through said wavelength converter.

28. The wavelength conversion laser device according to claim 1, wherein:
the laser light source emits a pulse laser beam having a pulse width of 0.1 msec or longer; and
said pulse laser beam has a larger power at an end than that at a beginning 29. The wavelength conversion laser device according to claim 9, wherein:
said condensing optics are arranged to inject the laser beam between said two reflective surfaces at an incident angle inclined to the thickness-wise direction of said wavelength converter with respect to the principal ray axis so that laser beams repetitively pass through said wavelength converter while changing angles of beam passes in biaxial directions.

30. The wavelength conversion laser device according to claim 1, wherein:
said wavelength converter has end faces formed in a convex shape, which serve as the condensing surfaces and the reflective surfaces for condensing and reflecting laser beams.

31. The wavelength conversion laser device according to claim 1, wherein:
said laser light source includes a plurality of laser light sources for emitting a plurality of laser beams;
the reflective surfaces are provided with a plurality of incident portions which allow said plurality of laser beams to pass therethrough; and
the plurality of laser beams are injected between said two reflective surfaces respectively from said plurality of incident portions.

32. An image display device, comprising:
said wavelength conversion laser device of claim 1;
optics for superimposing a plurality of wavelength-converted laser beams emitted from said wavelength conversion laser device; and
a modulator for modulating the wavelength-converted beams superimposed by said optics.

* * * * *